(12) United States Patent
Hisatomi et al.

(10) Patent No.: US 8,489,739 B2
(45) Date of Patent: Jul. 16, 2013

(54) METHOD, COMPUTER SYSTEM AND MANAGEMENT COMPUTER FOR MANAGING PERFORMANCE OF A STORAGE NETWORK

(75) Inventors: Tatsuya Hisatomi, Yokohama (JP); Hideo Ohata, Fujisawa (JP); Tadashi Numanoi, Yokohama (JP); Akira Mineo, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1570 days.

(21) Appl. No.: 11/681,900

(22) Filed: Mar. 5, 2007

(65) Prior Publication Data

US 2008/0148105 A1 Jun. 19, 2008

(30) Foreign Application Priority Data

Dec. 19, 2006 (JP) ................................ 2006-341686

(51) Int. Cl.
*G06F 15/173* (2006.01)

(52) U.S. Cl.
USPC ........... 709/225; 709/214; 709/216; 709/224; 711/111; 711/112; 711/170

(58) Field of Classification Search
USPC ................................................. 709/223–226
See application file for complete search history.

(56) References Cited

U.S. PATENT DOCUMENTS

| | | | |
|---|---|---|---|
| 6,779,078 B2 | 8/2004 | Murotani | |
| 7,082,506 B2 | 7/2006 | Nakano | |
| 7,143,008 B2 | 11/2006 | Ochi et al. | |
| 2004/0193827 A1* | 9/2004 | Mogi et al. | ................... 711/170 |
| 2004/0193969 A1 | 9/2004 | Nemoto et al. | |
| 2005/0010608 A1 | 1/2005 | Horikawa | |
| 2005/0091654 A1 | 4/2005 | Lection et al. | |
| 2005/0108444 A1 | 5/2005 | Flauaus et al. | |
| 2005/0235288 A1 | 10/2005 | Yamakabe et al. | |

FOREIGN PATENT DOCUMENTS

| | | |
|---|---|---|
| EP | 1158395 A2 | 11/2001 |
| JP | 2001-337790 | 12/2001 |
| JP | 2003-122509 | 4/2003 |
| JP | 2005031771 | 2/2005 |
| JP | 2005309644 | 11/2005 |
| JP | 2006107126 | 4/2006 |

OTHER PUBLICATIONS

OKI Technical Review, Oct. 2005, No. 4, vol. 72, No. 4.
Japanese Office Action dated Sep. 6, 2011, issued in corresponding Japanese Patent Application No. 2006-341686.

* cited by examiner

*Primary Examiner* — Ian N Moore
*Assistant Examiner* — Jackie Zuniga
(74) *Attorney, Agent, or Firm* — Brundidge & Stanger, P.C.

(57) ABSTRACT

Provided is a method of controlling a computer system which includes a host computer and one or more storage systems coupled to the host computer via a network, wherein the first processor executes an application job which executes data I/O in a logical storage area; the second processor executes a management job which executes the data I/O in the logical storage area; the method comprising: judging whether at lest one of resources of the computer system used for the data I/O of the application job is also used for the data I/O of the executed management job when performance of the application job drops below a predetermined threshold; and displaying information indicating the executed management job when it is judged that at least one of the resources used for the data I/O of the application job is also used for the data I/O of the executed management job.

14 Claims, 32 Drawing Sheets

APPLICATION I/O PATH INFORMATION TABLE

| 501 | 502 | 503 | 504 | 505 | 506 | 507 | 508 | 509 |
|---|---|---|---|---|---|---|---|---|
| APPLICATION | FILE | VOLUME | HOST SIDE PORT | SWITCH SIDE PORT | STORAGE SIDE PORT | PROCESSOR | RAID GROUP | LDEV |
| APPLICATION PROGRAM A | FILE A | VOLUME A | PORT A | {PORT C, PORT E, PORT K, PORT L} | PORT T | PROCESSOR A | RAID GROUP A | LDEV B |
| APPLICATION PROGRAM A | FILE B | VOLUME A | PORT A | {PORT C, PORT E, PORT K, PORT L} | PORT T | PROCESSOR A | RAID GROUP A | LDEV B |
| APPLICATION PROGRAM A | FILE C | VOLUME A | PORT A | {PORT C, PORT E, PORT K, PORT L} | PORT T | PROCESSOR A | RAID GROUP A | LDEV B |
| APPLICATION PROGRAM B | FILE D | VOLUME B | PORT A | {PORT C, PORT E, PORT K, PORT L} | PORT T | PROCESSOR B | RAID GROUP C | LDEV E |
| APPLICATION PROGRAM B | FILE E | VOLUME B | PORT A | {PORT C, PORT E, PORT K, PORT L} | PORT T | PROCESSOR B | RAID GROUP C | LDEV E |
| APPLICATION PROGRAM C | FILE F | VOLUME C | PORT A | {PORT C, PORT F, PORT M, PORT O} | PORT U | PROCESSOR C | RAID GROUP D | LDEV F |
| APPLICATION PROGRAM C | FILE G | VOLUME C | PORT A | {PORT C, PORT F, PORT M, PORT O} | PORT U | PROCESSOR C | RAID GROUP D | LDEV F |
| APPLICATION PROGRAM D | FILE H | VOLUME D | PORT B | {PORT G, PORT H, PORT N, PORT P} | PORT U | PROCESSOR D | RAID GROUP F | LDEV I |
| APPLICATION PROGRAM D | FILE I | VOLUME D | PORT B | {PORT G, PORT H, PORT N, PORT P} | PORT U | PROCESSOR D | RAID GROUP F | LDEV I |
| APPLICATION PROGRAM D | FILE J | VOLUME D | PORT B | {PORT G, PORT H, PORT N, PORT P} | PORT U | PROCESSOR D | RAID GROUP F | LDEV I |

FIG. 5

APPLICATION PERFORMANCE INFORMATION TABLE

| APPLICATION | PERFORMANCE VALUE |
|---|---|
| APPLICATION PROGRAM A | 2.5 |
| APPLICATION PROGRAM B | 1 |
| APPLICATION PROGRAM C | 3.5 |
| APPLICATION PROGRAM D | 13 |

*FIG. 6*

JOB-MIGRATION PATH RELATION INFORMATION TABLE

| ID | USED STORAGE RESOURCE | MIGRATION SOURCE LDEV INFORMATION | MIGRATION DESTINATION LDEV INFORMATION | STATE | NUMBER OF PARALLEL COPY JOBS |
|---|---|---|---|---|---|
| 10 | RAID GROUP A<br>PROCESSOR A<br>STORAGE PORT T<br>SWITCH PORT L<br>SWITCH PORT K<br>SWITCH PORT E<br>SWITCH PORT C<br>SWITCH PORT D<br>SWITCH PORT I<br>SWITCH PORT J<br>STORAGE PORT S<br>PROCESSOR E<br>RAID GROUP G | LDEV B | LDEV K | LIMITED | 12 |
| 11 | RAID GROUP D<br>PROCESSOR C<br>STORAGE PORT U<br>SWITCH PORT P<br>SWITCH PORT N<br>SWITCH PORT H<br>SWITCH PORT Q<br>SWITCH PORT R<br>STORAGE PORT V<br>PROCESSOR F<br>RAID GROUP J | LDEV F | LDEV P | EXECUTED | 24 |

*FIG. 7*

APPLICATION PRIORITY INFORMATION TABLE

TIER PRIORITY INFORMATION TABLE

APPLICATION PERFORMANCE TARGET VALUE INFORMATION TABLE

| APPLICATION | PERFORMANCE DETERIORATION BOUNDARY VALUE | PERFORMANCE RECOVERY BOUNDARY VALUE |
|---|---|---|
| APPLICATION PROGRAM A | 3 | 3 |
| APPLICATION PROGRAM B | 2 | 1.8 |
| APPLICATION PROGRAM C | 4.1 | 4 |
| APPLICATION PROGRAM D | 11.5 | 10 |

*FIG. 10*

APPLICATION-FILE RELATION INFORMATION TABLE

| APPLICATION | FILE |
|---|---|
| APPLICATION PROGRAM A | FILE A |
| APPLICATION PROGRAM A | FILE B |
| APPLICATION PROGRAM A | FILE C |
| APPLICATION PROGRAM B | FILE D |
| APPLICATION PROGRAM B | FILE E |
| APPLICATION PROGRAM C | FILE F |
| APPLICATION PROGRAM C | FILE G |
| APPLICATION PROGRAM D | FILE H |
| APPLICATION PROGRAM D | FILE I |
| APPLICATION PROGRAM D | FILE J |

*FIG. 11*

FILE-VOLUME RELATION INFORMATION TABLE

| FILE | VOLUME |
|---|---|
| FILE A | VOLUME A |
| FILE B | VOLUME A |
| FILE C | VOLUME A |
| FILE D | VOLUME B |
| FILE E | VOLUME B |
| FILE F | VOLUME C |
| FILE G | VOLUME C |
| FILE H | VOLUME D |
| FILE I | VOLUME D |
| FILE J | VOLUME D |

*FIG. 12*

VOLUME-LDEV-PORT RELATION INFORMATION TABLE

| VOLUME | LDEV | HOST SIDE PORT | STORAGE SIDE PORT |
|---|---|---|---|
| VOLUME A | LDEV B | PORT A | PORT T |
| VOLUME B | LDEV E | PORT A | PORT T |
| VOLUME C | LDEV F | PORT A | PORT U |
| VOLUME D | LDEV I | PORT B | PORT U |

*FIG. 13*

INTERPORT RELATION INFORMATION TABLE

| HOST SIDE PORT | STORAGE SIDE PORT | SWITCH SIDE PORT LIST |
|---|---|---|
| PORT A | PORT S | { PORT C, PORT D, PORT I, PORT J } |
| PORT A | PORT T | { PORT C, PORT E, PORT K, PORT L } |
| PORT A | PORT U | { PORT C, PORT F, PORT M, PORT O } |
| PORT B | PORT U | { PORT G, PORT H, PORT N, PORT P } |
| PORT B | PORT V | { PORT G, PORT H, PORT Q, PORT R } |

*FIG. 14*

LDEV-RAID GROUP RELATION INFORMATION TABLE

| LDEV | RAID GROUP |
|---|---|
| LDEV A | RAID GROUP A |
| LDEV B | RAID GROUP A |
| LDEV C | RAID GROUP B |
| LDEV D | RAID GROUP C |
| LDEV E | RAID GROUP C |
| LDEV F | RAID GROUP D |
| LDEV G | RAID GROUP D |
| LDEV H | RAID GROUP E |
| LDEV I | RAID GROUP F |
| LDEV J | RAID GROUP F |
| LDEV K | RAID GROUP G |
| LDEV L | RAID GROUP G |
| LDEV M | RAID GROUP H |
| LDEV N | RAID GROUP I |
| LDEV O | RAID GROUP I |
| LDEV P | RAID GROUP J |

*FIG. 15*

STORAGE SUBSYSTEM-RAID GROUP RELATION INFORMATION TABLE

| STORAGE SUBSYSTEM | RAID GROUP |
|---|---|
| STORAGE SUBSYSTEM A | RAID GROUP A |
| STORAGE SUBSYSTEM A | RAID GROUP B |
| STORAGE SUBSYSTEM A | RAID GROUP C |
| STORAGE SUBSYSTEM A | RAID GROUP D |
| STORAGE SUBSYSTEM A | RAID GROUP E |
| STORAGE SUBSYSTEM A | RAID GROUP F |
| STORAGE SUBSYSTEM B | RAID GROUP G |
| STORAGE SUBSYSTEM B | RAID GROUP H |
| STORAGE SUBSYSTEM C | RAID GROUP I |
| STORAGE SUBSYSTEM C | RAID GROUP J |

*FIG. 16*

PORT-PROCESSOR RELATION INFORMATION TABLE

| STORAGE SIDE PORT | PROCESSOR |
|---|---|
| PORT S | PROCESSOR E |
| PORT T | PROCESSOR A |
| PORT T | PROCESSOR B |
| PORT U | PROCESSOR C |
| PORT U | PROCESSOR D |
| PORT V | PROCESSOR F |

*FIG. 17*

PERFORMANCE DETERIORATION TEMPORARY TABLE

| APPLICATION | MIGRATION ID |
|---|---|
| APPLICATION PROGRAM D | 11 |

FIG. 18

PERFORMANCE RECOVERY TEMPORARY TABLE

| APPLICATION | MIGRATION ID |
|---|---|
| APPLICATION PROGRAM C | 10 |

FIG. 19

TIER PRIORITY INFORMATION TABLE

| LDEV | TIER |
|---|---|
| LDEV A | 1 |
| LDEV B | 1 |
| LDEV C | 1 |
| LDEV D | 1 |
| LDEV E | 1 |
| LDEV F | 2 |
| LDEV G | 2 |
| LDEV H | 2 |
| LDEV I | 2 |
| LDEV J | 2 |

*FIG. 35*

METHOD, COMPUTER SYSTEM AND MANAGEMENT COMPUTER FOR MANAGING PERFORMANCE OF A STORAGE NETWORK

CLAIM OF PRIORITY

The present application claims priority from Japanese application JP2006-341686 filed on Dec. 19, 2006, the content of which is hereby incorporated by reference into this application.

BACKGROUND

This invention relates to a performance management of a computer system which includes a storage system.

There has been realized a storage network in which a plurality of computers access an integrated storage system via a communication network. Such a storage network can increase utilization efficiency of the storage system enlarged more and more and reduce management costs, and has therefore started to be widely used as an architecture for a data center. A computer system to which the storage network has been introduced executes applications critical in business in many cases, and therefore requires high processing performance, availability, and fault-tolerance. To meat such requirements, the storage system performs various types of processing.

For example, in the computer system to which the storage network has been introduced, concentration of loads on a specific storage resource such as a port or a processor may cause a drop in performance of access to a logical volume. To deal with such a case, a technology has been proposed in which the loads of the storage resource are dispersed by moving the logical volume dropped in performance (e.g., refer to JP 2001-337790 A). The movement of the logical volume is called a volume migration (simply referred to as migration hereinafter). The storage system executes a migration, whereby the drop in performance of the applications critical in business can be prevented.

The migration may be executed for purposes other than the load dispersion. For example, when importance of stored data is reduced with a passage of time, it is possible to reduce costs of storing the data by migrating the data to an inexpensive storage system.

Another example of processing executed by the storage system is so-called remote copying. Data stored in the storage system may be lost due to system faults, disasters, artificial mistakes, or the like. To deal with such a case, a so-called remote copy technology has been proposed in which data is made redundant by transferring a copy of the data stored in the storage system to another storage system to store it (e.g., JP 2003-122509 A). Since the storage system executes remote copying to make the data redundant, even when data is lost from one storage system, the other storage system can take over the processing. As a result, it is possible to improve availability and fault-tolerance of the computer system.

SUMMARY

When a migration is carried out, data read from a logical volume of a migration source is written in a logical volume of a migration destination. When remote copying is carried out, similarly, data read from a logical volume of a copying source is written in a logical volume of a copying destination. Thus, processing itself executed by the storage system generates data I/O. Interference of the data I/O for the migration or the like with data I/O of a computer which executes applications may cause a drop in performance.

For example, when the data I/O for the migration and the data I/O of the computer which executes applications use the same storage resource, a bottleneck occurs in the storage resource to degrade performance. Thus, when a bottleneck occurs, a system administrator has conventionally had to specify a resource where the bottleneck has occurred. To prevent the bottleneck, the system administrator has had to manually set execution of a migration or the like in a time period during which no drop in application performance is likely to occur even when a migration or the like is executed. Such manual work has been a burden on the system administrator.

According to a representative invention disclosed in this application, there is provided a method of controlling a computer system which includes a host computer and one or more storage systems coupled to the host computer via a network, the host computer including a first interface coupled to the network, a first processor coupled to the first interface, and a first memory coupled to the first processor, each of the storage systems including a port coupled to the network, a second processor coupled to the port, and a second memory coupled to the second processor, at least one of the one or more storage systems including a physical storage device for storing data written by the host computer, a physical storage area of the physical storage device being allocated to a logical storage area, wherein the first processor executes an application program stored in the first memory to execute an application job which executes data I/O in the logical storage area via the first interface; the second processor executes a management program stored in the second memory to executes a management job which executes the data I/O in the logical storage area for managing the storage systems; the method comprising: judging whether at lest one of resources of the computer system used for the data I/O of the application job is also used for the data I/O of the executed management job when performance of the application job drops below a predetermined first threshold value; and displaying information indicating the executed management job when it is judged that at least one of the resources used for the data I/O of the application job is also used for the data I/O of the executed management job.

According to an embodiment of this invention, when interference of the data I/O executed by the storage system with the data I/O executed by the application of the computer causes a drop in performance, information for specifying processing which has caused the performance drop is notified to the system administrator. If the system administrator executes proper processing based on the notification, it is possible to improve the performance of the computer system.

BRIEF DESCRIPTION OF THE DRAWINGS

FIG. 5 is an explanatory diagram of application I/O path information stored in the database of the first embodiment of this invention.

FIG. 6 is an explanatory diagram of application performance information stored in the database of the first embodiment of this invention.

FIG. 7 is an explanatory diagram of job-migration path relation information stored in the database of the first embodiment of this invention.

FIG. 10 is an explanatory diagram of application performance target value information stored in the database of the first embodiment of this invention.

FIG. 11 is an explanatory diagram of an application-file relation information table stored as storage network configuration information in the database of the first embodiment of this invention.

FIG. 12 is an explanatory diagram of a file-volume relation information table stored as the storage network configuration information in the database of the first embodiment of this invention.

FIG. 13 is an explanatory diagram of a volume-LDEV-port relation information table stored as the storage network configuration information in the database of the first embodiment of this invention.

FIG. 14 is an explanatory diagram of an interport relation information table stored as the storage network configuration information in the database of the first embodiment of this invention.

FIG. 15 is an explanatory diagram of an LDEV-RAID group relation information table stored as the storage network configuration information in the database of the first embodiment of this invention.

FIG. 16 is an explanatory diagram of a storage subsystem-RAID group relation information table stored as the storage network configuration information in the database of the first embodiment of this invention.

FIG. 17 is an explanatory diagram of a port-processor relation information table stored as the storage network configuration information in the database of the first embodiment of this invention.

FIG. 18 is an explanatory diagram of a performance deterioration temporary table held by the migration execution control program of the first embodiment of this invention.

FIG. 19 is an explanatory diagram of a performance recovery temporary table held by the migration execution control program of the first embodiment of this invention.

FIG. 35 is an explanatory diagram of tier priority information stored in a database of the second embodiment of this invention.

DETAILED DESCRIPTION OF THE PREFERRED EMBODIMENTS

The preferred embodiments of this invention will be described below referring to the accompanying drawings.

Figure 1:
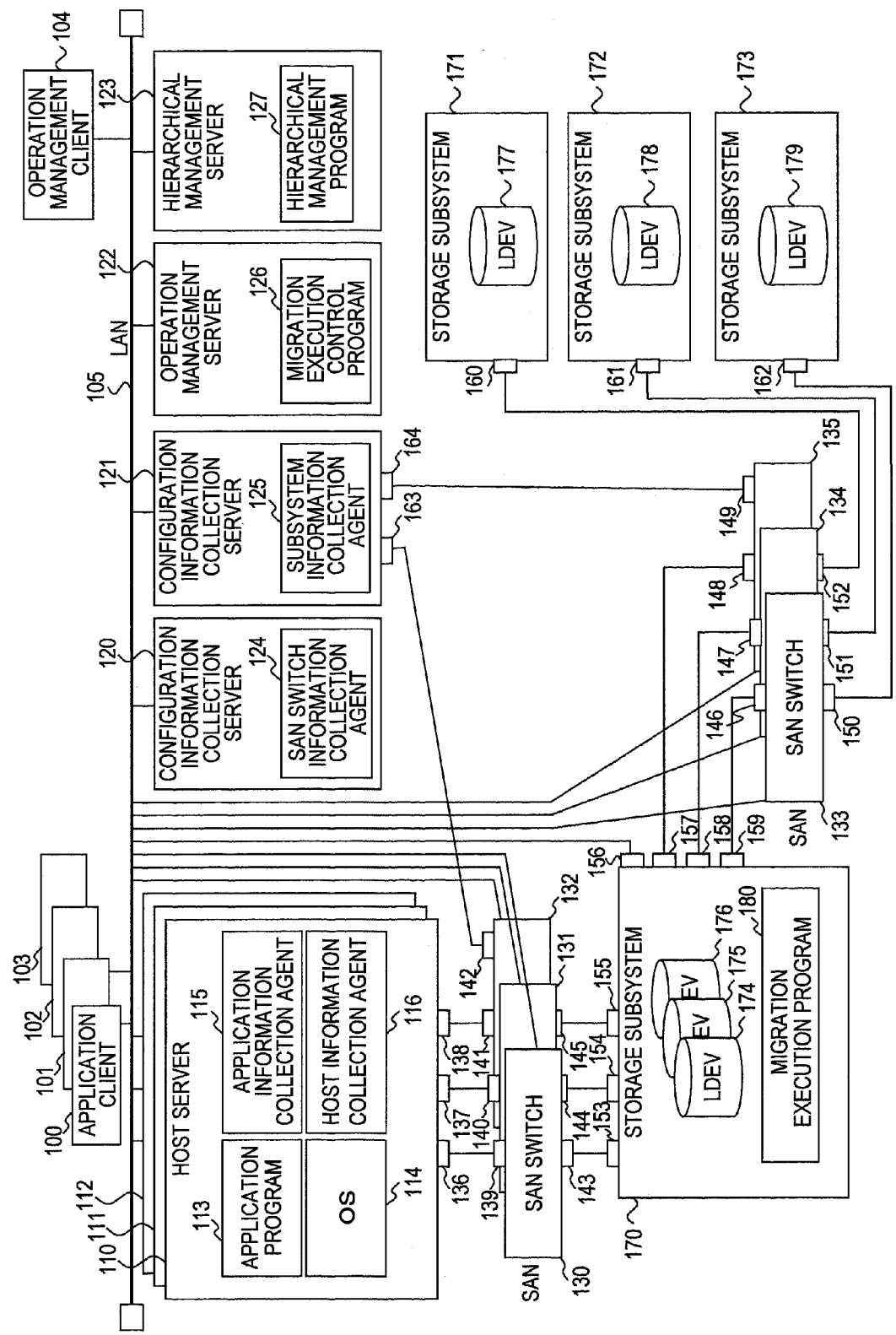
FIG. 1 is a block diagram showing a configuration of a computer system according to a first embodiment of this invention.

FIG. 1 is a block diagram showing a configuration of a computer system according to a first embodiment of this invention.

The computer system of this embodiment includes application clients 100 to 103, an operation management client 104, host servers 110 to 112, configuration information collection servers 120 and 121, an operation management server 122, storage subsystems 170 to 173, and storage area network (SAN) switches 130 to 135. Those devices are interconnected via a local area network (LAN) 105.

The application clients 100 to 103 are devices such as personal computers, work stations, or thin client terminals which provide user interface functions of an application system. The application clients 100 to 103 communicate with the host servers 110 to 112 that execute application programs 113 or the like.

The host servers 110 to 112 are computers for executing various processings in response to requests received from the application clients 100 to 103 via the LAN 105. Hardware configurations of the host servers 110 to 112 will be described below referring to FIG. 2A.

The host servers 110 to 112 hold at least software such as the application program 113, an operating system (OS) 114, an application information collection agent 115, and a host information collection agent 131.

The application program 113 is software for providing a logical function of the application system. Specifically, the application program 113 is executed in response to processing requests from the application clients 100 to 103 to execute application jobs. The application job may include data referencing or updating request when necessary. The host servers 110 to 112 may hold a plurality of application programs 113.

Figure 2A:
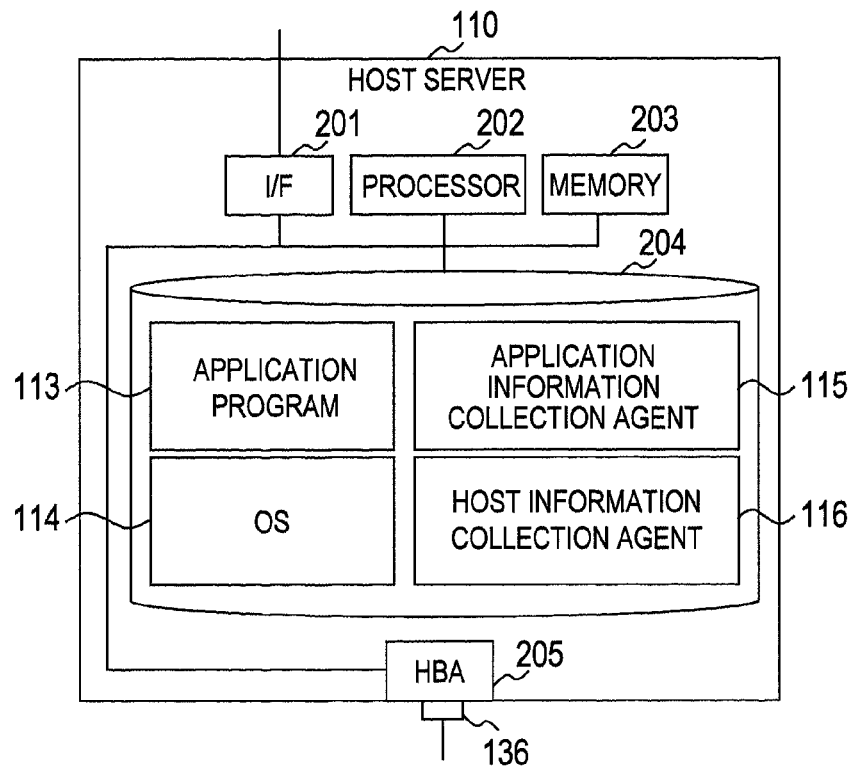
FIG. 2A is a block diagram showing a hardware configuration of a host server of the first embodiment of this invention.

Data access from the application program 113 to the storage subsystem 170 is executed via ports 136 to 138 of a host bus adaptor (HBA) 205 shown in FIG. 2A, host side ports 139 to 142 of the SAN switches 130 to 132, storage side ports 143 to 145 of the SAN switches 130 to 132, and ports 153 to 155 of the storage subsystem 170.

The operation management client 104, the configuration information collection servers 120 to 121, the operation management server 122, and the hierarchical management server 123 are computers disposed to manage an operation of the computer system. Hardware configurations of the configuration information collection servers 120 to 121, the operation management server 122, and the hierarchical management server 123 will be described below referring to FIGS. 2B to 2E.

A SAN switch information collection agent 124 held by the configuration information collection server 120, a subsystem information collection agent 125 held by the configuration information collection server 121, a migration execution control program 126 held by the operation management server 122, a hierarchical management program 127 held by the hierarchical management server 123, and, the application information collection agent 115 and host information collection agent 116 held by the host servers 110 to 112 are software for managing the operation of the computer system.

The operation management client 104 is a device for providing a user interface function of the migration execution control program 126. The operation management client 104 communicates with the operation management server 122 that executes the migration execution control program 126 via the LAN 105.

The application information collection agent 115 is software for obtaining information regarding the application program 113. Specifically, the application information collection agent 115 obtains information regarding an allocation relation between the application program 113 and files (described below) and volumes (described below). The application information collection agent 115 then transmits the obtained information to the migration execution control program 126 according to a request. The allocation relation between the application program 113 and the files and the volumes will be described below in detail referring to FIG. 4. Additionally, the application information collection agent 115 obtains information regarding execution performance of the application program 113 (i.e., performance of the application job).

The host information collection agent 116 is software for obtaining information regarding the host servers 110 to 112, the OS 114, and the ports 136 to 138. Specifically, the host information collection agent 116 obtains information regarding an allocation relation between volumes and the ports 136 to 138. The host information collection agent 116 then transmits the obtained information to the migration execution control program 126 according to a request. The allocation relation between the volumes and the ports 136 to 138 will be described below in detail referring to FIG. 4.

The SAN switch information collection agent 124 is software for obtaining information regarding the SAN switches 130 to 135 and the ports 139 to 152 disposed in the SAN switches 130 to 135, via the LAN 105. Specifically, the SAN switch information collection agent 124 obtains information indicating the ports 139 to 152 through which data transferred between the host servers 110 to 112 and the storage subsystems 170 to 173 passes. Then, the SAN switch information collection agent 124 transmits the obtained information to the migration execution control program 126 according to a request. A data path between the host servers 110 to 112 and the storage subsystems 170 to 173 will be described below in detail referring to FIG. 4.

The subsystem information collection agent 125 obtains information regarding the storage subsystems 170 to 173 and ports 153 to 162 disposed in the storage subsystems 170 to 173, via ports 163 to 164 and the SAN switches 130 to 135. Specifically, the subsystem information collection agent 125 obtains information regarding an allocation relation among the ports 153 to 162, processors (described below), RAID groups (described below), and logical volumes (LDEV, described below). Then, the subsystem information collection agent 125 transmits the obtained information to the migration execution control program 126 according to a request. The allocation relation among the ports 153 to 162, the processors, the RAID groups, and the LDEV will be described below in detail referring to FIG. 4.

The migration execution control program 126 is software for controlling migration execution in the computer system. The migration is processing for moving data stored in a logical volume to another logical volume. To control the migration execution, the migration execution control program 126 refers to pieces of information obtained from the application information collection agent 115, the host information collection agent 116, the SAN switch information collection agent 124, and the subsystem information collection agent 125. A detailed configuration of the migration execution control program 126 will be described below in detail referring to FIGS. 3A and 3B.

The hierarchical management program 127 is software for managing tiers of the storage subsystems 170 to 172. The tiers of the storage subsystems 170 to 173, and processing executed by the hierarchical management program 127 will be described below in detail.

FIG. 1 shows an example where the SAN switch information collection agent 124, the subsystem information collection agent 125, the migration execution control program 126, and the hierarchical management program 127 are executed by physical independent computers. However, those agents and programs may be executed by a single computer. Alternatively, those agents and programs may be executed by the host servers 110 to 112.

The storage subsystems 170 to 173 are data storage systems for providing data storage areas to the host servers 110 to 112. In the example of FIG. 1, the storage subsystem 170 includes logical volumes (LDEV's) 174 to 176 which become data writing targets. The storage subsystem 170 also holds a migration execution program 180. The storage subsystem 171 includes a LDEV 177. The storage subsystem 172 includes a LDEV 178. The storage subsystem 173 includes a LDEV 179.

The storage subsystems 171 to 173 of this embodiment are externally connected to the storage subsystem 170. The external connection of the storage subsystems will be described below.

First, a case where the storage subsystems 171 to 173 are not externally connected to the storage subsystem 170 will be described.

The host servers 110 to 112 issue data writing requests which target the LDEV's 174 to 176 of the storage subsystem 170. Physical data storage areas of the storage subsystem 170 have been allocated to the LDEV's 174 to 176. For example, the physical data storage areas of the storage subsystem 170 are storage areas of a physical disk (described below) disposed in the storage subsystem 170.

In this case, data written in the LDEV's 174 to 176 is actually stored in the physical data storage areas of the storage subsystem 170, allocated to the LDEV's 174 to 176. When data reading requests targeting the LDEV's 174 to 176 are issued, similarly, data is read from the physical data storage areas of the storage subsystem 170, allocated to the LDEV's 174 to 176.

Next, a case where the storage subsystems 171 to 173 are externally connected to the storage subsystem 170 will be described.

An example where LDEV's 177 to 179 of the storage subsystems 171 to 173 are allocated to the LDEV's 174 to 176 of the storage subsystem 170, respectively, will be described. In this case, no physical data storage area of the storage subsystem 170 has been allocated to the LDEV's 174 to 176.

In this case, upon reception of a data writing request targeting the LDEV 174, the storage subsystem 170 transmits a data writing request for writing target data of the request in the LDEV 177 to the storage subsystem 171. The storage subsystem 171 stores the target data of the writing request in a physical data storage area of the storage subsystem 171 allocated to the LDEV 177.

Similarly, the storage subsystem 170 that has received data writing requests targeting the LDEV's 175 and 176 transmits data writing requests for writing the target data of the requests in the LDEV's 178 and 179 to the storage subsystems 172 and 173, respectively.

On the other hand, upon reception of a data reading request targeting the LDEV 174, the storage subsystem 170 transmits a data reading request for reading the target data of the request from the LDEV 177 to the storage subsystem 171. The storage subsystem 171 reads the target data of the reading request from the physical data storage area of the storage subsystem 171, allocated to the LDEV 177, and transmits the data to the storage subsystem 170. The storage subsystem 170 transmits the data transmitted from the storage subsystem 171 to a reading request issuance source.

Similarly, the storage subsystem 170 that has received data reading requests targeting the LDEV's 175 and 176 transmits data reading requests for reading the target data of the requests from the LDEV's 178 and 179 to the storage subsystems 172 and 173.

The storage subsystem 170 is connected to the host servers 110 to 112 via a storage area network (SAN). On the other hand, the storage subsystems 171 to 173 are externally connected to the storage subsystem 170 via the SAN. In the example of FIG. 1, the plurality of SAN switches 130 to 135 constitute one or more SAN's.

In the example of FIG. 1, the storage subsystem 170 includes three LDEV's 174 to 176. However, the storage subsystem 170 may include more LDEV's. The physical data storage area of the storage subsystem 170 may be allocated to at least one of the LDEV's.

Hardware configurations of the storage subsystems 170 to 173 will be described below referring to FIG. 2F.

Next, a hardware configuration of each device constituting the computer system shown in FIG. 1 will be described referring to FIGS. 2A to 2G.

FIG. 2A is a block diagram showing a hardware configuration of the host server 110 of the first embodiment of this invention.

Hardware configurations of the host servers 111 and 112 are similar to that of the host server 110, and thus description thereof will be omitted.

The host server 110 of this embodiment includes an I/F 201, a processor 202, a memory 203, a disk drive 204, and a host bus adaptor (HBA) 205 which are interconnected.

The processor 202 executes software stored in the memory 203.

For example, the memory 203 is a semiconductor memory to store the software executed by the processor 202 and other data.

For example, the disk drive 204 is a hard disk drive (HDD) to store the software executed by the processor 202 and other data. In an example of FIG. 2A, the disk drive 204 stores the application program 113, the OS 114, the application information collection agent 115, and the host information collection agent 116. Those pieces of software are copied in the memory 203 to be executed by the processor 202 when necessary.

The disk drive 204 may be selected from any types of disk drives, such as an optical disk drive, in addition to the HDD. Alternatively, the disk drive 204 may be replaced by a semiconductor memory such as a flash memory.

The I/F 201 is an interface connected to the LAN 105. The I/F 201 communicates with the other computers or the like connected to the LAN 105.

The HBA 205 is an interface connected to at least one of the SAN switches 130 to 132. The HBA 205 includes one or more ports 136 connected to the SAN switches 130 to 132. The HBA 205 communicates data written in the storage subsystem 170 or data read from the storage subsystem 170 via the SAN switches 130 to 132. The HBA 205 executes communication based on, e.g., a fibre channel (FC) protocol. However, any other types of protocols may be applied.

Figure 2B:
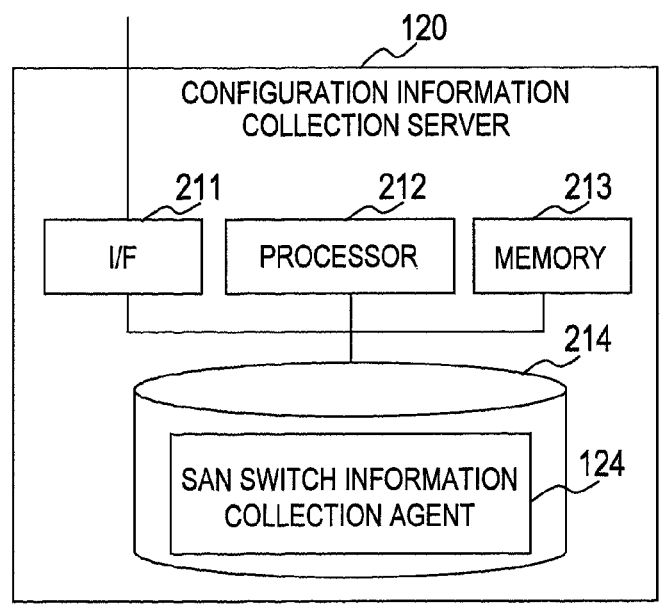
FIG. 2B is a block diagram showing a hardware configuration of a configuration information collection server of the first embodiment of this invention.

FIG. 2B is a block diagram showing a hardware configuration of the configuration information collection server 120 of the first embodiment of this invention.

The configuration information collection server 120 of this embodiment includes an I/F 211, a processor 212, a memory 213, and a disk drive 214 which are interconnected.

The processor 212 executes software stored in the memory 213.

For example, the memory 213 is a semiconductor memory to store the software executed by the processor 212 and other data.

For example, the disk drive 214 is an HDD to store the software executed by the processor 212 and other data. In an example of FIG. 2B, the disk drive 214 stores the SAN switch information collection agent 124. The SAN switch information collection agent 124 is copied in the memory 213 to be executed by the processor 212 when necessary. The disk drive 214 may be selected from any types of disk drives and a semiconductor memory as in the case of the disk drive 204.

The I/F 211 is an interface connected to the LAN 105. The I/F 211 communicates with the other computers or the like connected to the LAN 105.

Figure 2C:
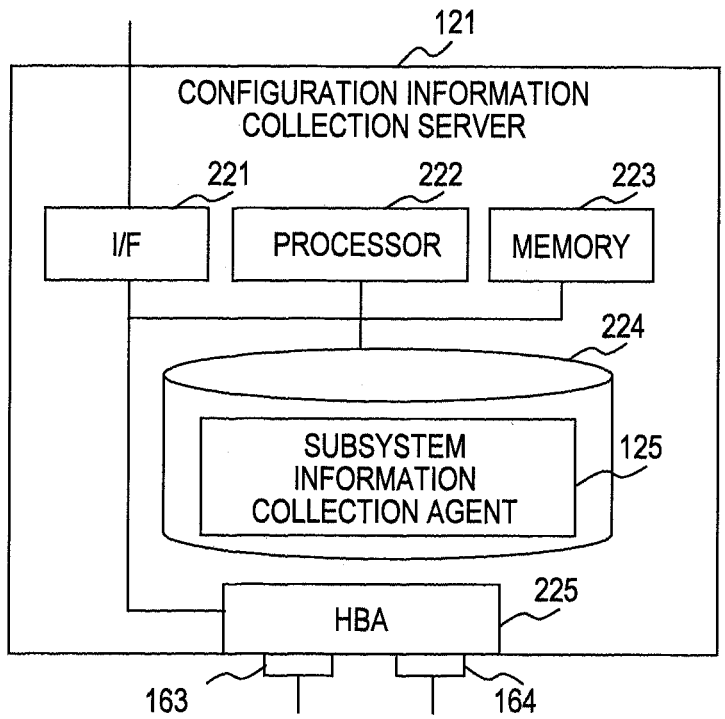
FIG. 2C is a block diagram showing a hardware configuration of another configuration information collection server of the first embodiment of this invention.

FIG. 2C is a block diagram showing a hardware configuration of the configuration information collection server 121 of the first embodiment of this invention.

The configuration information collection server 121 of this embodiment includes an I/F 221, a processor 222, a memory 223, a disk drive 224, and an HBA 225 which are interconnected.

The processor 222 executes software stored in the memory 223.

For example, the memory 223 is a semiconductor memory to store the software executed by the processor 222 and other data.

For example, the disk drive 224 is an HDD to store the software executed by the processor 222 and other data. In an example of FIG. 2C, the disk drive 224 stores the subsystem information collection agent 125. The subsystem information collection agent 125 is copied in the memory 223 to be executed by the processor 222 when necessary. The disk drive 224 may be selected from any types of disk drives and a semiconductor memory as in the case of the disk drive 204.

The I/F 221 is an interface connected to the LAN 105. The I/F 221 communicates with the other computers or the like connected to the LAN 105.

The HBA 225 is an interface connected to at least one of the SAN switches 130 to 135. The HBA 225 includes one or more ports (for example, port 163 and 164) connected to the SAN switches 130 to 135. The HBA 225 communicates with the storage subsystems 170 to 173 via the SAN switches 130 to 135 to obtain performance information regarding the storage subsystems 170 to 173. The HBA 225 uses, e.g., a fibre channel (FC) protocol. However, any other types of protocols may be applied.

Figure 2D:
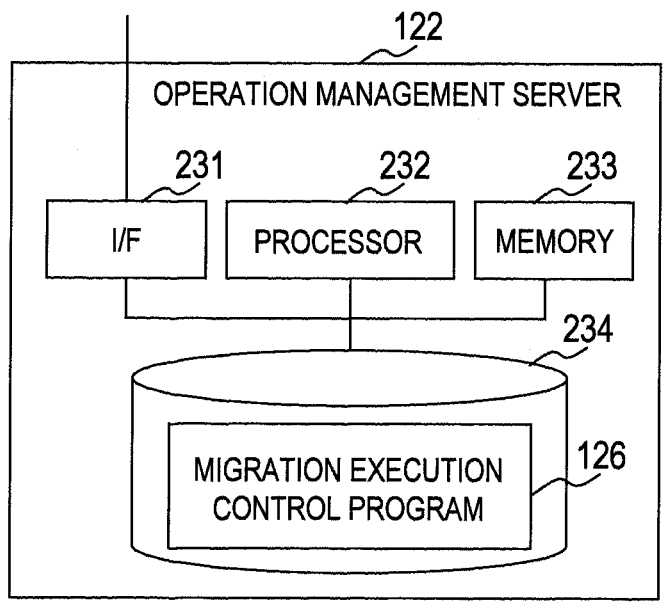
FIG. 2D is a block diagram showing a hardware configuration of a operation management server of the first embodiment of this invention.

FIG. 2D is a block diagram showing a hardware configuration of the operation management server 122 of the first embodiment of this invention.

The operation management server 122 of this embodiment includes an I/F 231, a processor 232, a memory 233, and a disk drive 234 which are interconnected.

The processor 232 executes software stored in the memory 233.

For example, the memory 233 is a semiconductor memory to store the software executed by the processor 232 and other data.

For example, the disk drive 234 is an HDD to store the software executed by the processor 232 and other data. In an example of FIG. 2D, the disk drive 234 stores the migration execution control program 126. The migration execution control program 126 is copied in the memory 233 to be executed by the processor 232 when necessary. The disk drive 234 may be selected from any types of disk drives and a semiconductor memory as in the case of the disk drive 204.

The I/F 231 is an interface connected to the LAN 105. The I/F 231 communicates with the other computers or the like connected to the LAN 105.

Figure 2E:
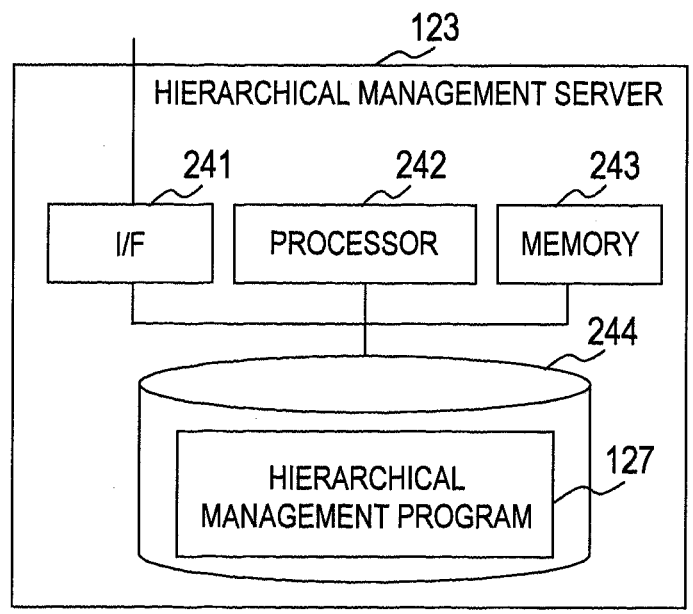
FIG. 2E is a block diagram showing a hardware configuration of a hierarchical management server of the first embodiment of this invention.

FIG. 2E is a block diagram showing a hardware configuration of the hierarchical management server 123 of the first embodiment of this invention.

The hierarchical management server 123 of this embodiment includes an I/F 241, a processor 242, a memory 243, and a disk drive 244 which are interconnected.

The processor 242 executes software stored in the memory 243.

For example, the memory 243 is a semiconductor memory to store the software executed by the processor 242 and other data.

For example, the disk drive 244 is an HDD to store the software executed by the processor 242 and other data. In an example of FIG. 2E, the disk drive 244 stores the hierarchical management program 127. The hierarchical management program 127 is copied in the memory 243 to be executed by the processor 242 when necessary. The disk drive 244 may be selected from any types of disk drives and a semiconductor memory as in the case of the disk dive 204.

The I/F 241 is an interface connected to the LAN 105. The I/F 241 communicates with the other computers or the like connected to the LAN 105.

Figure 2F:
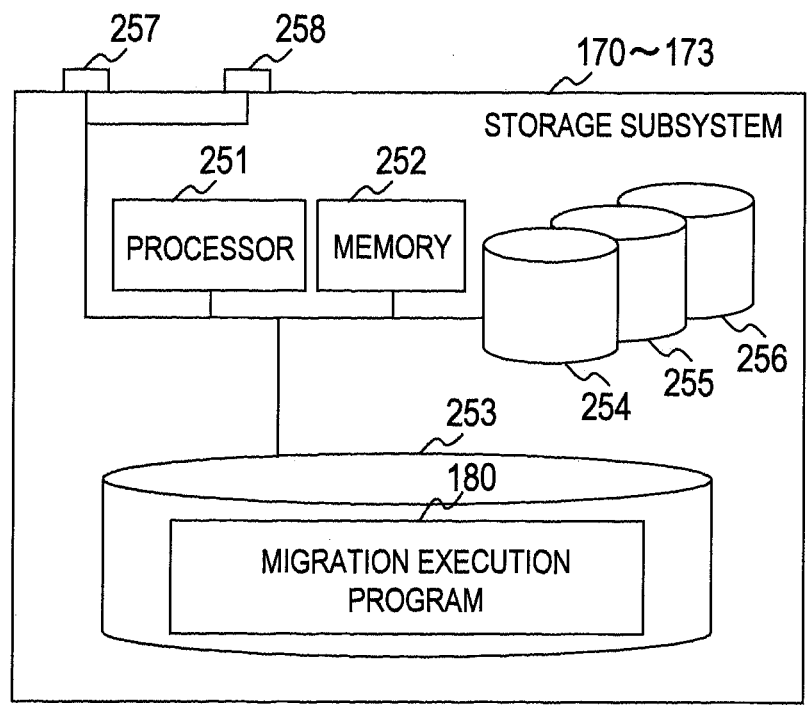
FIG. 2F is a block diagram showing hardware configurations of storage subsystems of the first embodiment of this invention.

FIG. 2F is a block diagram showing hardware configurations of the storage subsystems 170 to 173 of the first embodiment of this invention.

Each of the storage subsystems 170 to 173 of this embodiment includes a processor 251, a memory 252, a disk drive 253, physical disks 254 to 256, and ports 257 and 258 which are interconnected.

The processor 251 executes software stored in the memory 252. FIG. 2F shows only one processor 251. However, each of the storage subsystems 170 to 173 may include a plurality of processors 251.

For example, the memory 252 is a semiconductor memory to store the software executed by the processor 251 and other data.

For example, the disk drive 253 is an HDD to store the software executed by the processor 251 and other data. In an example of FIG. 2F, the disk drive 253 stores the migration execution program 180. The migration execution program 180 is copied in the memory 252 to be executed by the processor 251 when necessary. The disk drive 253 may be selected from any types of disk drives and a semiconductor memory as in the case of the disk drive 204.

The migration execution program 180 is a type of management programs of the storage subsystems 170 to 173. Specifically, the migration program 180 is executed to migrate data stored in one of the LDEV's 174 to 179 to another of the LDEV's 174 to 179.

According to this embodiment, for example, the processor 251 of the storage subsystem 170 executes the migration execution program 180 to migrate data stored in one of the LDEV's 174 to 176 to another thereof. When the LDEV's 177 to 179 are allocated to the LDEV's 174 to 176 through external connection, data stored in one of the LDEV's 177 to 179 of the storage subsystems 171 to 173 is migrated to another by the aforementioned migration. Thus, when the storage subsystems 171 to 173 are externally connected to the storage subsystem 170, the migration execution program 180 may not be stored in the disk drive 253 of the storage subsystems 171 to 173.

For example, each of the physical disks 254 to 256 is an HDD to store data used by the application program 113 of the host servers 110 to 112. Physical data storage areas of the physical disks 254 to 256 are allocated to the LDEV's 174 to 179. Each of the storage subsystems 170 to 173 may include a plurality of physical disks 254 to 256. The plurality of physical disks 254 to 256 may constitute redundant arrays of inexpensive disks (RAID).

One of the LDEV's 174 to 179 may be allocated to the other one of the LDEV's 174 to 179 in place of direct allocation of physical data storage areas as described above referring to FIG. 1. In this case, a physical data storage area is indirectly allocated to each of the LDEV's 174 to 179 via the corresponding one of the LDEV's 174 to 179. As a result, as described above referring to FIG. 1, a physical data storage area of one of the storage subsystems 170 to 173 may be allocated to the LDEV of the other one of the storage subsystems 170 to 173. When no physical data storage area of the storage subsystems 170 to 173 is allocated to any one of the LDEVs of the storage subsystems 170 to 173, the storage subsystems 170 to 173 do not need to include the physical disks 254 to 256. For example, when the storage subsystem 170 includes only three LDEV's 174 to 176 and the LDEV's 177 to 179 are allocated to the LDEV's 174 to 176, respectively, the storage subsystem 170 does not need to include the physical disks 254 to 256.

Each of the ports 257 and 258 is connected to one of the SAN switches 130 to 135. Each of the substorage systems 170 to 173 may include an optional number of ports 257 and 258. Each of the storage subsystems 170 to 173 communicates with the host servers 110 to 112 or the other of the storage subsystems 170 to 173 via the ports 257 and 258. When each of the storage subsystems 170 to 173 includes a plurality of processors 251, each of the ports 257 and 258 is allocated to at least one processor 251. Each processor 251 controls the allocated one of the ports 257 and 258 to execute communication with each of the host servers 110 to 112 or the like.

Figure 2G:
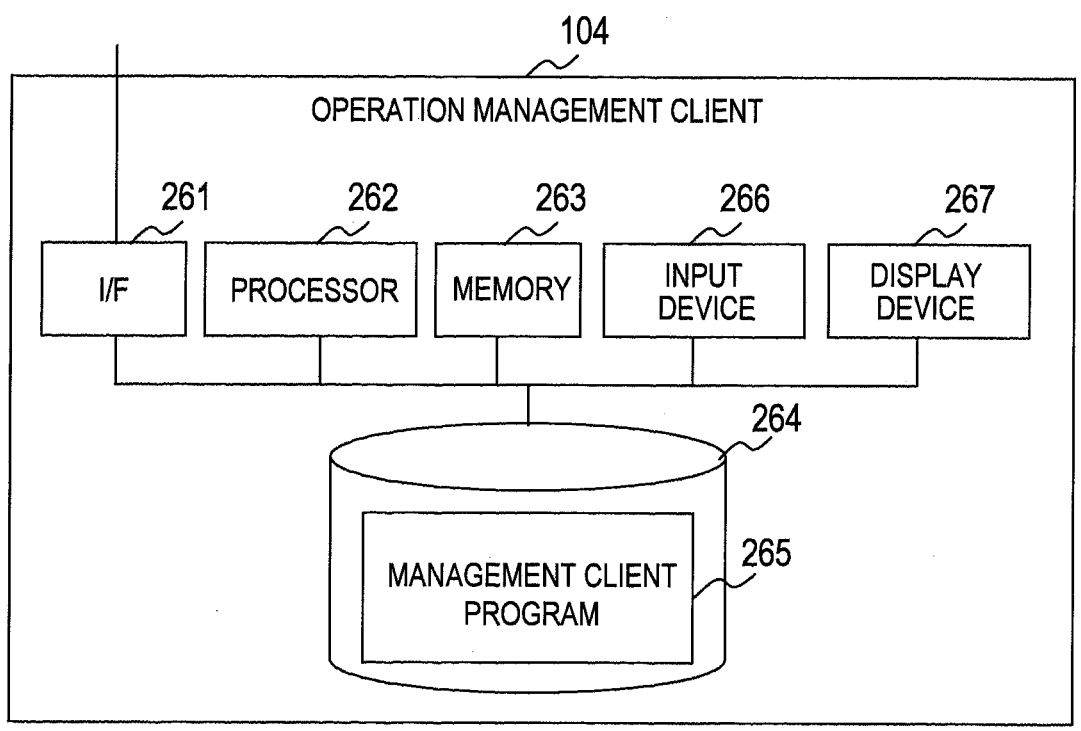
FIG. 2G is a block diagram showing a hardware configuration of a operation management client of the first embodiment of this invention.

FIG. 2G is a block diagram showing a hardware configuration of the operation management client 104 of the first embodiment of this invention.

The operation management client 104 of this embodiment includes an I/F 261, a processor 262, a memory 263, a disk drive 264, an input device 266, and a display device 267 which are interconnected.

The processor 262 executes software stored in the memory 263.

For example, the memory 263 is a semiconductor memory to store the software executed by the processor 262 and other data.

For example, the disk drive 264 is an HDD to store the software executed by the processor 262 and other data. In an example of FIG. 2G, the disk drive 264 stores a management client program 265. The management client program 265 is copied in the memory 263 to be executed by the processor 262 when necessary. The disk drive 264 may be selected from any types of disk drives and a semiconductor memory as in the case of the disk drive 204.

The I/F 261 is an interface connected to the LAN 105. The I/F 261 communicates with the other computers or the like (especially the operation management server 122) connected to the LAN 105.

For example, the input device 266 is a keyboard, a pointing device, or the like. A user can input various pieces of information to the operation management client 104 by operating the input device 266.

For example, the display device 267 is an image display device such as a CRT or a liquid crystal display device. The display device 267 can provide various pieces of information to the user by displaying characters or graphics.

The management client program 265 is a program for executing setting for the migration execution control program 126. For example, the processor 262 that executes the management client program 265 can transmit information which is inputted by the user by operating the input device 266, to the operation management server 122 via the I/F 261. The migration execution control program 126 of the operation management server 122 can set information received from the operation management client 104 in a table described below.

Further, the processor 262 that executes the management client program 265 can display information received from the operation management server 122 on the display device 267. For example, information requested to be displayed by the migration execution control program 126 is displayed on the display device 267.

Next, referring to FIGS. 3A and 3B, functions of the computer system of this embodiment will be described. Explanation of portions of FIGS. 3A and 3B already referred to in FIGS. 1 to 2F will be omitted.

Figure 3A:
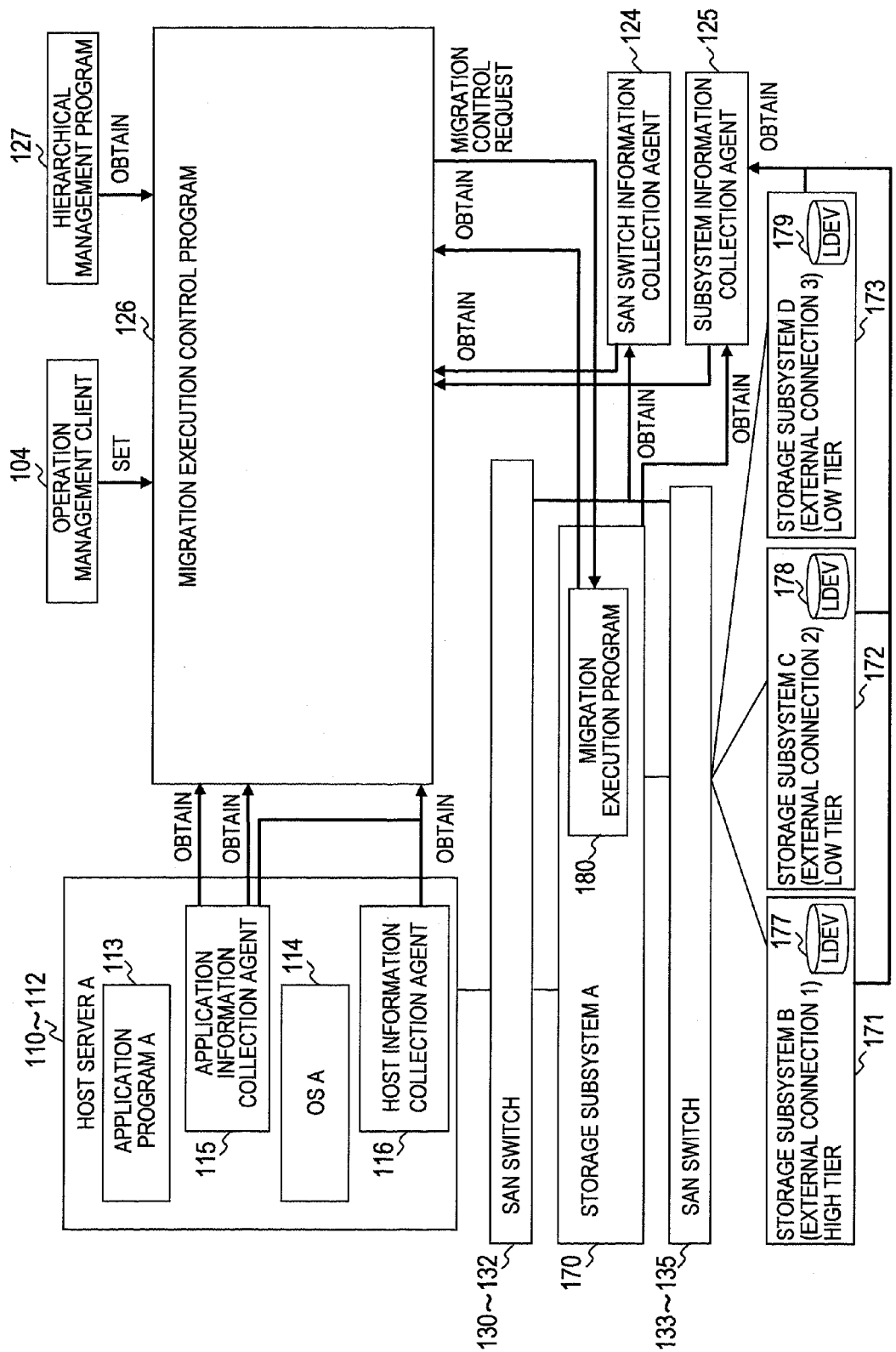
FIG. 3A is a functional block diagram of the computer system according to the first embodiment of this invention.

FIG. 3A is a functional block diagram of the computer system according to the first embodiment of this invention.

Figure 3B:
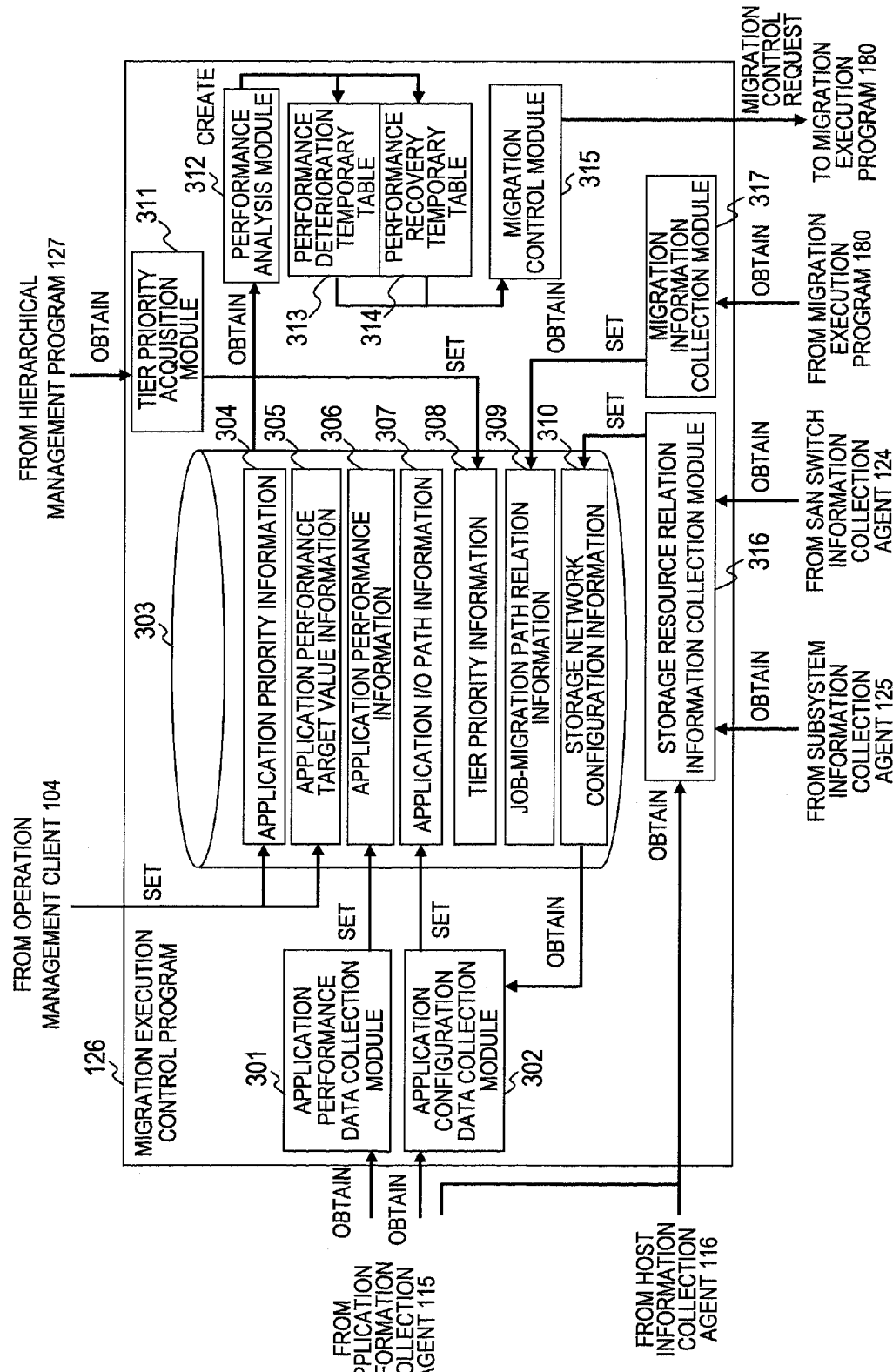
FIG. 3B is a functional block diagram of a migration execution control program included in the computer system of the first embodiment of this invention.

FIG. 3B is a functional block diagram of the migration execution control program 126 included in the computer system of the first embodiment of this invention.

Storage areas of the externally connected storage subsystems 171 to 173 are classified based on tiers. For example, the tiers may be set according to performance or the like of the storage subsystems 171 to 173. Generally, the application program 113 required of high performance uses a storage area of a high tier while the application program 113 not required of high performance uses a storage area of a low tier. For example, data of a high access frequency and data needed to be accessed at a high speed may be stored in the storage area of the high tier, and other pieces of data (e.g., backup data) may be stored in the storage area of the low tier.

Optional storage areas of the computer system can be classified based on tiers. For example, the storage subsystems 170 to 173 may be classified based on tiers, and the LDEV's 174 to 179 may be classified based on tiers. If the storage subsystems 170 to 173 are classified based on tiers, identical tiers are set in all the LDEV's 174 or the like which belong to one of the storage subsystems 170 to 173.

According to the first embodiment, as shown in FIG. 3A, the storage subsystem 171 is classified into a high tier while the storage subsystems 172 and 173 are classified into low tiers. In this case, all the LDEV's 177 belonging to the storage subsystem 171 are classified into high tiers, while all the LDEV's 178 and 179 belonging to the storage subsystems 172 and 173 are classified into low tiers. In this case, for example, the storage subsystem 171 may be a high-performance storage subsystem, while the storage subsystems 172 and 173 are not so high in performance but are inexpensive storage subsystems.

On the other hand, if the LDEV's 174 to 179 are classified based on tiers, at least one on the LDEV's 174 to 179 of high tiers and at least another one on the LDEV's 174 to 179 of low tiers may be both present in one of the storage subsystems 170 to 173. In this case, high-performance physical disks 254 or the like may be allocated to the LDEV's 174 or the like of the high tiers, while physical disks 254 or the like not so high in performance but inexpensive may be allocated to the LDEV's 174 or the like of the low tiers (refer to a second embodiment).

The migration execution control program 126 held by the operation management sever 122 includes an application performance data collection module 301, an application configuration data collection module 302, a database (DB) 303, a tier priority acquisition module 311, a performance analysis module 312, a performance deterioration temporary table 313, a performance recovery temporary table 314, a migration control module 315, a storage resource relation information collection module 316, and a migration information collection module 317.

The application performance data collection module 301, the application configuration data collection module 302, the tier priority acquisition module 311, the performance analysis module 312, the migration control module 315, the storage resource relation information collection module 316, and the migration information collection module 317 are subprograms constituting parts of the migration execution control program 126.

The DB 303, the performance deterioration temporary table 313, and the performance recovery temporary table 314 are equivalent to parts of storage areas of the memory 233 or the disk drive 234 of the operation management server 122.

The DB 303 stores application priority information 304, application performance target value information 305, application performance information 306, application I/O path information 307, tier priority information 308, job-migration path relation information 309, and storage network configuration information 310.

Figure 8:
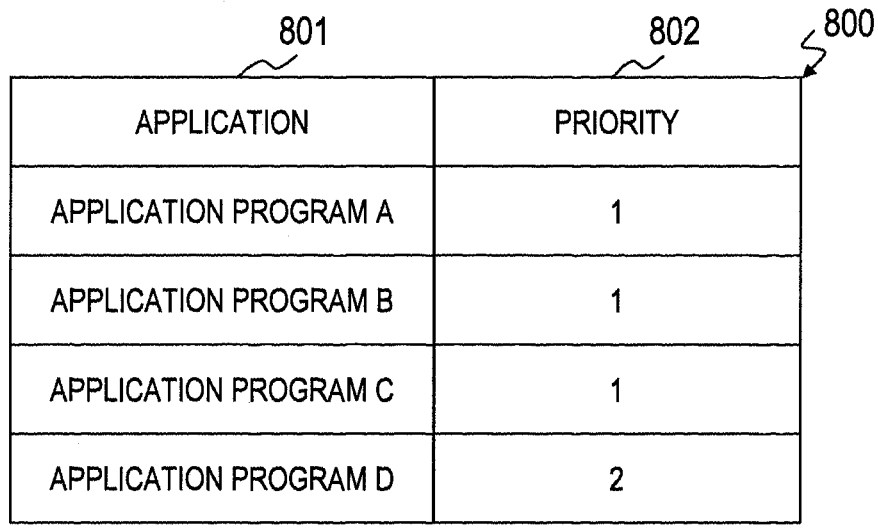
FIG. 8 is an explanatory diagram of application priority information stored in the database of the first embodiment of this invention.

The operation management client 104 stores pieces of information input by the user as the application priority information 304 and the application performance target value information 305 in the DB 303 (refer to FIGS. 8 and 10).

Figure 24:
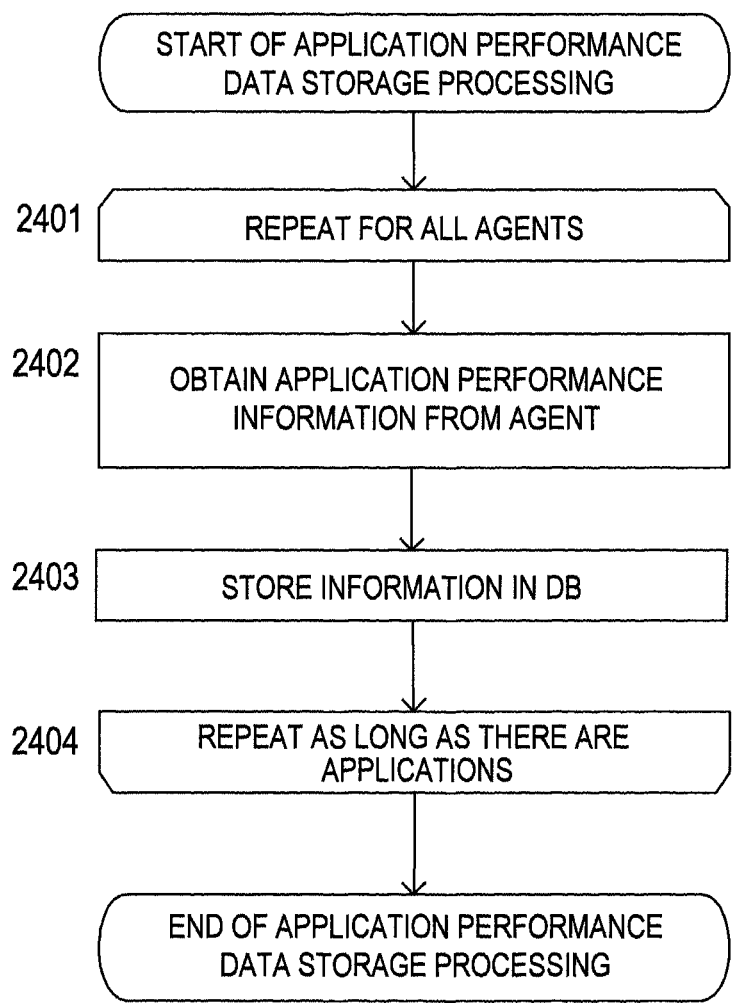
FIG. 24 is a flowchart showing application performance data storage processing executed by the migration execution control program of the first embodiment of this invention.

The application performance data collection module 301 stores information obtained from the application information collection agent 115 as the application performance information 306 in the DB 303 (refer to FIGS. 6 and 24).

Figure 23:
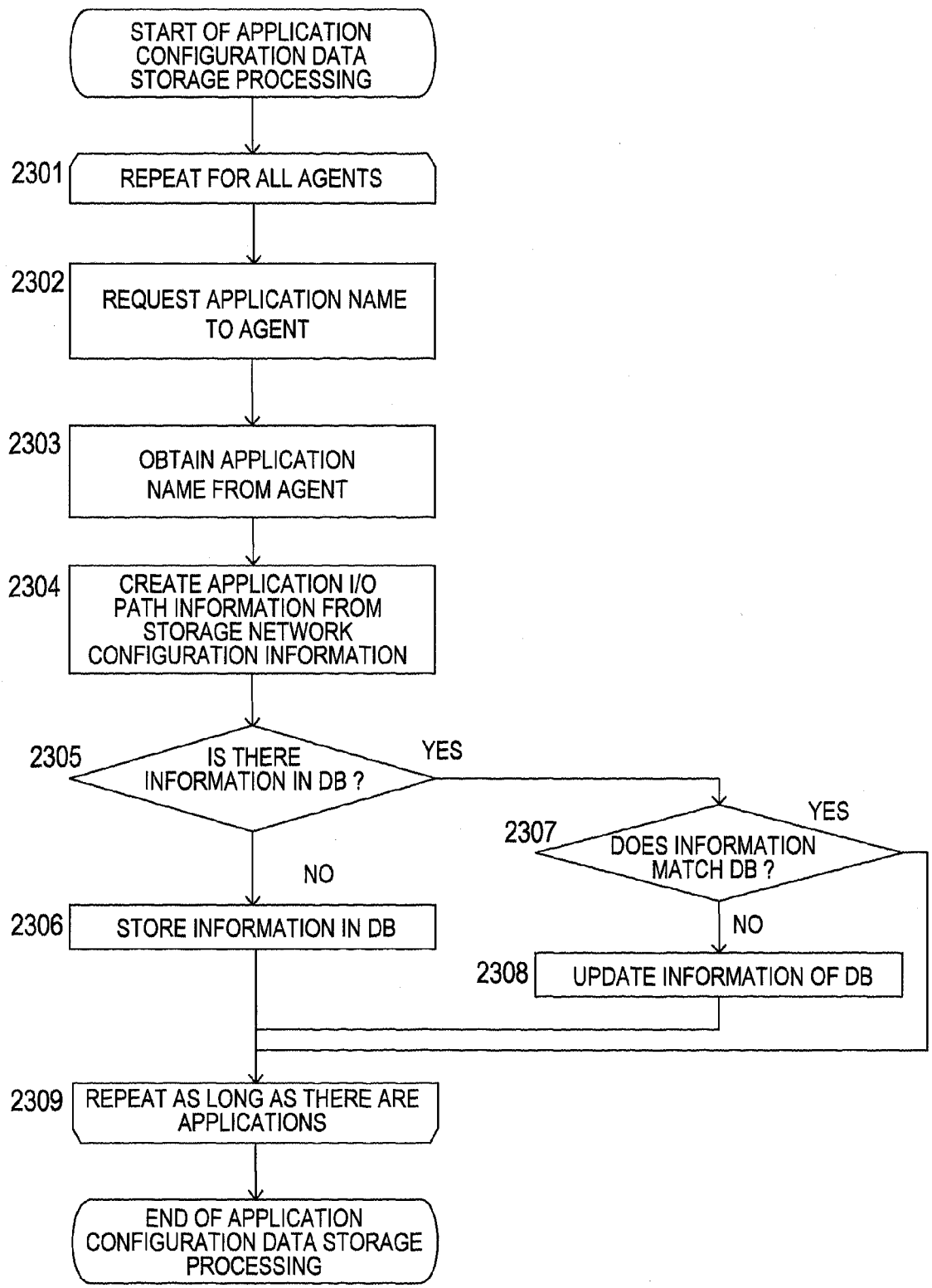
FIG. 23 is a flowchart showing application configuration data storage processing executed by the migration execution control program of the first embodiment of this invention.

The application configuration data collection module 302 stores information obtained from the allocation information collection agent 115 as the application I/O path information 307 in the DB 303 (refer to FIGS. 5 and 23).

Figure 9:
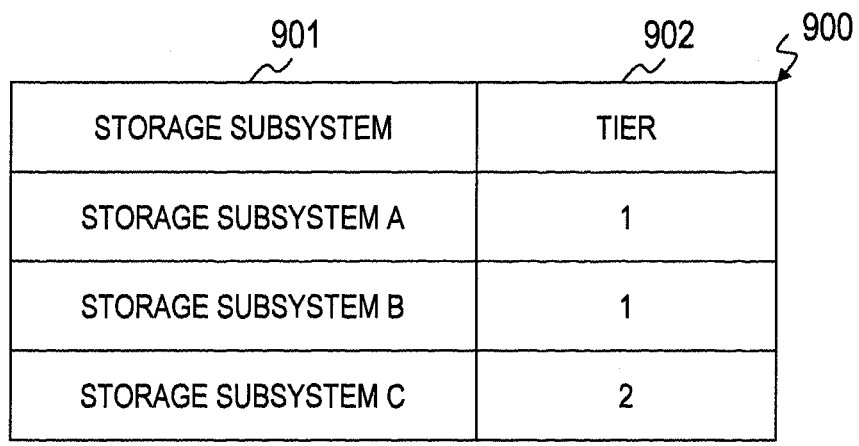
FIG. 9 is an explanatory diagram of tier priority information stored in the database of the first embodiment of this invention.
Figure 22:
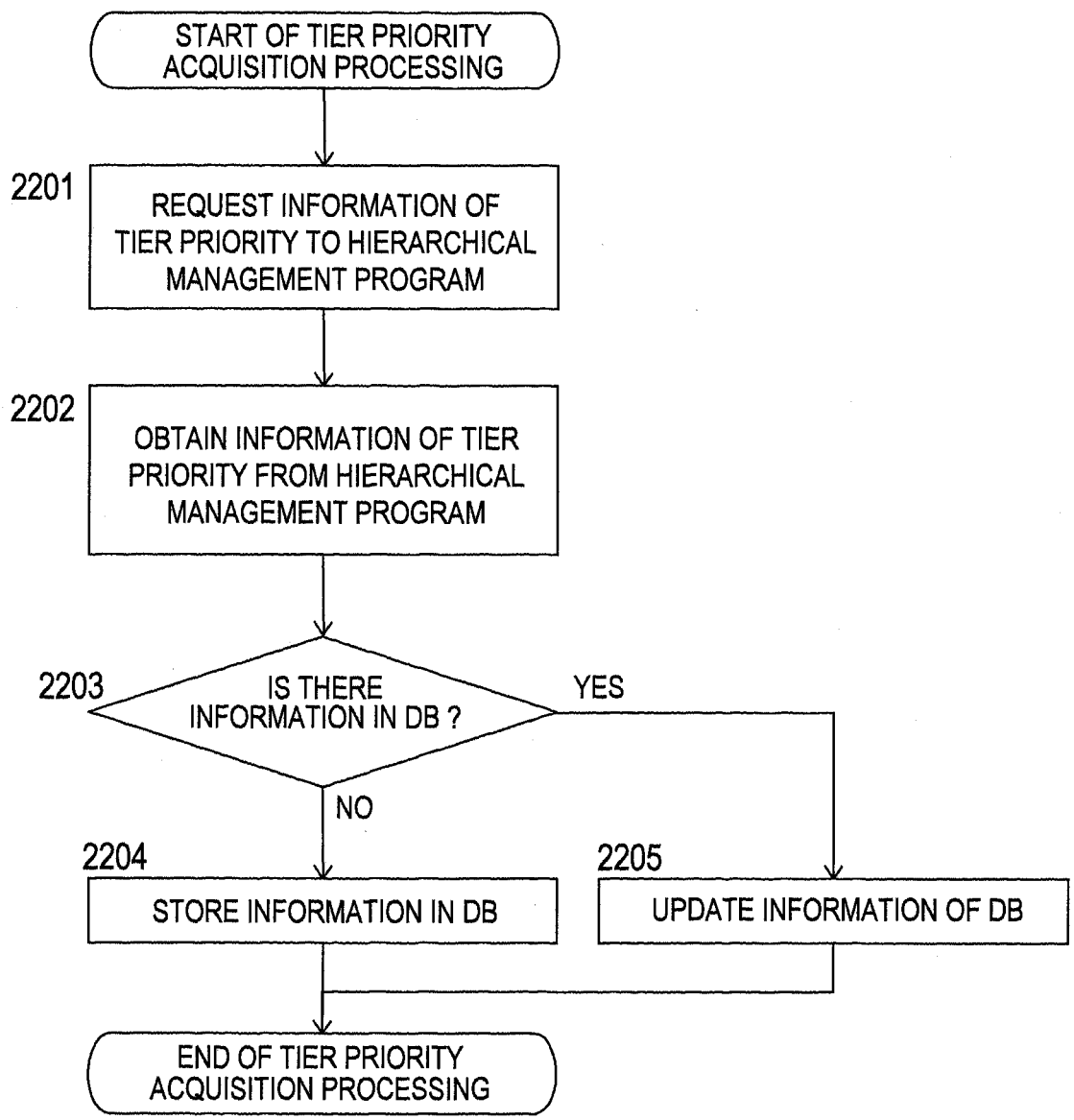
FIG. 22 is a flowchart showing tier priority acquisition processing executed by the migration execution control program of the first embodiment of this invention.

The tier priority acquisition module 311 stores information obtained from the hierarchical management program 127 as the tier priority information 308 in the DB 303 (refer to FIGS. 9 and 22).

Figure 20:
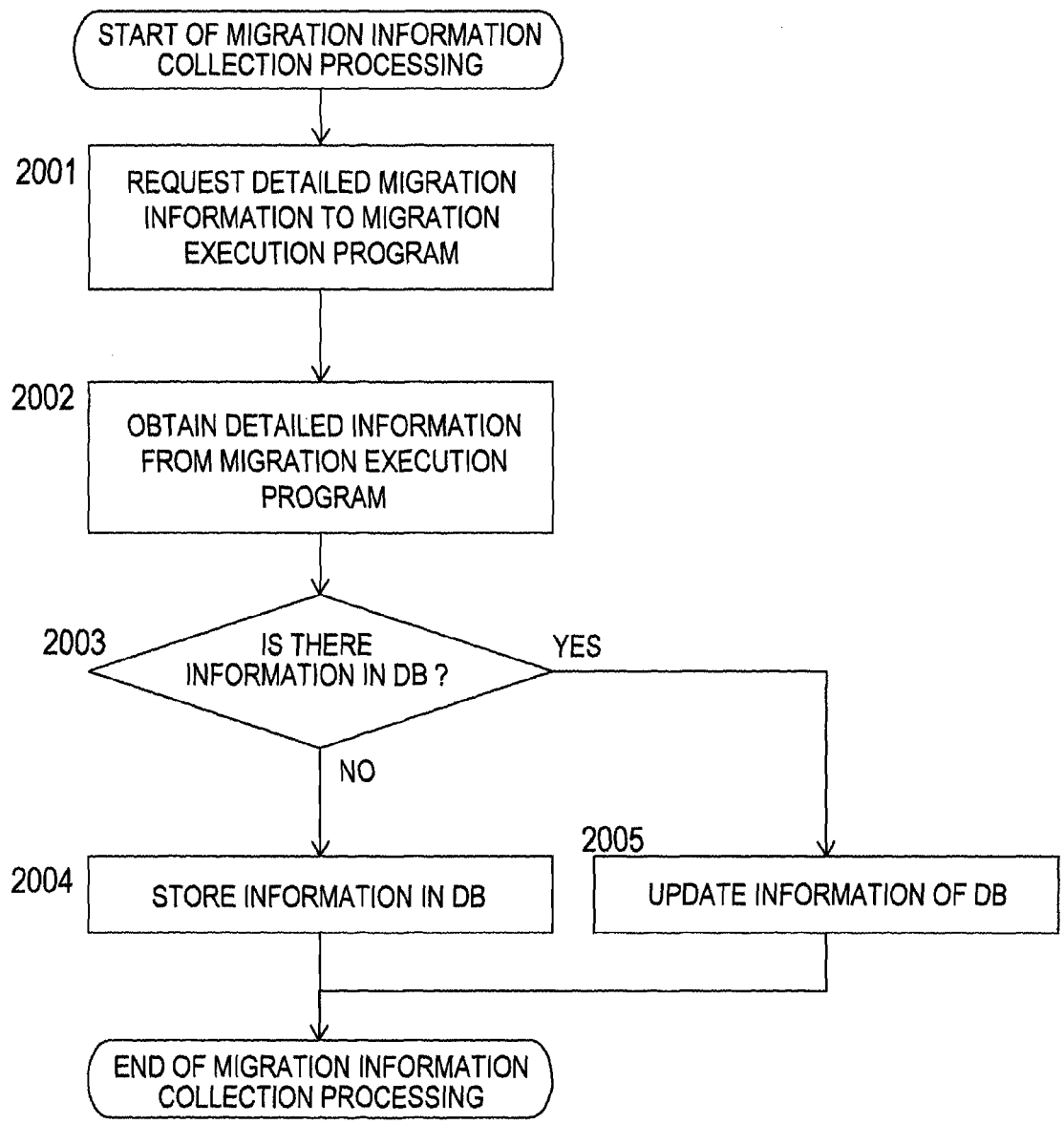
FIG. 20 is a flowchart showing migration information collection processing executed by the migration execution control program of the first embodiment of this invention.

The migration information collection module 317 stores information obtained from the migration execution program 180 as the job-migration path relation information 309 in the DB 303 (refer to FIGS. 7 and 20).

The storage resource relation information collection module 316 stores pieces of information obtained from the application information collection agent 115, the host information collection agent 116, the SAN switch information collection agent 124, and the subsystem information collection agent 125 as the storage network configuration information 310 in the DB 303 (refer to FIGS. 11 to 17 and 21). The SAN switch information collection agent 124 obtains information to be transmitted to the storage resource relation information collection module 316 from the SAN switches 130 to 135. The subsystem information collection agent 125 obtains information to be transmitted to the storage resource relation information collection module 316 from the storage subsystems 170 to 173.

Figure 25:
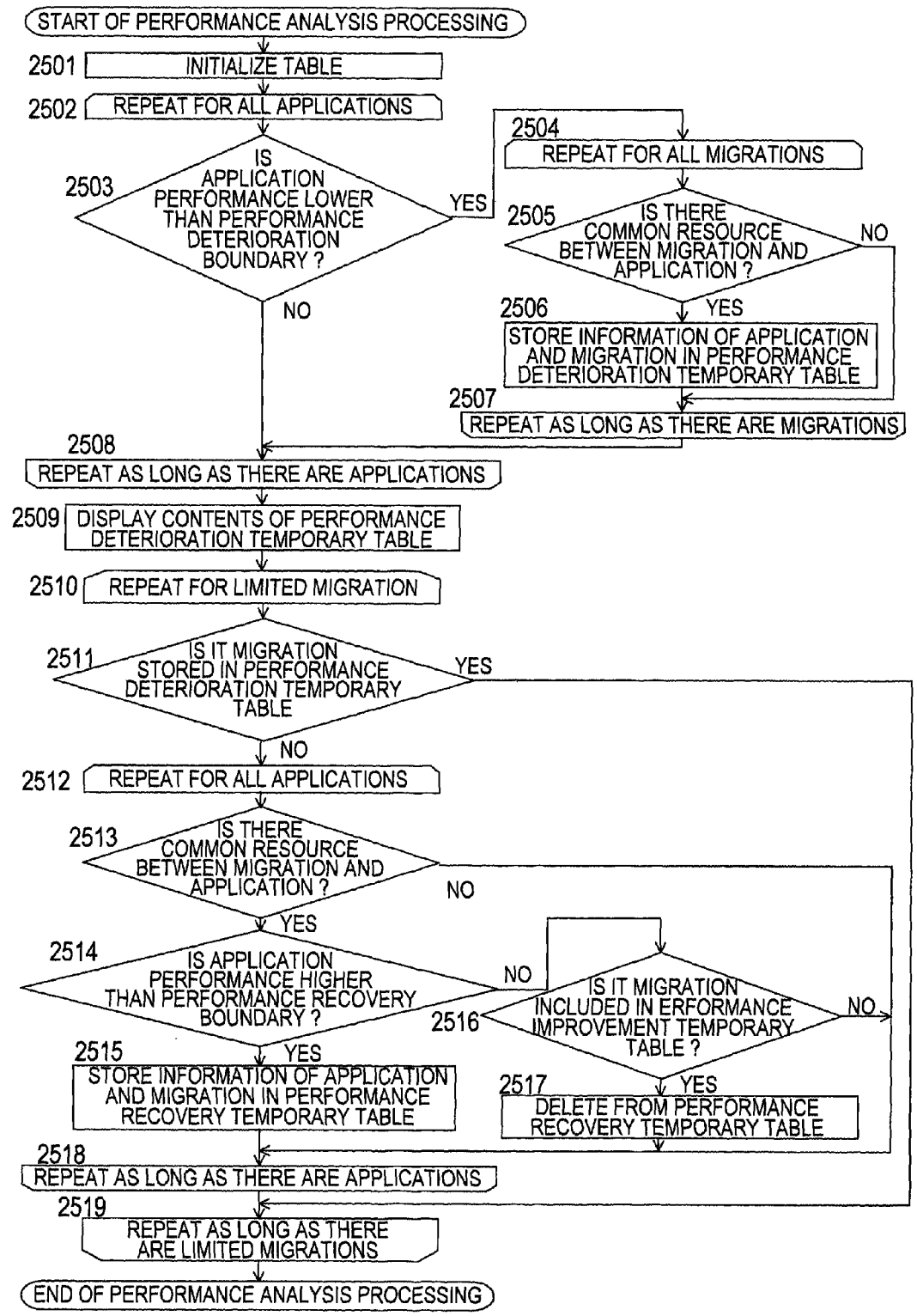
FIG. 25 is a flowchart showing performance analysis processing executed by the migration execution control program of the first embodiment of this invention.

The performance analysis module 312 creates a performance deterioration temporary table 313 and a performance recovery temporary table 314 based on information obtained from the DB 303 (refer to FIGS. 18, 19, and 25).

The migration control module 315 controls migration execution of the migration execution program 180 based on the performance deterioration temporary tables 313 and the performance recovery temporary tables 314 (refer to FIGS. 26 to 33).

Referring to FIGS. 3A and 3B, an outline of the first embodiment will be given.

The application job realized by executing the application program 113 executes data I/O targeting at least one of the LDEV's 174 to 176 of the storage subsystem 170 via the OS 114.

The migration execution program 180 migrates data stored in one of the LDEV's 177 to 179 to another when necessary. The migration may be executed to improve performance by dispersing concentrated loads when the data I/O loads of the application program 113 (in other words, the data I/O loads of the application job) are concentrated in one of the resources of the computer system. Alternatively, the migration may be executed to manage data stored in the storage subsystems 171 to 173.

For example, relatively important data (e.g., data of a high access frequency or data needed to be accessed at a high speed) may be stored in the LDEV 177 of the storage subsystem 171 of the high tier, while relatively unimportant data may be stored in the LDEV's 178 and 179 of the storage subsystems 172 and 173 of the low tiers. However, the importance of the data stored in the LDEV 177 may drop with a passage of time. In such a case, the migration execution program 180 can migrate the data stored in the LDEV 177 to the LDEV's 178 or 179. If the storage subsystems 172 and 173 of the low tiers are inexpensive than the storage subsystem 171 of the high tier, data storage costs can be reduced by the migration as described above.

Upon reception of a migration job, the migration execution program 180 creates, a plurality of copy jobs, and executes the copy jobs. For example, when a migration job is input to migrate data stored in the LDEV 177 to the LDEV 178, a plurality of copy jobs are created to copy the data stored in the LDEV 177 to the LDEV 178. Each copy job copies a part of the data stored in the LDEV 177 to the LDEV 178. In other words, data I/O occurs in the LDEV by each copy job.

The processor 251 that executes the migration execution program 180 can execute the plurality of copy jobs in parallel. Migration execution becomes faster as the number of copy jobs to be executed in parallel increases. However, loads of the data I/O by the migration job on the resources become greater.

When a certain resource is used for both of data I/O of the application program 113 and data I/O of the copy job, data I/O loads are concentrated on the resource to cause a bottleneck. As a result, performance of the application program 113 may be reduced. In this case, as migration loads are reduced by limiting the number of parallel copy jobs, recovery of the performance of the application program 113 can be expected. However, if the number of parallel copy jobs is limited, much more time is necessary until the end of migration. Accordingly, it is necessary to judge which of the performance recovery of the application program 113 and a quick end of migration is to be given higher priority.

The migration execution control program 126 of the first embodiment of this invention specifies a resource in which loads are concentrated when concentration of the data I/O load of the application program 113 and the data I/O load of the copy job causes a drop in performance of the application program 113. Then, the migration execution control program 126 judges whether to limit the execution of migration based on priority information set in the application program and tier information of the data storage area (i.e., whether to limit the number of parallel copy jobs). Processing therefor will be described below.

Figure 4:
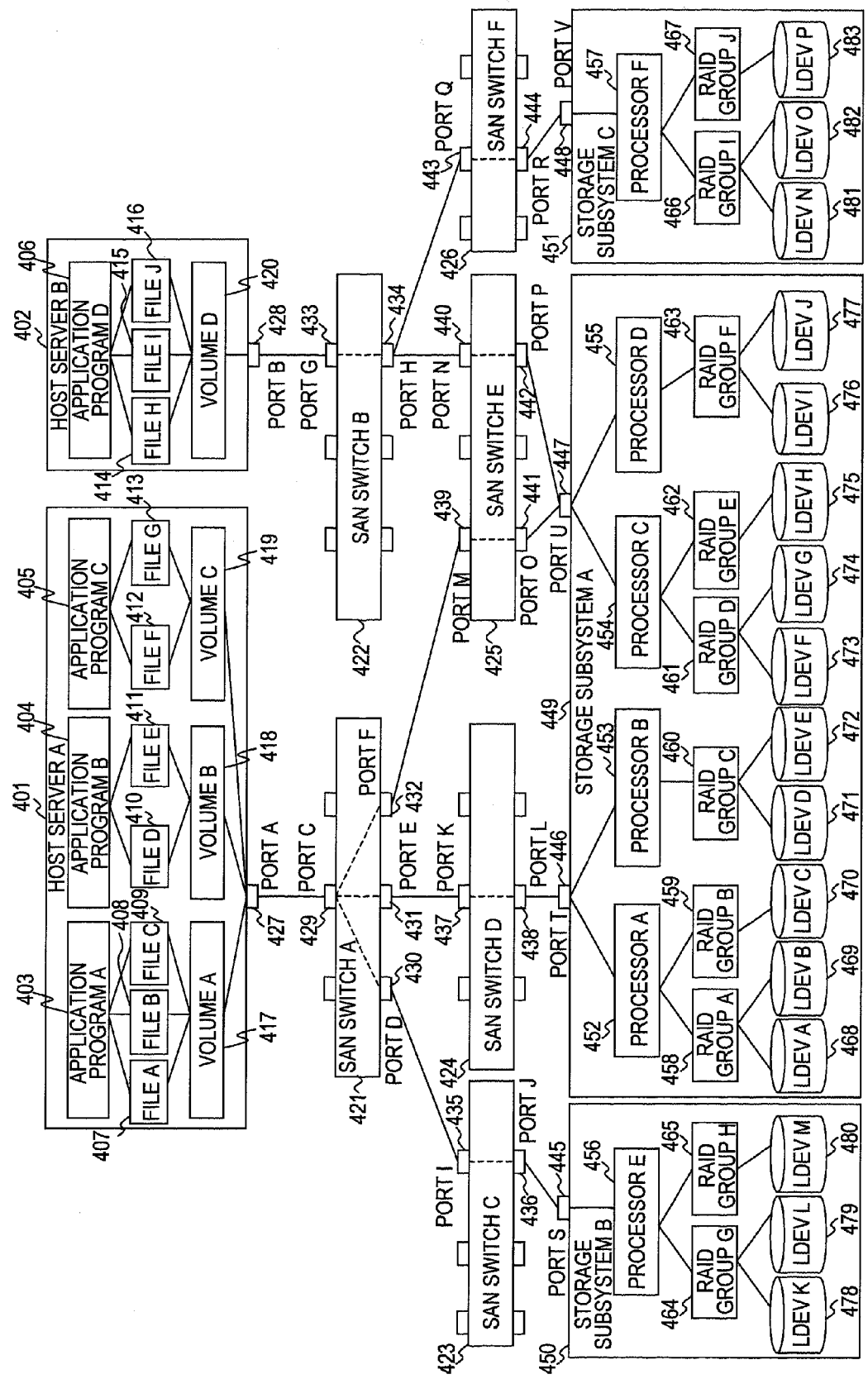
FIG. 4 is an explanatory diagram showing a resource relation in the computer system of the first embodiment of this invention.

FIG. 4 is an explanatory diagram showing a resource relation in the computer system of the first embodiment of this invention.

Resources indicate physical or logical components of the computer system. For example, the processor 251 of the storage subsystems 170 to 173 is a physical resource, and the LDEV's 174 to 179 of the storage subsystems 170 to 173 are logical resources.

FIG. 4 shows, among resources of the computer system of this embodiment, those used for data I/O of the host servers 110 to 112 to the storage subsystems 170 to 173. In other words, the resources used for the data I/O are resources on which loads are applied by executing data I/O.

In the example of FIG. 4, hardware constituting the computer system includes host servers A401 and B402, SAN switches A421, B422, C423, D424, E425, and F426, and storage subsystems A449, B450, and C451. In the example of FIG. 4, an alphabet added after a resource name (e.g., "A" of "host server A401") is a resource identifier, which is referred to as shown in FIGS. 5 to 19.

The number of resources shown in FIG. 4 does not necessarily match that of resources shown in FIGS. 1 to 3B. This is because portions unnecessary for explanation are omitted in the drawings.

The host servers A401 and B402 are equivalent to any of the host servers 110 to 112 of FIG. 1. In the host server A401, application programs A403, B404, and C405 are operated. In the host server B402, a application program D406 is operated. Those application programs are equivalent to the application program 113 of FIG. 1. The application programs A403 to D406 are resources used for data I/O.

Files A407 to J416 are units with which data I/O services are provided by the OS 114. In the example of FIG. 4, the files A407 to C409 are allocated to the application program A403. The files D410 and E411 are allocated to the application program B404. The files F412 and G413 are allocated to the application program C405. The files H414 to J416 are allocated to the application program D406. The files A407 to J416 store data read/written by the allocated application programs.

Volumes A417 to D420 are managed as areas to store the files A407 to J416 in an external storage system (e.g., the storage subsystem 170) by the OS 114.

As described above, the files A407 to J416, the volumes A417 to D420, and ports A427 and B428 are resources used for data I/O.

In the example of FIG. 4, the files A407 to C409 are stored in the volume A417. The files D410 and E411 are stored in the volume B418. The files F412 and G413 are stored in the volume C419. The files H414 to J416 are stored in the volume D420.

The SAN switches A421 to F426 are equivalent to the SAN switches 130 to 135 of FIG. 1. The SAN switches A421 to F426 include ports C429 to R444 connected to the host servers A401 and B402, the storage subsystems A449 to C451, or the other SAN switches A421 to F426. The SAN switches A421 to F426 and the ports C429 to R444 are also resources used for data I/O. The ports C429 to R444 are equivalent to the ports 139 to 152 of FIG. 1.

The storage subsystems A449 to C451 are equivalent to the storage subsystems 170 to 173 of FIG. 1. The storage subsystems A449 to C451 include ports S445 to V448, processors A452 to F457, RAID groups A458 to J467, and LDEV's A468 to P483 as resources used for data I/O.

The processors A452 to F457 are equivalent to the processor 251 of the storage subsystems 170 to 173 shown in FIG. 2F.

Each of the RAID groups A458 to J467 is one logical high-performance and high-reliability disk drive generated from a plurality of physical disks 254 to 256 by functions of the storage subsystems A449 to C451.

The LDEV's A468 to P483 are logical disk drives generated by dividing the RAID groups A458 to J467 through the functions of the storage subsystems A449 to C451. The LDEV's A468 to P483 are equivalent to the LDEV's 174 to 179 of FIG. 1. The storage subsystems A449 to C451 can generate LDEV's A468 to P483 of sizes suited for uses of the host servers A401 and B402.

The volumes A417 to D420 of the host servers A401 and B402 are allocated to any of the LDEV's A468 to P483. The LDEV's A468 to P483 are allocated to any of the RAID groups A458 to J467. The functions of the storage subsystems S449 to C451 are realized by the processors A452 to F457. Communication through the ports S445 to V448 of the storage subsystems A449 to C451 is controlled by the processors A452 to F457. The processors A452 to F457, the RAID groups A458 to J467, and the LDEV's A468 to P483 are resources used for data I/O.

After a correlation is established between the LDEV's A468 to P483 and the volumes A417 to D420 allocated thereto, paths of data transferred therebetween, in other words, ports A427 to V448 through which pieces of data are transferred therebetween, are decided.

In the example of FIG. 4, the volume A417 is allocated to the LDEV B469. In this case, for example, data written in the volume A417 passes through ports A427, C429, E431, K437, L438, and T446 to reach the storage subsystem A449. Then, the data that has arrived is written in the LDEV B469 of the RAID group A458 by the processor A452 (refer to FIG. 5 described below). The data written in the LDEV B469 is stored in a physical storage area allocated to the LDEV B469.

Next, referring to FIGS. 5 to 17, information stored in the database (DB) 303 of the migration execution control program 126 will be described. Resource names and identifiers shown in FIGS. 5 to 17 correspond to those shown in FIG. 4.

FIG. 5 is an explanatory diagram of the application I/O path information 307 stored in the database 303 of the first embodiment of this invention.

An application I/O path information table 500 shown in FIG. 5 is stored as the application I/O path information 307 in the database 303. The application I/O path information table 500 holds information indicating data paths from the application programs A403 to D406 to the LDEV's A468 to P483 in which data written by the application programs A403 to D406 are stored. In other words, the application I/O path information table 500 holds information indicating resources used for data I/O executed by the application programs A403 to D406.

The application I/O path information table 500 includes nine columns of an application 501, a file 502, a volume 503, a host side port 504, a switch side port 505, a storage side port 506, a processor 507, a RAID group 508, and an LDEV 509.

In the application 501, identifiers of the application programs A403 to D406 are registered.

In the file 502, identifiers of the files A407 to J416 accessed by the application programs A403 to D406 are registered.

In the volume 503, identifiers of the volumes A417 to D420 managed to store the files A407 to J416 are registered.

In the host side port 504, the switch side port 505, and the storage side port 506, identifiers of the ports A427 to V448 through which pieces of data transferred between the volumes A417 to D420 and the LDEV's A468 to P483 allocated to the volumes A417 to D420 pass are registered.

More specifically, identifiers of the ports A427 and B428 provided to the host servers A401 and B402 are registered in the host side port 504. Those ports will also be referred to as host side ports hereinafter. Identifiers of the ports C429 to R444 provided to the SAN switches A421 to F426, respectively are registered in the switch side port 505. Those ports will also be referred to as switch side ports hereinafter. Identifiers of the ports S445 to V448 provided to the storage subsystems A449 to C451 are registered in the storage side port 506. Those ports will also be referred to as storage side ports hereinafter.

In the processor 507, identifiers of the processors A452 to F457 for controlling data writing/reading with respect to the LDEV's A468 to P483 according to data I/O requests received through the storage side ports S445 to V448 are registered.

In the RAID group 508, identifiers of the RAID groups A458 to J467 including the LDEV's A468 to P483 are registered.

In the LDEV 509, identifiers of the LDEV's A468 to P483 allocated to the volumes A417 to D420 are registered.

For example, in FIG. 5, the application program A403 accesses the files A407, B408, and C409. The files A407 to C409 are stored in the volume A417. The LDEV B469 of the RAID group A458 is allocated to the volume A417. The processor A452 controls data writing/reading with respect to the LDEV B469 according to a data I/O request received through the port T446. Data that reaches the LDEV B469 from the volume A417 is passed through the ports A427, C429, E431, K437, L438, and T446.

In this case, the application program A403, the files A407 to C409, the volume A417, the LDEV B469, the RAID group A458, the processor A452, and the ports A427, C429, E431, K437, L438, and T446 are resources used for data I/O of the application program A403.

FIG. 6 is an explanatory diagram of the application performance information 306 stored in the database 303 of the first embodiment of this invention.

An application performance information table 600 shown in FIG. 6 is stored as the application performance information 306 in the database 303. The application performance information table 600 holds information indicating measured performance of the application programs A403 to D406.

The application performance information table 600 includes two columns of an application 601 and a performance value 602.

In the application 601, identifiers of the application programs A403 to D406 are registered.

In the performance value 602, values indicating execution performance actually measured for the application programs A403 to D406 (i.e., performance actually measured for the application jobs realized by executing the application programs A403 to D406) are registered. Hereinafter, in this embodiment, an example in which response time is registered as the performance value 602 will be described. More specifically, response time actually measured during execution of the application programs A403 to D406 are registered as the performance value 602. However, any performance indexes such as throughput or transactions may be registered as the performance value 602. If response time is registered as the performance value 602, performance is higher as a registered value is smaller. On the other hand, if throughput is registered as the performance value 602, performance is higher as a registered value is larger.

For example, in FIG. 6, "2.5" is registered as the performance value 602 of the application program A403, and "1" is registered as the performance value 602 of the application program B404. This indicates that most recently measured performance of the application program B404 is higher than that of the application program A403.

FIG. 7 is an explanatory diagram of the job-migration path relation information 309 stored in the database 303 of the first embodiment of this invention.

A job-migration path relation information table 700 shown in FIG. 7 is stored as the job-migration path relation information 309 in the database 303. The job-migration path relation information table 700 holds information indicating resources used for migrations executed by the storage subsystems 170 to 173. The resources used for the migrations are resources on which loads are applied by migration execution.

The job-migration path relation information table 700 includes six columns of an ID 701, a used storage resource 702, migration source LDEV information 703, migration destination LDEV information 704, a state 705, and a number of parallel copy jobs 706.

In the ID 701, an identifier of a migration job is registered.

In the used storage resource 702, an identifier of a resource used by the migration job is registered.

In the migration source LDEV information 703, identifier of the LDEV A468 or the like which become migration source are registered.

In the migration destination LDEV information 704, identifier of the LDEV A468 or the like which become migration destination are registered.

In the state 705, information indicating a state of the migration job is registered. Specifically, for example, "Limited", "Executed", or the like is registered in the state 705. "Executed" indicates ongoing execution of the migration job. "Limited" indicates ongoing execution of the migration job in a state where the number of copy jobs executed in parallel is limited.

In the number of parallel copy jobs 706, the number of copy jobs executed in parallel in the migration job is registered.

For example, in FIG. 7, a migration source of the migration job identified by an identifier "10" is LDEV B469, and a migration destination is LDEV K478. In other words, by this migration job, data stored in the LDEV B469 is moved to the LDEV K478. To move the data from the LDEV B469 to the LDEV K478, a plurality of copy jobs in which the LDEV B469 is a copy source and the LDEV K478 is a copy destination are executed. However, the number of copy jobs executed in parallel is limited to 12.

The data copied from the LDEV B469 to the LDEV K478 is passed through the ports T446, L438, K437, E431, C429, D430, I435, J436, and S445. The LDEV B469 is included in the RAID group A458. Data I/O to the LDEV B469 is controlled by the processor A452. The LDEV K478 is included in the RAID group G464. Data I/O to the LDEV K478 is controlled by the processor E456.

In short, to execute the migration job identified by the identifier "10", the ports T446, L438, K437, E431, C429, D430, I435, J436, S445, the RAID group A458, the processor S452, the RAID group G464, and the processor E456 are used. In other words, loads are applied on those resources by the migration job identified by the identifier "10".

FIG. 8 is an explanatory diagram of the application priority information 304 stored in the database 303 of the first embodiment of this invention.

An application priority information table 800 shown in FIG. 8 is stored as the application priority information 304 in the database 303. The application priority information table 800 holds information indicating a priority set in each of the application programs A403 to D406. The priority set in the application program means the priority set in the application jobs realized by executing the application program.

The application priority information table 800 includes two columns of an application 801 and a priority 802.

In the application 801, identifiers of the application programs A403 to D406 are registered.

In the priority 802, priorities set in the application programs A403 to D406 are registered. The user of the computer system can set an optional priority 802 in each of the application programs A403 to D406 by operating the operation management client 104. For example, the user can set a highest priority in one of the application programs A403 to D406 whose reduction in performance is most unpreferable.

For example, in FIG. 8, "1" is registered as the priority 802 of the application programs A403 to C405, and "2" is registered as the priority 802 of the application program D406. This indicates that priorities higher than that of the application program D406 is set in the application programs A403 to C405. As described below, predetermined processing is carried out to recover performance of the application programs A403 to C405 of high priorities in preference to that of the application program D406.

FIG. 9 is an explanatory diagram of the tier priority information 308 stored in the database 303 of the first embodiment of this invention.

A tier priority information table 900 shown in FIG. 9 is stored as the tier priority information 308 in the database 303. The tier priority information table 900 holds information indicating tiers of the storage subsystems A449 to C451, i.e., information indicating priorities set in the storage subsystems A449 to C451.

The tier priority information table 900 includes two columns of a storage subsystem 901 and a tier 902.

In the storage subsystem 901, identifiers of the storage subsystems A449 to C451 are registered.

In the tier 902, tiers set in the storage subsystems A449 to C451 are registered. Tiers are set by a hierarchical management program of a hierarchical management server. For example, a highest tier may be set in at least one of the storage subsystems A449 to C451 constituted of highest-performance hardware. Alternatively, the user may set a highest tier in at least one of the storage subsystems A449 to C451 whose reduction in performance should is most unpreferable.

For example, in FIG. 9, "1" is registered as the tier 902 of the storage subsystems A449 and B450, and "2" is registered as the tier 902 of the storage subsystem C451. This indicates that tiers (i.e., priorities) higher than that of the storage subsystem C451 are set in the storage subsystems A449 and B450. In other words, "1" of a high tier is set in the tier 902 in all the LDEV A468 to M480 belonging to the storage subsystems A449 and B450, respectively, while "2" of a low tier is set in the tier 902 in all the LDEV N481 to P483 belonging to the storage subsystem C451.

FIG. 10 is an explanatory diagram of the application performance target value information 305 stored in the database 303 of the first embodiment of this invention.

An application performance target value information table 1000 shown in FIG. 10 is stored as the application performance target value information 305 in the database 303. The application performance target value information table 1000 holds a boundary value (i.e., threshold value) used for judging whether performance of each of the application programs A403 to D406 has been deteriorated/recovered.

The application performance target value information table 1000 includes three columns of an application 1001, a performance deterioration boundary value 1002, and a performance recovery boundary value 1003.

In the application 1001, identifiers of the application programs A403 to D406 are registered.

In the performance deterioration boundary value 1002, a threshold value used for judging whether performance of each of the application programs A403 to D406 has been deteriorated is registered. The migration execution control program 126 judges that performance has been deteriorated when the performance of each of the application programs A403 to D406 drops below a value registered in the performance deterioration boundary value 1002.

In the performance recovery boundary value 1003, a threshold value used for judging whether the performance of each of the application programs A403 to D406 has been recovered is registered. The migration execution control program 126 judges that performance has been recovered when the performance of each of the application programs A403 to D406 exceeds a value registered in the performance recovery boundary value 1003.

Equal or different values may be registered in the performance deterioration boundary value 1002 and the performance deterioration recovery boundary value 1003 corresponding to one of the application programs A403 to D406. In the latter case, however, a value indicating performance higher than that of a value registered in the performance deterioration boundary value 1002 must be registered in the performance recovery boundary value 1003.

A reason for registering different values in the performance deterioration boundary value 1002 and the performance deterioration recovery boundary value 1003 will be described.

As described below, the migration execution control program 126 starts execution of processing to recover performance when it is judged that the performance of one of the application programs A403 to D406 has been deteriorated. As a result, upon judgment that the performance of the one of the application programs A403 to D406 has been recovered, the migration execution control program 126 finishes the execution of the processing to recover the performance. If the threshold value for judging performance deterioration and the threshold value for judging performance recovery are equal to each other, there is a possibility that performance is judged to have recovered immediately after the start of processing to recover the performance. As a result, there is a possibility that the performance is judged to have deteriorated again immediately after the end of the processing to recover the performance.

Thus, if the two threshold values are equal to each other, the start and the end of the processing to recover the performance are repeated with short intervals, thereby creating a risk of affecting execution of other processing.

On the other hand, if a value indicating performance higher than that of the value registered in the performance deterioration boundary value 1002 is registered in the performance recovery boundary value 1003, it is possible to properly adjust intervals of the start and the end of the processing to recover the performance.

For example, in FIG. 10, "2" and "1.8" are respectively registered as the performance deterioration boundary value 1002 and the performance deterioration recovery boundary value 1003 corresponding to the application program B404. As those values indicate the response time, "1.8" indicate higher performance than "2". In this case, when performance of the application program B404 drops below "2", the migration execution control program 126 starts the processing to recover the performance. Then, when the performance of the application program B404 exceeds "1.8", the processing to recover the performance is finished.

Next, referring to FIGS. 11 to 17, the storage network configuration information 310 stored in the database 303 of the first embodiment of this invention will be described. The storage network configuration information 310 includes tables shown in FIGS. 11 to 17. Those tables hold information indicating a relation among the resources of the computer system, that is, information indicating allocation of the resources.

The storage resource relation information collection module 316 of the migration execution control program 126 obtains information indicating a relation among the resources from the application information collection agent 115, the host information collection agent 116, the SAN switch information collection agent 124, and the subsystem information collection agent 125, and stores the obtained information as the storage network configuration information 310. The application configuration data collection module 302 generates an application I/O path information table 500 based on the storage network configuration information 310.

FIG. 11 is an explanatory diagram of an application-file relation information table stored as the storage network configuration information 310 in the database 303 of the first embodiment of this invention.

An application-file relation information table 1100 holds application-file relation information, which is a part of the storage network configuration information 310. The application-file relation information indicates a relation between the application programs A403 to D406 and the files A407 to J416 accessed by the application programs A403 to D406. The application-file relation information is obtained by the host information collection agent 116. The storage resource relation information collection module 316 obtains the application-file relation information from the host information collection agent 116, and registers the obtained information in the application-file relation information table 1100.

The application-file relation information table 1100 includes two columns of an application 1101 and a file 1102.

In the application 1101, identifiers of the application programs A403 to D406 are registered.

In the file 1102, identifiers of the files A407 to J416 accessed by the application programs A403 to D406 are registered.

For example, in FIG. 11, the application program A403 accesses the files A407 to C409.

A correspondence between the application 1101 and the file 1102 shown in FIG. 11 is reflected in the application 501 and the file 502 of the application I/O path information table 500 by the application configuration data collection module 302.

FIG. 12 is an explanatory diagram of a file-volume relation information table stored as the storage network configuration information 310 in the database 303 of the first embodiment of this invention.

A file-volume relation information table 1200 holds file-volume relation information, which is a part of the storage network configuration information 310. The file-volume relation information indicates a relation between the files A407 to J416 and the volumes A417 to D420 for logically storing the files A407 to J416. The file-volume relation information is obtained by the host information collection agent 116. The storage resource relation information collection module 316 obtains the file-volume relation information from the host information collection agent 116, and registers the obtained information in the file-volume relation information table 1200.

The file-volume relation information table 1200 includes two columns of a file 1201 and a volume 1202.

In the file 1201, identifiers of the files A407 to J416 are registered.

In the volume 1202, identifiers of the volumes A417 to D420 for logically storing the files A407 to J416 are registered.

For example, in FIG. 12, the files A407 to C409 are logically stored in the volume A417.

A correspondence between the file 1201 and the volume 1202 shown in FIG. 12 is reflected in the file 502 and the volume 503 of the application I/O path information table 500 by the application configuration data collection module 302.

FIG. 13 is an explanatory diagram of a volume-LDEV-port relation information table stored as the storage network configuration information 310 in the database 303 of the first embodiment of this invention.

A volume-LDEV-port relation information table 1300 holds volume-LDEV-port relation information, which is a part of the storage network configuration information 310. The volume-LDEV-port relation information indicates a relation among the volumes A417 to D420, the LDEV's A468 to P483 allocated to the volumes A417 to D420, and the host side ports A427 and B428 and the storage side ports S445 to V448 through which data is passed from the volumes A417 to D420 to the LDEV's A468 to P483.

The volume-LDEV-port relation information is obtained by the host information collection agent 116. The storage resource relation information collection module 316 obtains the volume-LDEV-port relation information from the host information collection agent 116, and registers the obtained information in the volume-LDEV-port relation information table 1300.

The volume-LDEV-port relation information table 1300 includes four columns of a volume 1301, an LDEV 1302, a host side port 1303, and a storage side port 1304.

In the volume 1301, identifiers of the volumes A417 to D420 are registered.

In the LDEV 1302, identifiers of the LDEV's A468 to P483 allocated to the volumes A417 to D420 are registered.

In the host side port 1303 and the storage side port 1304, identifiers of the host side ports A427 and B428 and identifiers of the storage side ports S445 to V448 through which pieces of data are passed from the volumes A417 to D420 to the LDEV's A468 to P483 are registered.

For example, in FIG. 13, the LDEV B469 is allocated to the volume A417. Data stored in the volume A417 is passed through the ports A427 and T446 to be stored in the LDEV B469.

A correspondence among the volume 1301, the LDEV 1302, the host side port 1303, and the storage side port 1304 shown in FIG. 13 is reflected in the volume 503, the LDEV 509, the host side port 504, and the storage side port 506 of the application I/O path information table 500 by the application configuration data collection module 302.

FIG. 14 is an explanatory diagram of an interport relation information table stored as the storage network configuration information 310 in the database 303 of the first embodiment of this invention.

An interport relation information table 1400 holds interport relation information, which is a part of the storage network configuration information 310. The interport relation information indicates a relation among the host side ports A427 and B428, the storage side ports S445 to V448, and the switch side ports C429 to R444 through which pieces of data are passed from the host side ports A427 and B428 to the storage side ports S445 to V448. The interport relation information is obtained by the SAN switch information collection agent 124. The storage resource relation information collection module 316 obtains the interport relation information from the SAN switch information collection agent 124, and registers the obtained information in the interport relation information table 1400.

The interport relation information table 1400 includes three columns of a host side port 1401, a storage side port 1402, and a switch side port list 1403.

In the host side port 1401 and the storage side port 1402, identifiers of the host side ports A427 and B428 and identifiers of the storage side ports S445 to V448 through which pieces of data are passed from the volumes A417 to D420 to the LDEV A468 to P483 are registered.

In the switch side port list 1403, identifiers of all the switch side ports C429 or the like through which pieces of data are passed from the host side ports A427 and B428 to the storage side ports S445 to V448 are registered.

For example, in FIG. 14, data that reaches the port T446 from the port A427 is passed through the ports C, E, K, and L.

A correspondence among the host side port 1401, the storage side port 1402, and the switch side port list 1403 shown in FIG. 14 is reflected in the host side port 504, the storage side port 506, and the switch side port 505 of the application I/O path information table 500 by the application configuration data collection module 302.

FIG. 15 is an explanatory diagram of an LDEV-RAID group relation information table stored as the storage network configuration information 310 in the database 303 of the first embodiment of this invention.

A LDEV-RAID group relation information table 1500 holds LDEV-RAID group relation information, which is a part of the storage network configuration information 310. The LDEV-RAID group relation information indicates a relation between the LDEV's A468 to P483 and the RAID groups A458 to J467 which include the LDEV's A468 to P483. The LDEV-RAID group relation information is obtained by the subsystem information collection agent 125. The storage resource relation information collection module 316 obtains the LDEV-RAID group relation information from the subsystem information collection agent 125, and registers the obtained information in the LDEV-RAID group relation information table 1500.

The LDEV-RAID group relation information table 1500 includes two columns of an LDEV 1501 and a RAID group 1502.

In the LDEV 1501, identifiers of the LDEV's A468 to P483 are registered.

In the RAID group 1502, identifiers of the RAID groups A458 to J467 which include the LDEV's A468 to P483 are registered.

For example, in FIG. 15, the LDEV A468 is included in the RAID group A458. In other words, a physical data storage area included in the RAID group A458 is allocated to the LDEV A468.

A correspondence between the LDEV 1501 and the RAID group 1502 shown in FIG. 15 is reflected in the LDEV 509 and the RAID group 508 of the application I/O path information table 500 by the application configuration data collection module 302.

FIG. 16 is an explanatory diagram of a storage subsystem-RAID group relation information table stored as the storage network configuration information 310 in the database 303 of the first embodiment of this invention.

A storage subsystem-RAID group relation information table 1600 holds storage subsystem-RAID group relation information, which is a part of the storage network configuration information 310. The storage subsystem-RAID group relation information indicates a relation between the storage subsystems A449 to C451 and the RAID groups A458 to J467 included in the storage subsystems A449 to C451. The storage subsystem-RAID group relation information is obtained by the subsystem information collection agent 125. The storage resource relation information collection module 316 obtains the storage subsystem-RAID group relation information from the subsystem information collection agent 125, and registers the obtained information in the storage subsystem-RAID group relation information table 1600.

The storage subsystem-RAID group relation information table 1600 includes two columns of a storage subsystem 1601 and a RAID group 1602.

In the storage subsystem 1601, identifiers of the storage subsystems A449 to C451 are registered.

In the RAID group 1602, identifiers of the RAID groups A458 to J467 included in the storage subsystems A449 to C451 are registered.

For example, in FIG. 16, the storage subsystem A449 includes the RAID groups A458 to F463.

FIG. 17 is an explanatory diagram of a port-processor relation information table stored as the storage network configuration information 310 in the database 303 of the first embodiment of this invention.

The port-processor relation information table 1700 holds port-processor relation information, which is a part of the storage network configuration information 310. The port-processor relation information indicates a relation between the storage side ports S445 to V448 and the processors A452 to F457 for controlling the storage side ports S445 to V448. The port-processor relation information is obtained by the subsystem information collection agent 125. The storage resource relation information collection module 316 obtains the port-processor relation information from the subsystem information collection agent 125, and registers the obtained information in the port-processor relation information table 1700.

The port-processor relation information table 1700 includes two columns of a storage side port 1701 and a processor 1702.

In the storage side port 1701, identifiers of the storage side ports S445 to V448 are registered.

In the processor 1702, identifiers of the processors A452 to F457 for controlling the storage side ports S445 to V448 are registered.

For example, in FIG. 17, the port S445 is controlled by the processor E456.

A correspondence between the storage side port 1701 and the processor 1702 shown in FIG. 17 is reflected in the storage side port 506 and the processor 507 of the application I/O path information table 500 by the application configuration data collection module 302.

FIG. 18 is an explanatory diagram of a performance deterioration temporary table 313 held by the migration execution control program 126 of the first embodiment of this invention.

The performance deterioration temporary table 313 temporarily holds pieces of information regarding at least one of the application programs A403 to D406 judged to have been deteriorated in performance by the migration execution control program 126 and a migration job which may have caused the performance deterioration.

The performance deterioration temporary table 313 includes two columns of an application 1801 and a migration ID 1802.

In the application 1801, an identifier of the application program A403 or the like judged to have been deteriorated in performance is registered.

In the migration ID 1802, an identifier of the migration job using the same resources as those used by the application program A403 or the like judged to have been deteriorated in performance is registered. If the application program A403 or the like and the migration job use the same resources, there is a possibility that bottlenecks are generated in the resources. In other words, there is a possibility that the performance of the application program A403 or the like is recovered by limiting execution of the migration job.

In an example of FIG. 18, the application program D406 is registered in the application 1801. This means that the performance of the application program D406 is judged to have been deteriorated. For example, in FIGS. 6 and 10, a performance value 602 of "13" of the application program D406 indicates performance lower than that indicated by a performance deterioration boundary value 1002 of "11.5". In this case, it is judged that the performance of the application program D406 has been deteriorated.

Additionally, in FIGS. 5 and 7, the application program D406 and a migration job identified by the ID "11" both use ports H434, N440, and P442. Thus, "11" is registered as the migration ID 1802 corresponding to the application program D406.

FIG. 19 is an explanatory diagram of a performance recovery temporary table 314 held by the migration execution control program 126 of the first embodiment of this invention.

The performance recovery temporary table 314 temporarily holds pieces of information regarding at least one of the application programs A403 to D406 judged to have been recovered in performance by the migration execution control program 126 and migration jobs related to the application programs A403 to D406.

The performance recovery temporary table 314 includes two columns of an application 1901 and a migration ID 1902.

In the application 1901, an identifier of the application programs A403 or the like judged to have been recovered in performance is registered. If the performance of the application program A403 or the like judged to have been deteriorated (in other words, the application program A403 or the like registered in the performance deterioration temporary table 213) is then judged to have been recovered, the identifier of the application program A403 or the like is deleted from the application 1801 to be registered in the application 1901.

In the migration ID 1902, an identifier of migration job using the same resources as those used by the application program A403 or the like judged to have been recovered in performance is registered.

In an example of FIG. 19, the application program C405 is registered in the application 1901. This means that the performance of the application program C405 is judged to have been deteriorated, and then judged to have been recovered. For example, in FIGS. 6 and 10, a performance value 602 "3.5" of the application program C405 indicates performance higher than that of a performance recovery boundary value 1003 "4". At this point of time, if the application program C405 has been registered in the performance deterioration temporary table 313, it is judged that the deteriorated performance of the application program D406 has been recovered.

Additionally, in FIGS. 5 and 7, the application program C405 and a migration job identified by ID "10" both use ports C429 and E431. Thus, "10" is registered as the migration ID 1902 corresponding to the application program C405.

Next, referring to a flowchart, processing executed by the first embodiment of this invention will be described.

FIG. 20 is a flowchart showing migration information collection processing executed by the migration execution control program 126 of the first embodiment of this invention.

The migration information collection processing shown in FIG. 20 is executed by the migration information collection module 317 of the migration execution control program 126.

Upon a start of the migration information collection processing, the migration information collection module 317 requests detailed information of the migration to the migration execution program 180 (2001). The migration execution program 180 that has received the request transmits information regarding a currently executed migration job to the migration information collection module 317. The transmitted information contains information corresponding to each column of the job-migration path relation information table 700.

Then, the migration information collection module 317 obtains the information transmitted from the migration execution program 180 according to the request of the step 2001 (2002).

The migration information collection module 317 judges whether job-migration path relation information 309 has been stored in the database 303 (2003).

If it is judged in the step 2003 that the job-migration path relation information 309 has not been stored, the migration information collection module 317 stores the information obtained in the step 2002 as the job-migration path relation information 309 in the database 303 (2004). Specifically, the migration information collection module 317 creates a job-migration path relation information table 700, and registers the information obtained in the step 2002 in the created table.

On the other hand, if it is judged in the step 2003 that the job-migration path relation information 309 has been stored, the migration information collection module 317 updates the job-migration path relation information 309 according to the information obtained in the step 2002 (2005). By executing the step 2004 or 2005, the information obtained in the step 2002 is reflected in the database 303.

Thus, the migration information collection processing is finished.

Figure 21:
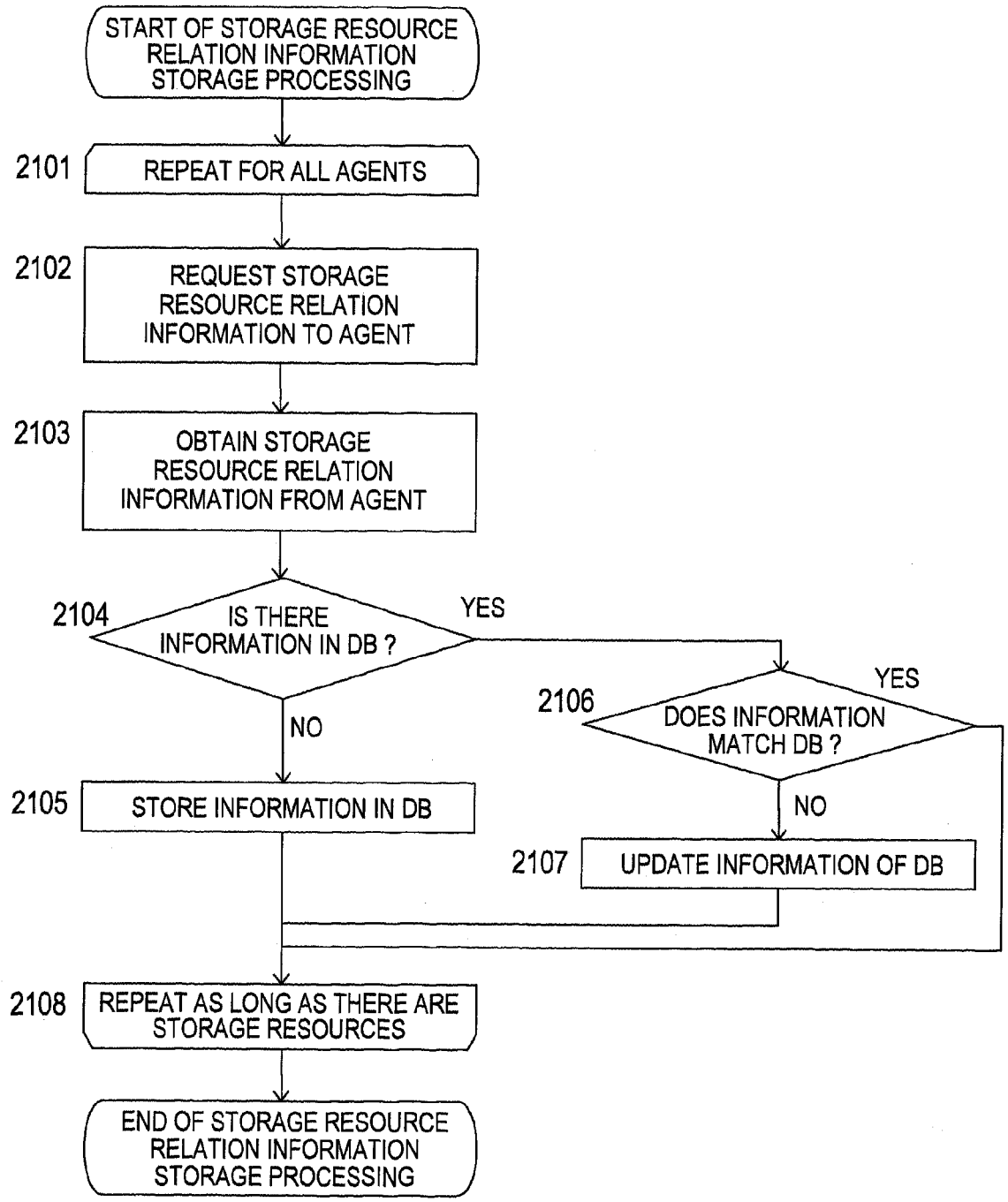
FIG. 21 is a flowchart showing storage resource relation information storage processing executed by the migration execution control program of the first embodiment of this invention.

FIG. 21 is a flowchart showing storage resource relation information storage processing executed by the migration execution control program 126 of the first embodiment of this invention.

The storage resource relation information storage processing shown in FIG. 21 is executed by the storage resource relation information collection module 316 of the migration execution control program 126.

Upon a start of the storage resource relation information storage processing, the storage resource relation information collection module 316 requests relation information between resources to the information collection agent (2102). In the example of FIG. 1, the information collection agent is one of the application information collection agent 115, the host information collection agent 116, the SAN switch information collection agent 124, and the subsystem information collection agent 125. The information collection agent that has received this request transmits relation information between resources to the storage resource relation information collection module 316. The transmitted information contains information stored in one of the tables of FIGS. 11 to 17.

Then, the storage resource relation information collection module 316 obtains the information transmitted from the information collection agent (2103).

The storage resource relation information collection module 316 judges whether storage network configuration information 310 has been stored in the database 303 (2104).

If it is judged in the step 2104 that the storage network configuration information 310 has not been stored, the storage network relation information collection module 316 stores the information obtained in the step 2103 as the storage network configuration information 310 in the database 303 (2105). Specifically, the storage resource relation information collection module 316 creates a one of the tables shown in FIGS. 11 to 17, and registers the information obtained in the step 2103 in the created table.

On the other hand, if it is judged in the step 2104 that the storage network configuration information 310 has been stored, the storage resource relation information collection module 316 judges whether the stored storage network configuration information 310 matches the information obtained in the step 2103 (2106).

If it is judged in the step 2106 that the stored storage network configuration information 310 does not match the information obtained in the step 2103, the storage resource relation information collection module 316 updates the storage network configuration information 310 according to the information obtained in the step 2103 (2107).

On the other hand, if it is judged in the step 2106 that the stored storage network configuration information 310 matches the information obtained in the step 2103, the storage resource relation information collection module 316 does not update the storage network configuration information 310.

The storage resource relation information collection module 316 executes the processing of the steps 2102 to 2107 by targeting all the information collection agents (2102 and 2108).

Upon completion of the processing of the steps 2102 to 2107 for all the information collection agents, the storage resource relation information storage processing is finished. By executing the step 2105 or 2107, the information obtained in the step 2103 is reflected in the database 303.

FIG. 22 is a flowchart showing tier priority acquisition processing executed by the migration execution control program 126 of the first embodiment of this invention.

The tier priority acquisition processing shown in FIG. 22 is executed by the tier priority acquisition module 311 of the migration execution control program 126.

Upon a start of the tier priority acquisition processing, the tier priority acquisition module 311 requests tier priority information to the hierarchical management program 127 (2201). The hierarchical management program 127 that has received the request transmits information indicating tiers of the storage subsystems A449 to C451 to the tier priority acquisition module 311. The transmitted information contains information indicating tiers set in the storage subsystems A449 to C451.

Then, the tier priority acquisition module 311 obtains the information transmitted from the hierarchical management program 127 according to the request of the step 2201 (2202).

The tier priority acquisition module 311 judges whether tier priority information 308 has been stored in the database 303 (2203).

If it is judged in the step 2203 that the tier priority information 308 has not been stored, the tier priority acquisition module 311 stores the information obtained in the step 2202 as the tier priority information 308 in the database 303 (2204). Specifically, the tier priority acquisition module 311 creates a tier priority information table 900, and registers the information obtained in the step 2202 in the created table.

On the other hand, if it is judged in the step 2203 that the tier priority information 308 has been stored, the tier priority acquisition module 311 updates the tier priority information 308 according to the information obtained in the step 2202 (2205). By executing the step 2204 or 2205, the information obtained in the step 2202 is reflected in the database 303.

Thus, the tier priority acquisition processing is finished.

FIG. 23 is a flowchart showing application configuration data storage processing executed by the migration execution control program 126 of the first embodiment of this invention.

The application configuration data storage processing shown in FIG. 23 is executed by the application configuration data collection module 302 of the migration execution control program 126.

Upon a start of the application configuration data storage processing, the application configuration data collection module 302 requests transmission of application program names to the information collection agent (2302). The information collection agent that has received the request transmits names of the application programs A403 to D406 to the application configuration data collection module 302.

Then, the application configuration data collection module 302 obtains information transmitted from the information collection agent (2303).

The application configuration data collection module 302 creates application I/O path information 307 based on the storage network configuration information 310 and the information obtained in the step 2303 (2304). Specifically, the application configuration data collection module 302 combines the tables of FIGS. 11 to 17 with the information obtained in the step 2303 to create the application I/O path information table 500 shown in FIG. 5.

Then, the application configuration data collection module 302 judges whether application I/O path information 307 has been stored in the database 303 (2305).

If it is judged in the step 2305 that the application I/O path information 307 has not been stored, the application configuration data collection module 302 stores the application I/O path information 307 created in the step 2304 in the database 303 (2306). Specifically, the application configuration data collection module 302 stores the application I/O path information table 500 created in the step 2304 as the application I/O path information 307.

On the other hand, if it is judged in the step 2305 that the application I/O path information 307 has been stored, the application configuration data collection module 302 judges whether the stored application I/O path information 307 matches the information created in the step 2304 (2307).

If it is judged in the step 2307 that the stored application I/O path information 307 does not match the information obtained in the step 2304, the application configuration data collection module 302 updates the application I/O path information 307 according to the information created in the step 2304 (2308).

On the other hand, if it is judged in the step 2307 that the stored application I/O path information 307 matches the information obtained in the step 2304, the application configuration collection module 302 does not update the application I/O path information 307.

The application configuration data collection module 302 executes the processing of the steps 2302 to 2308 by targeting all the application programs A403 to D406 (2302 and 2309).

Upon completion of the processing of the steps 2302 to 2308 for all the application programs A403 to D406, the application configuration data storage processing is finished. By executing the step 2306 or 2308, the information obtained in the step 2304 is reflected in the database 303.

FIG. 24 is a flowchart showing application performance data storage processing executed by the migration execution control program 126 of the first embodiment of this invention.

The application performance data storage processing shown in FIG. 24 is executed by the application performance data collection module 301 of the migration execution control program 126.

Upon a start of the application performance data storage processing, the application performance data collection module 301 obtains performance information of the application programs A403 to D406 from the information collection agent (2402). For example, the obtained performance information is response time. However, other performance indexes may be used.

Then, the application performance data collection module 301 stores the performance information obtained in the step 2402 in the database 303 (2403). Specifically, the application performance data collection module 301 registers the performance information obtained in the step 2402 in the application performance information table 600.

The application performance data collection module 301 executes the processing of the steps 2402 and 2403 by targeting all the information collection agents (2401 and 2404).

Upon completion of the processing of the steps 2402 and 2403 for all the information collection agents, the application performance data storage processing is finished. By executing the step 2403, the information obtained in the step 2402 is reflected in the database 303.

FIG. 25 is a flowchart showing performance analysis processing executed by the migration execution control program 126 of the first embodiment of this invention.

The performance analysis processing shown in FIG. 25 is executed by the performance analysis module 312 of the migration execution control program 126. The performance analysis processing is executed to judge which of the application programs A403 to D406 has been deteriorated and recovered in performance, and to create a performance deterioration temporary table 313 and a performance recovery temporary table 314 based on a result of the judgment.

Upon a start of the performance analysis processing, the performance analysis module 312 initializes the performance deterioration temporary table 313 and the performance recovery temporary table 314 (2501). As a result, there is nothing stored in the performance deterioration and recovery temporary tables 313 and 314 immediately after the step 2501 is executed.

Then, the performance analysis module 312 refers to the application performance information table 600 and the application performance target value information table 1000 to judge whether a performance value of each of the application programs A403 to D406 indicates performance lower than that of a performance deterioration boundary value 1002 (2503).

If it is judged in the step 2503 that the performance value 602 of each of the application programs A403 to D406 indicates performance lower than that of the performance deterioration boundary value 1002, the performance analysis module 312 judges that the performance of the application program A403 or the like has been deteriorated. In this case, the performance analysis module 312 judges whether there are common resources in a migration I/O path and I/O paths of the performance-deteriorated application program A403 or the like (2505). In other words, judgment is made as to whether at least one of the resources used for data I/O of the performance-deteriorated application program A403 or the like is also used for migration data I/O.

For the judgment of the step 2505, the performance analysis module 312 refers to the application I/O path information table 500 and the job-migration path relation information table 700. In each line of the application I/O path information table 500, information indicating the resources used for data I/O of the application programs A403 to D406 is registered. On the other hand, in the storage resource 702 used by the job-migration path relation information table 700, information indicating the resources used for migration data I/O is registered. In other words, if the same resource as those registered in each line of the application I/O path information table 500 have been registered in the storage resource 702, it is judged that at least one of the resources used for data I/O of the application program A403 or the like is also used for migration data I/O.

If it is judged in the step 2505 that at least one of the resources used for data I/O of the performance-deteriorated application program A403 or the like is also used for migration data I/O, there is a possibility that a performance bottleneck generated in the resource has caused the performance deterioration of the application program A403 or the like. In this case, there is a possibility that the deteriorated performance of the application program A403 or the like will be recovered by limiting migration execution. Accordingly, the performance analysis module 312 stores identifiers of the performance-deteriorated application program A403 or the like, and identifiers of migration jobs which use the same resources as those used by the application program A403 or the like in the performance deterioration temporary table 313 (2506). In the description below, use of the same resources by the migration data I/O and the data I/O of the application program A403 or the like will be described in a manner that the migration and the application program A403 or the like are associated with each other.

The performance analysis module 312 repeatedly executes the processing of the steps 2505 and 2506 until the processing of the steps 2505 and 2506 targeting all the migration jobs is finished (2504 and 2507). The performance analysis module 312 repeatedly executes the processing of the steps 2503 to 2507 until the processing of the steps 2503 to 2507 targeting all the application programs A403 to D406 is finished (2502 and 2508).

Then, the performance analysis module 312 causes the operation management client 104 to display contents of the performance deterioration temporary table 313 (2509). Specifically, the performance analysis module 312 transmits contents of the performance deterioration temporary table 313 to the operation management client 104. The operation management client 104 displays the contents of the performance deterioration temporary table 313 received from the performance analysis module 312 to the user by the display device 267. The user can know which of the migration jobs should be limited for execution to enable recovery of the deteriorated performance of the application program A403 or the like by referring to the displayed information.

According to this embodiment, the operation management client 104 includes the display device 267. However, a device (e.g., operation management server 122) other than the operation management client 104 may include the display device 267. In this case, the performance analysis module 312 transmits a request of displaying the contents of the performance deterioration temporary table 313 to the device which includes the display device 267.

Then, the performance analysis module 312 refers to the job-migration path relation information table 700 to select a migration job whose state 705 is "Limited". The performance analysis module 312 judges whether the selected migration job has been stored in the performance deterioration temporary table 313 (2511).

If it is judged in the step 2511 that the selected migration job has been stored in the performance deterioration temporary table 313, the performance of the application program A403 or the like associated to the selected migration job has not been recovered. Accordingly, the performance analysis module 312 does not execute processing of steps 2512 to 2518 described below for the selected migration job.

On the other hand, if it is judged in the step 2511 that the selected migration job has not been stored in the performance deterioration temporary table 313, there is a possibility that the performance of the application program A403 or the like associated with the selected migration job has been recovered. In this case, the performance analysis module 312 selects one of the application programs A403 to D406, and judges whether at least one of the resources used for data I/O of the selected one of the application programs A403 to D406 is also used for data I/O of the selected migration (2513). This judgment is executed as in the case of the step 2505.

If it is judged in the step 2513 that at least one of the resources used for the data I/O of the selected one of the application programs A403 to D406 is also used for the data I/O of the selected migration, the selected migration job and the selected one of the application programs A403 to D406 are associated with each other. In this case, the performance analysis module 312 refers to the application performance information table 600 and the application performance target value information table 1000 to judge whether a performance value 602 of the selected one of the application programs A403 to D406 indicates performance higher than that of a performance recovery boundary value 1003 (2514).

If it is judged in the step 2514 that the performance value 602 of the selected one of the application programs A403 to D406 is higher than the performance recovery boundary value 1003, the performance of the selected one of the application programs A403 to D406 (i.e., one of the application programs A403 to D406 associated with the selected migration job) has been recovered. In this case, the performance analysis module 312 stores an identifier of the selected one of the application programs A403 to D406 and an identifier of the selected migration job in the performance recovery temporary table 314 (2515). The limit on the number of copy jobs applied to the migration jobs stored in the performance recovery temporary table 314 is subsequently lifted (refer to FIG. 26).

On the other hand, if it is judged in the step 2514 that the performance value 602 of the selected one of the application programs is not higher than the performance recovery boundary value 1003, the performance of the selected one of the application programs A403 to D406 has not been recovered. Accordingly, in this case, it is not permitted to lift the limit on the number of copy jobs applied to the selected migration job.

However, the selected migration job may have been stored in the performance recovery temporary table 314. For example, if the selected migration job is associated with the plurality of application programs A403 to D406, and performance of one of the application programs A403 to D406 has been recovered, the selected migration job may have been stored in the performance recovery temporary table 314. In this case, the performance analysis module 312 must delete the selected migration job from the performance recovery temporary table 314. Thus, the performance analysis module 312 judges whether an identifier of the selected migration job has been stored in the performance recovery temporary table 314 (2516).

If it is judged in the step 2516 that the identifier of the selected migration job has been stored in the performance recovery temporary table 314, the performance analysis module 312 deletes the identifier of the selected migration job and the identifier of the application program A403 or the like associated with the selected migration job from the performance recovery temporary table 314 (2517).

The performance analysis module 312 repeatedly executes the processing of the steps 2513 to 2517 until the processing of the steps 2513 to 2517 is finished for all the application programs A403 to D406 (2512 and 2518). Additionally, the performance analysis module 312 repeatedly executes the processing of the steps 2511 to 2518 until the processing of the steps 2511 to 2518 is finished for all the limited migration jobs (2510 and 2519). After completion of the processing of the steps 2511 to 2518 for all the limited migration jobs, the performance analysis module 312 finishes the performance analysis processing.

Figure 26:
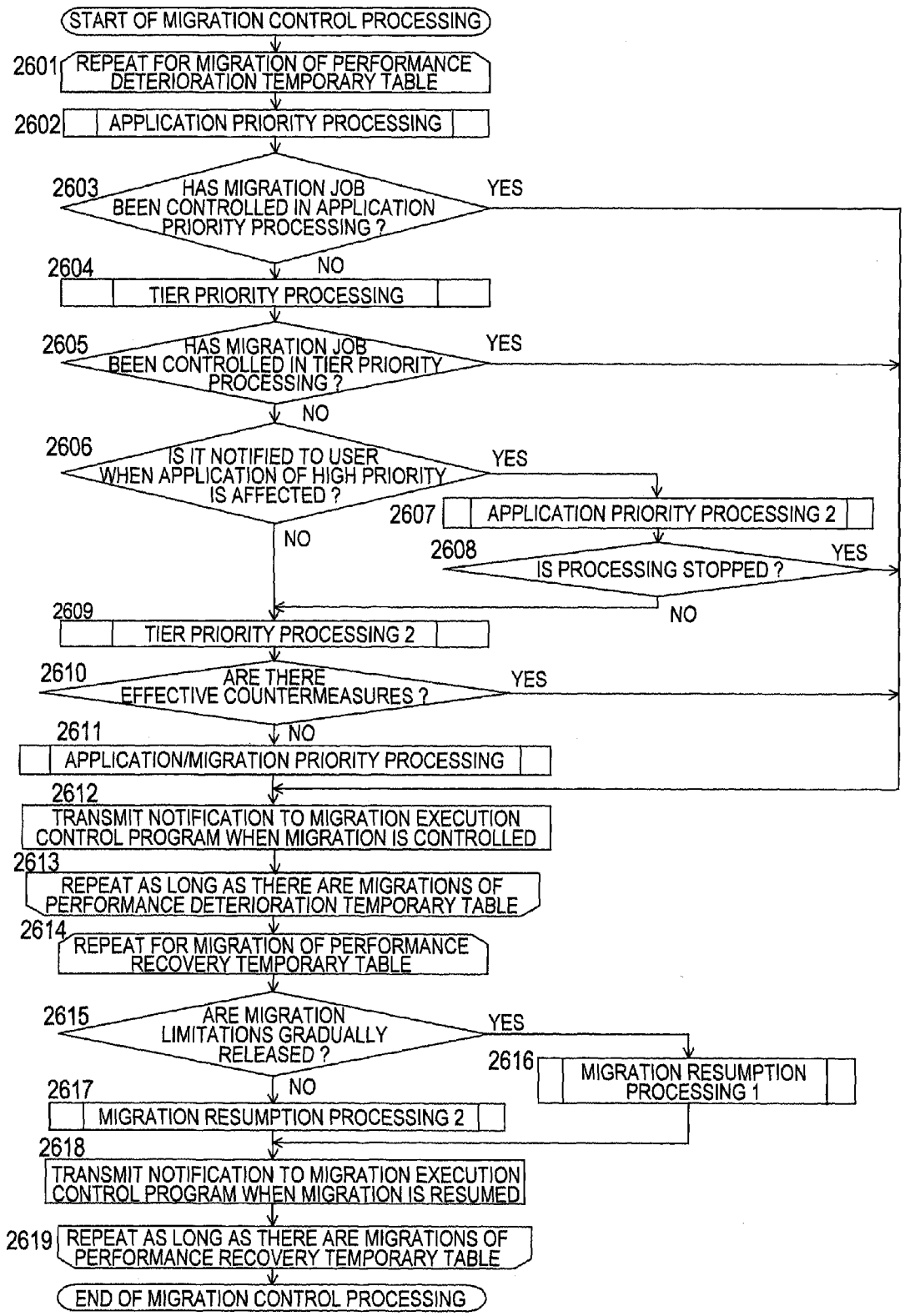
FIG. 26 is a flowchart showing migration control processing executed by the migration execution control program of the first embodiment of this invention.

FIG. 26 is a flowchart showing migration control processing executed by the migration execution control program 126 of the first embodiment of this invention.

The migration control processing shown in FIG. 26 is executed by the migration control module 315 of the migration execution control program 126. The migration control processing is executed to control migration execution according to pieces of information registered in the performance deterioration and recovery temporary tables 313 and 314.

First, the migration control module 315 selects one of the migration jobs registered in the performance deterioration temporary table 313. Then, application priority processing is executed targeting the selected migration job (2602). The application priority processing will be described below in detail referring to FIG. 29.

Then, the migration control module 315 judges whether the selected migration job has been limited by the application priority processing of the step 2602 (2603).

If it is judged in the step 2603 that the selected migration job has been limited, there is a possibility that the deteriorated performance of the application program A403 or the like will be recovered by the limit. In this case, the migration control module 315 executes next step 2612 (described below).

On the other hand, if it is judged in the step 2603 that the selected migration job has not been limited, the deteriorated performance of the application program A403 or the like may not have been recovered. In this case, the migration control module 315 then executes tier priority processing targeting the selected migration job (2604). The tier priority processing will be described below in detail referring to FIG. 27.

Subsequently, the migration control module 315 judges whether the selected migration job has been limited by the tier priority processing of the step 2604 (2605).

If it is judged in the step 2605 that the selected migration job has been limited, there is a possibility that the deteriorated performance of the application program A403 or the like will be recovered by the limit. In this case, the migration control module 315 executes next step 2612 (described below).

On the other hand, if it is judged in the step 2605 that the selected migration job has not been limited, the deteriorated performance of the application program A403 or the like may not have been recovered. In this case, the migration control module 315 then judges whether it should be notified to the user if an execution of an application program of a high priority is affected (2606).

Specifically, for example, the user can make an arrangement beforehand so that the migration control module 315 transmits a notification to the user if a priority of the performance-deteriorated one of the application programs A403 to D406 is high. When there is such an arrangement, "Notify" (i.e., YES) is judged in the step 2606.

If "Notify" is judged in the step 2606, the migration control module 315 executes application priority processing 2 targeting the selected migration job (2607). The application priority processing 2 will be described in detail below referring to FIG. 30.

Subsequently, the migration control module 315 judges whether to cancel the processing of limiting the selected migration job (2608). Specifically, upon reception of a notification transmitted in the step 2607 (refer to step 3002 of FIG. 30), the user may transmit an instruction of continuing or canceling the processing of limiting the selected migration job to the migration control module 315 via the operation management client 104. If it receives a cancellation instruction from the user, the migration control module 315 judges "Cancel" (i.e., YES) in the step 2608.

If "Cancel" is judged in the step 2608, the migration control module 315 executes step 2612 without further executing the processing of limiting the selected migration job (described below).

On the other hand, if "Not Cancel" (i.e., Continue) is judged in the step 2608, the migration control module 315 executes tier priority processing. 2 targeting the selected migration job (2609). The tier priority processing 2 will be described below in detail referring to FIG. 28.

If "Notify" is not judged in the step 2606, the tier priority processing 2 is executed targeting the selected migration job (2609).

Figure 28:
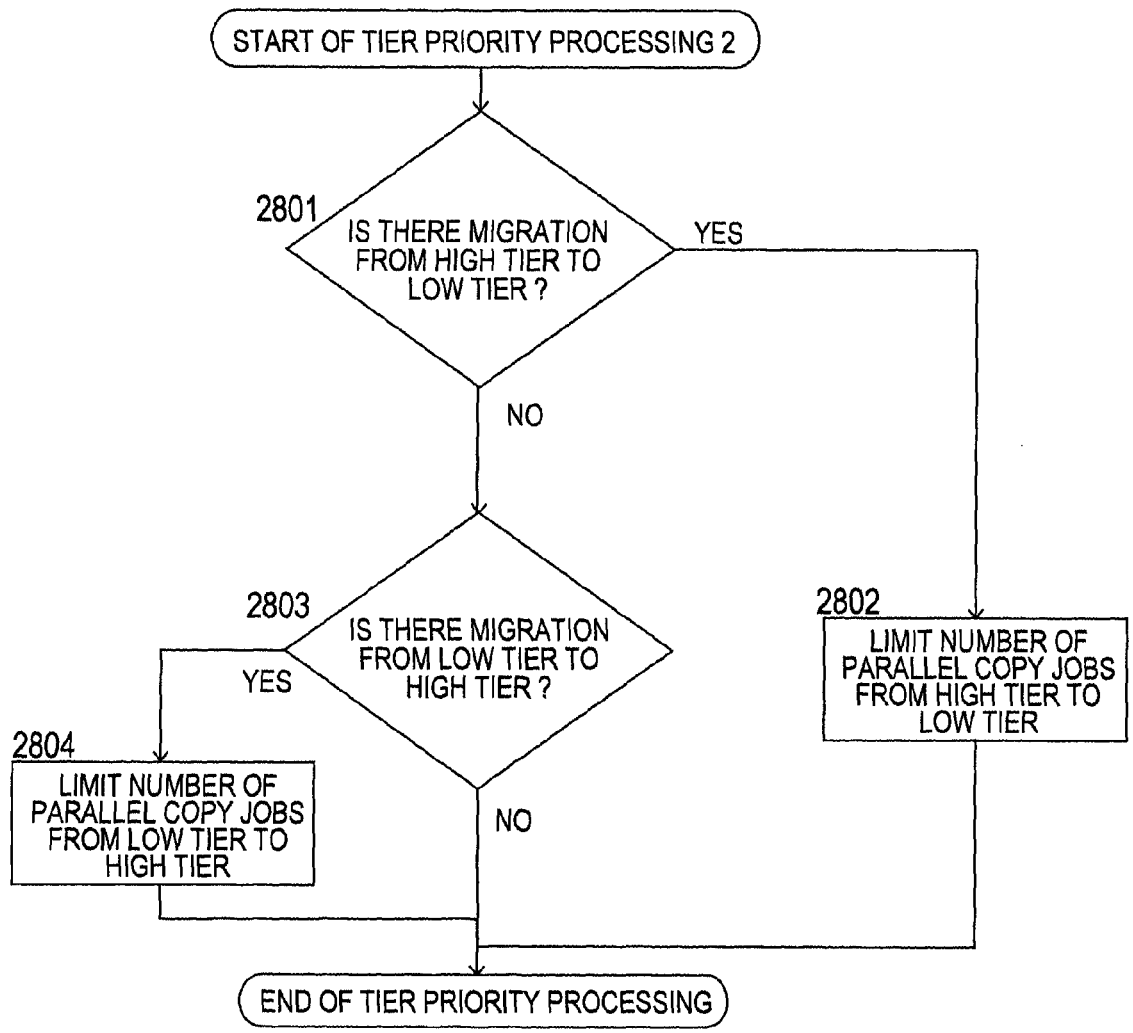
FIG. 28 is a flowchart showing another tier priority processing executed by the migration execution control program of the first embodiment of this invention.

Then, the migration control module 315 judges whether processing effective for recovering the performance of the application programs A403 to D406 (2610) has been executed in the tier priority processing 2 of the step 2609. For example, if processing of FIG. 28 is executed in the step 2609, processing of steps 2802 and 2804 is "Effective Processing".

If it is judged in the step 2610 that the effective processing has been executed, there is a possibility that the deteriorated performance of the application program A403 or the like will be recovered. In this case, the migration control module 315 then executes the step 2612 (described below).

On the other hand, if it is judged in the step 2610 that the effective processing has not been executed, the deteriorated performance of the application programs may not have been recovered. In this case, the migration control module 315 then executes application-migration priority processing targeting the selected migration job (2611). The application-migration priority processing will be described below in detail referring to FIG. 31.

When the migration job is limited by the processing up to the step 2611, the migration execution program 180 transmits a notification regarding the limit to the migration execution control program 126 (2612). This notification contains at least pieces of information indicating an identifier of the limited migration job and the number of parallel copy jobs after the limit. The migration execution control program 126 updates the DB 303 according to information received from the migration execution program 180. Specifically, the migration execution control program 126 updates the number of parallel copy jobs 706 of the job-migration path relation information table 700 to a value after the migration limit.

Then, the migration control module 315 selects a next migration job registered in the performance deterioration temporary table 313 to repeat the processing of the steps 2602 to 2612. The processing of the steps 2602 to 2612 is repeatedly executed until completion of the processing of the steps 2602 to 2612 targeting all the migration jobs registered in the performance deterioration temporary table 313 (2601 and 2613).

Subsequently, the migration control module 315 selects a migration job registered in the performance recovery temporary table 314. Then, the migration control module 315 judges a method selected as a method of resuming the selected migration job by the user (2615). The resumption of the migration job means lifting of the limit of the migration job. The method of resuming the migration job will be described.

Even upon recovery of the performance of the application program A403 or the like, if the limit of the limited migration job associated with the application program A403 or the like is completely lifted immediately, there is a risk that the performance of the application program A403 or the like will be deteriorated again. Accordingly, it is not preferable to completely lift the limit of the migration job immediately after the performance of the application program A403 or the like is recovered. Thus, the migration control module 315 must lift the limit of the migration job by a method which does not cause redeterioration of the application program A403 or the like.

Various lifting methods are available. This embodiment provides two methods. According to a first method, the limit of the migration job is gradually lifted (refer to step 2616). According to a second method, the limit of the migration job is lifted after execution of the other migration jobs is finished (refer to step 2617).

If it is judged in the step 2615 that the user selects gradual lifting of the limit of the migration job, the migration control module 315 executes migration resumption processing 1 (2616). On the other hand, if it is judged in the step 2615 that the user does not select gradual lifting of the limit of the migration job, the migration control module 315 executes migration resumption processing 2 (2617). The migration resumption processings 1 and 2 will be described below in detail respectively referring to FIGS. 32 and 33.

When the migration job is resumed in the processing of the step 2616 or 2617, the migration execution program 180 transmits a notification regarding the resumption to the migration execution control program 126 (2618). This notification contains at least pieces of information on an identifier of the resumed migration job and the number of parallel copy jobs after the resumption. The migration execution control program 126 updates the DB 303 according to information received from the migration execution program 180. Specifically, the migration execution control program 126 updates the number of parallel copy jobs 706 of the job-migration path relation information table 700 to a value after the resumption of the migration job.

Then, the migration control module 315 selects a next migration job registered in the performance recovery temporary table 314, and repeats the processing of the steps 2615 to 2618. The processing of the steps 2615 to 2618 is repeatedly executed until the processing of the steps 2615 to 2618 is finished targeting all the migration jobs registered in the performance recovery temporary table 314 (2614 and 2619).

Thus, the migration control processing is finished.

Figure 27:
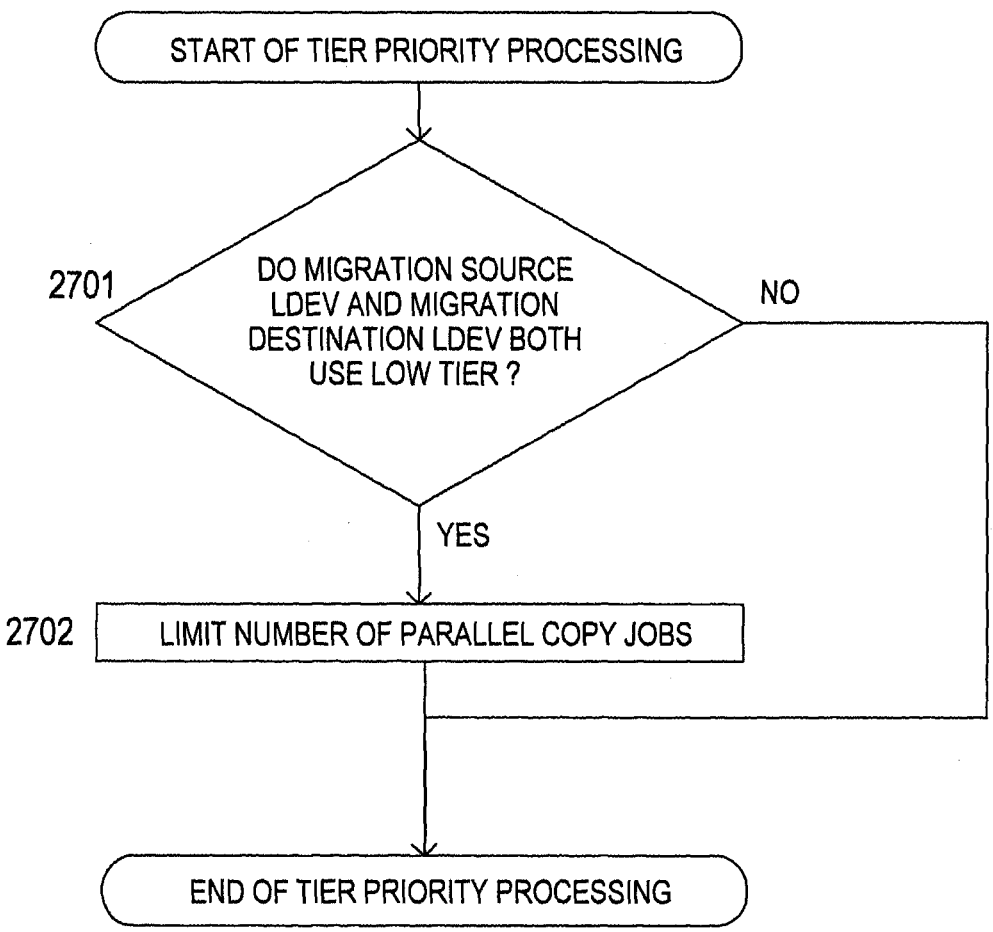
FIG. 27 is a flowchart showing tier priority processing executed by the migration execution control program of the first embodiment of this invention.

FIG. 27 is a flowchart showing tier priority processing executed by the migration execution control program 126 of the first embodiment of this invention.

The tier priority processing shown in FIG. 27 is executed by the migration control module 315 of the migration execution control program 126 in the step 2604 of FIG. 26. The tier priority processing is executed to judge whether to limit the number of parallel copy jobs in each migration job according to tier priorities.

First, the migration control module 315 judges whether the migration source LDEV A468 or the like and the migration destination LDEV A468 or the like of the selected migration job are all low tiers (2701). Specifically, the migration control module 315 judges whether the storage subsystem A449 or the like for storing the migration source LDEV A468 or the like and the storage subsystem A449 or the like for storing the migration destination LDEV A468 or the like are all low tiers.

For example, the migration control module 315 refers to the job-migration path relation information table 700 to obtain identifiers of the migration source and destination LDEV's. The migration control module 315 also refers to the LDEV-RAID group relation information table 1500 and the storage subsystem-RAID group relation information table

1600 to specify storage subsystems A449 to C451 to which the LDEV's A468 to P483 belong. Then, the migration control module 315 may refer to the tier priority information table 900 to specify whether a value of a tier 902 set in each of the storage subsystems A449 to C451 is higher than a predetermined threshold value. If the value of the tier 902 is not higher than the predetermined threshold value, a tier of the storage subsystem A449 or the like corresponding to the value is judged to be low.

If it is judged in the step 2701 that the migration source and the migration destination are both low tiers, importance of data copied from the migration source to the migration destination may be maintained low. In this case, a migration delay may be permitted. Accordingly, the migration control module 315 limits the number of parallel copy jobs (2702). Specifically, the migration control module 315 lowers a value of the number of parallel copy jobs 706 corresponding to the ID 701 of the selected migration job in the job-migration path relation information table 700. For example, if the number of parallel copy jobs 706 corresponding to the ID 701 of the selected migration job is "24", the migration control module 315 may lower the value to "12".

After the execution of the step 2702, the migration control module 315 finishes the tier priority processing.

On the other hand, if it is judged in the step 2701 that at least one of the migration source and the migration destination is a high tier, the migration control module 315 finishes the tier priority processing without executing the step 2702.

As described above, according to the tier priority processing shown in FIG. 27, a migration of the data of low importance is preferentially limited.

FIG. 28 is a flowchart showing tier priority processing 2 executed by the migration execution control program 126 of the first embodiment of this invention.

The tier priority processing 2 shown in FIG. 28 is executed by the migration control module 315 of the migration execution control program 126 in the step 2609 of FIG. 26. The tier priority processing 2 is executed to judge whether to limit the number of parallel copy jobs in each migration job according to tier priorities.

First, the migration control module 315 judges whether a migration job from the migration source of a high tier to the migration destination of a low tier has been executed (2801). Judgment as to whether the migration source and the migration destination are high/low tiers may be executed by the same method as that of the step 2701 of FIG. 27.

If it is judged in the step 2801 that even one migration job from the migration source of the high tier to the migration destination of the low tier has been executed, importance of data copied by this migration job may have been reduced. In this case, a delay of the migration job may be permitted. Accordingly, the migration control module 315 limits the number of parallel copy jobs in the migration job from the migration source of the high tier to the migration destination of the low tier (2802). This limitation may be executed as in the case of the step 2702 of FIG. 27.

After an end of the step 2802, the migration control module 315 finishes the tier priority processing 2.

On the other hand, if it is judged in the step 2801 that no migration job from the migration source of the high tier to the migration job of the low tier has been executed, the migration control module 315 judges whether a migration job from the migration source of a low tier to the migration destination of a high tier has been executed (2803).

If it is judged in the step 2803 that even one migration job from the migration source of the low tier to the migration job of the high tier has been executed, importance of data copied by this migration job may have been risen. In this case, the migration control module 315 limits the number of parallel copy jobs in the migration job from the migration source of the low tier to the migration destination of the high tier (2804).

After an end of the step 2804, the migration control module 315 finishes the tier priority processing 2.

On the other hand, if it is judged in the step 2803 that no migration job from the migration source of the low tier to the migration destination of the high tier has been executed, the migration control module 315 finishes the tier priority processing 2 without limiting the number of parallel copy jobs in all migration jobs.

The tier priority processing 2 (FIG. 28) is executed after the tier priority processing (FIG. 27) (steps 2604 and 2609 of FIG. 26). Accordingly, the migration from the migration source of the low tier to the migration destination of the low tier is most preferentially limited (FIG. 27). When a migration from the migration source of the high tier to the migration destination of the low tier and a migration from the migration source of the low tier to the migration source of the high tier are both executed, the former migration is preferentially executed (FIG. 28). Thus, by preferentially limiting the migration of data of low importance, it is possible to prevent a migration delay of data of high importance.

Figure 29:
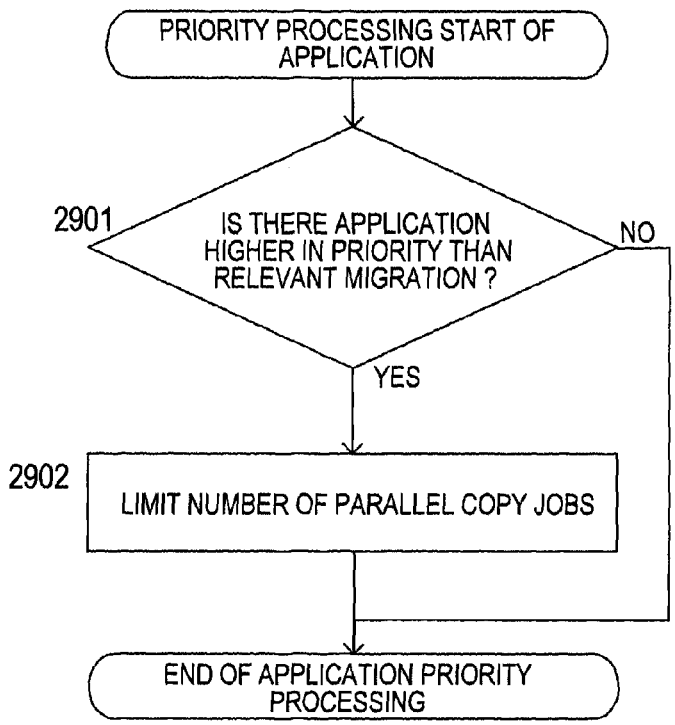
FIG. 29 is a flowchart showing application priority processing executed by the migration execution control program of the first embodiment of this invention.

FIG. 29 is a flowchart showing application priority processing executed by the migration execution control program 126 of the first embodiment of this invention.

The application priority processing shown in FIG. 29 is executed by the migration control module 315 of the migration execution control program 126 in the step 2602 of FIG. 26. The application priority processing is executed to judge whether to limit the number of parallel copy jobs in each migration job according to priorities of the application programs A403 to D406.

First, the migration control module 315 judges whether there is an application program A403 or the like which is given higher priority than the selected migration job ("Relevant Migration" in FIG. 29) in the application programs A403 to D406 that is associated with the selected migration job (2901).

Specifically, for example, the migration control module 315 refers to an application 1801 corresponding to a migration ID 1802 of the selected migration job in the performance deterioration temporary table 313. The application program A403 or the like indicated by the application 1801 referred to is application program A403 or the like associated with the selected migration job. In the example of FIG. 18, the application program D406 is associated with the selected migration job.

The migration control module 315 refers to the application priority information table 800 to judge whether a priority 802 set in the application program A403 or the like associated with the selected migration job is higher than a predetermined threshold value. If a value of the priority 802 of at least one of the application programs A403 to D406 is higher than the predetermined threshold value, it is judged that there is an application program A403 or the like which is given higher priority than the selected migration job (2901).

If it is judged in the step 2901 that there is an application program A403 or the like which is given higher priority than the selected migration job, the migration control module 315 limits the number of parallel copy jobs for the selected migration job (2902). This limitation may be executed as in the case of the step 2702 of FIG. 27.

After the execution of the step 2902, the migration control module 315 finishes the application priority processing.

On the other hand, if it is judged in the step 2901 that there is no application program A403 or the like which is given higher priority than the selected migration job, the migration control module 315 finishes the application priority processing without executing the step 2902.

Figure 30:
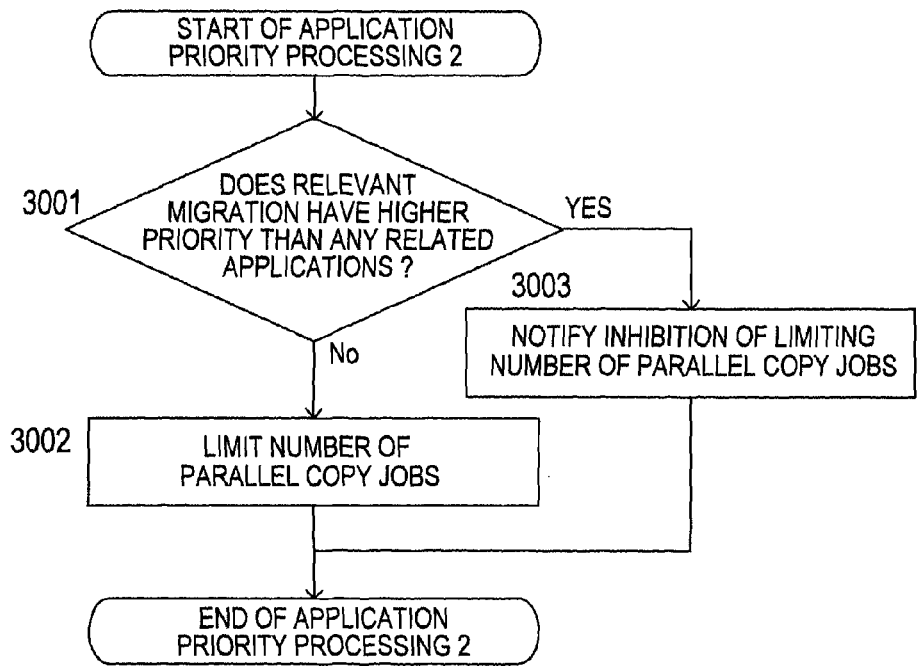
FIG. 30 is a flowchart showing another application priority processing executed by the migration execution control program of the first embodiment of this invention.

FIG. 30 is a flowchart showing application priority processing 2 executed by the migration execution control program 126 of the first embodiment of this invention.

The application priority processing 2 shown in FIG. 30 is executed by the migration control module 315 of the migration execution control program 126 in the step 2607 of FIG. 26. The application priority processing 2 is executed to judge whether to limit the number of parallel copy jobs in each migration job according to priorities of the application programs A403 to D406.

First, the migration control module 315 judges whether the priority given selected migration job is higher than the priorities given the application programs A403 or the like associated with the selected migration job (3001). Specifically, for example, by the same method as that of the step 2901 of FIG. 29, the migration control module 315 judges whether a priority 802 set in the application program A403 or the like associated with the selected migration job is higher than a predetermined threshold value.

If the priorities 802 set in all the application programs A403 or the like associated with the selected migration job are lower than the predetermined value, the selected migration job is judged to be given higher priority than all the application programs A403 or the like associated with the selected migration job (3001).

If it is judged in the step 3001 that a least one of the application programs A403 to D406 associated with the selected migration job is given higher priority than the selected migration job, the migration control module 315 limits the number of parallel copy jobs for the selected migration job (3002). For example, this limitation may be executed as in the case of the step 2702 of FIG. 27.

On the other hand, if it is judged in the step 3001 that the selected migration job is given higher priority than all the application programs A403 or the like associated with the selected migration job, the migration control module 315 cannot limit the number of parallel copy jobs. Accordingly, the migration control module 315 transmits a notification of inhibition of limiting the number of parallel copy jobs to the operation management client 104 (3003) to finish the application priority processing 2.

By the processings shown in FIGS. 29 and 30, the migration job associated with the application program A403 or the like whose priority is higher than the predetermined threshold value is limited. As described above referring to FIG. 8, the user sets high priority in the application program A403 or the like whose performance should not be reduced. By the processing shown in FIGS. 29 and 30, the migration job associated with the application program A403 or the like in which the high priority has been set is limited. Thus, when the migration job is limited, bottlenecks of resources used by the application program A403 or the like of the high priority is mitigated. As a result, the performance of the application program A403 or the like (i.e., application program A403 or the like required of high performance) whose performance is intended to be prevented from being reduced by the user is preferentially recovered.

Figure 31:
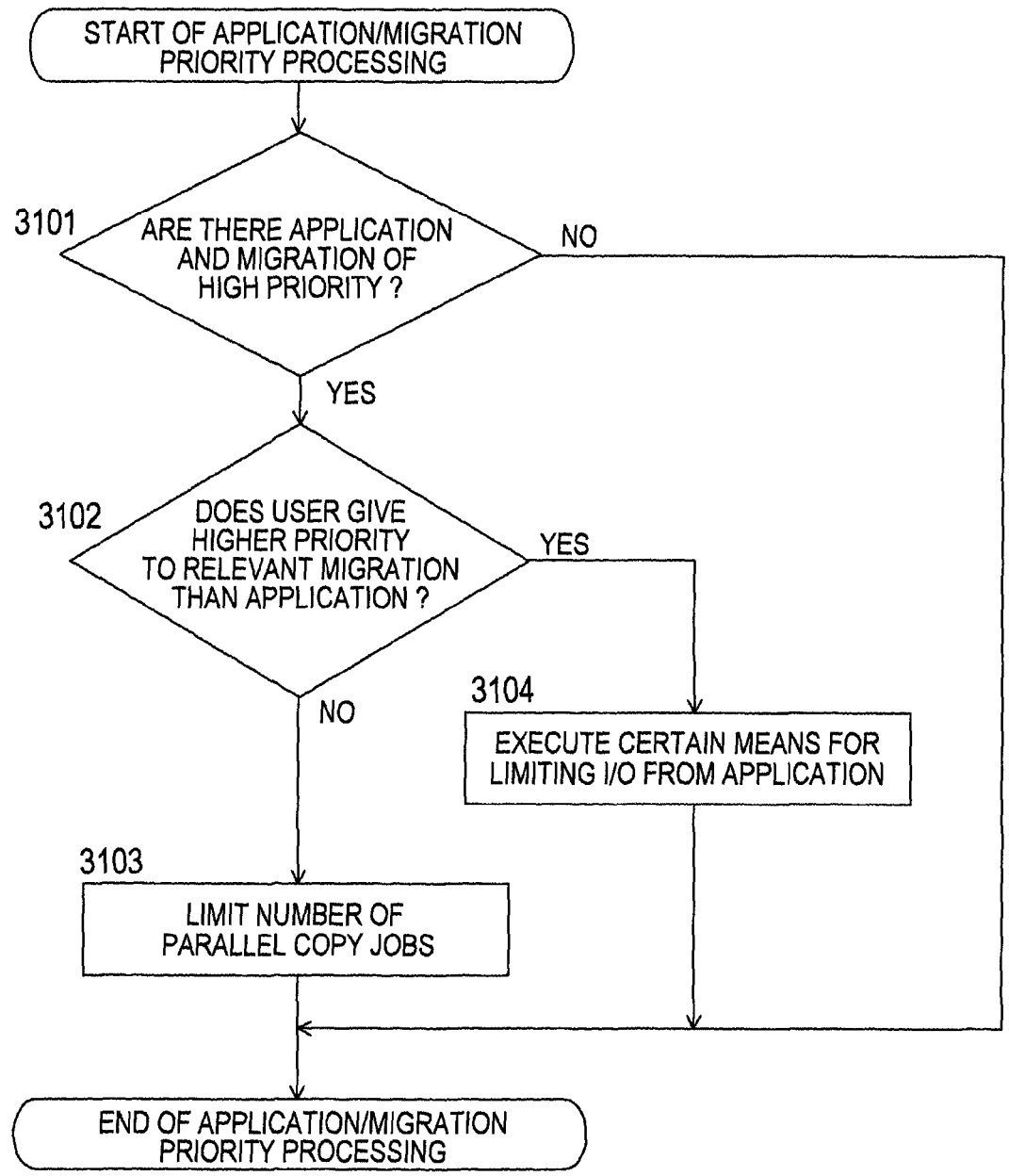
FIG. 31 is a flowchart showing application-migration priority processing executed by the migration execution control program of the first embodiment of this invention.

FIG. 31 is a flowchart showing application-migration priority processing executed by the migration execution control program 126 of the first embodiment of this invention.

The application-migration priority processing shown in FIG. 31 is executed by the migration control module 315 of the migration execution control program 126 in the step 2611 of FIG. 26. The application-migration priority processing is executed to judge whether to limit the number of parallel copy jobs in each migration job when priorities of the application programs A403 or the like and a priority of the migration job are all high.

First, the migration control module 315 judges whether the priority of the selected migration job and the priorities of the application programs A403 or the like associated with the selected migration job are all high (3101).

For example, if at least one of the migration destination tier 902 and the migration source tier 902 of the selected migration job is higher than a predetermined threshold value, a priority of the selected migration job may be judged to be high. On the other hand, if the priority 802 set in the application program A403 or the like is higher than a predetermined threshold value, priority of the application program A403 or the like may be judged to be high.

If it is judged in the step 3101 that at least one of the priority of the selected migration job and the priority of each of the application programs A403 or the like associated with the selected migration job is judged to be low, the migration control module 315 finishes the processing without executing steps 3103 and 3104 described below.

On the other hand, if it is judged in the step 3101 that the priority of the selected migration job and the priorities of the application programs A403 or the like associated with the selected migration job are all judged to be high, the migration control module 315 judges whether the user gives higher priority to the selected migration job over the application programs A403 or the like (3102).

For example, the user can optionally prejudge which of the migration job and the application programs A403 or the like should be given a priority, and set a result of the judgment in the operation management server 122 via the operation management client 104. In this case, the migration control module 315 executes the judgment of the step 3102 according to the result of the judgment set by the user.

If it is judged in the step 3102 that the user gives higher priority to the selected migration job than the application programs A403 or the like, the number of parallel copy jobs in the selected migration job cannot be limited. Accordingly, the migration control module 315 executes certain processing to limit I/O of the application programs A403 or the like (3104).

On the other hand, if it is judged in the step 3102 that the user does not give higher priority to the selected migration job than the application programs A403 or the like, the migration control module 315 limits the migration job to recover performance of the application programs A403 or the like. Specifically, the migration control module 315 limits the number of parallel copy jobs in the selected migration job (3103).

After an end of the step 3103 or 3104, the migration control module 315 finishes the application-migration priority processing.

According to the application-migration priority processing shown in FIG. 31, when the priorities of the application programs A403 or the like and the priority of the migration job are all high, the execution of the migration job is given higher priority in principle (3102 and 3104). However, if the user makes an arrangement beforehand to give higher priority to execution of the application programs A403 or the like, the execution of the application programs A403 or the like is given higher priority (3102 and 3103).

Figure 32:
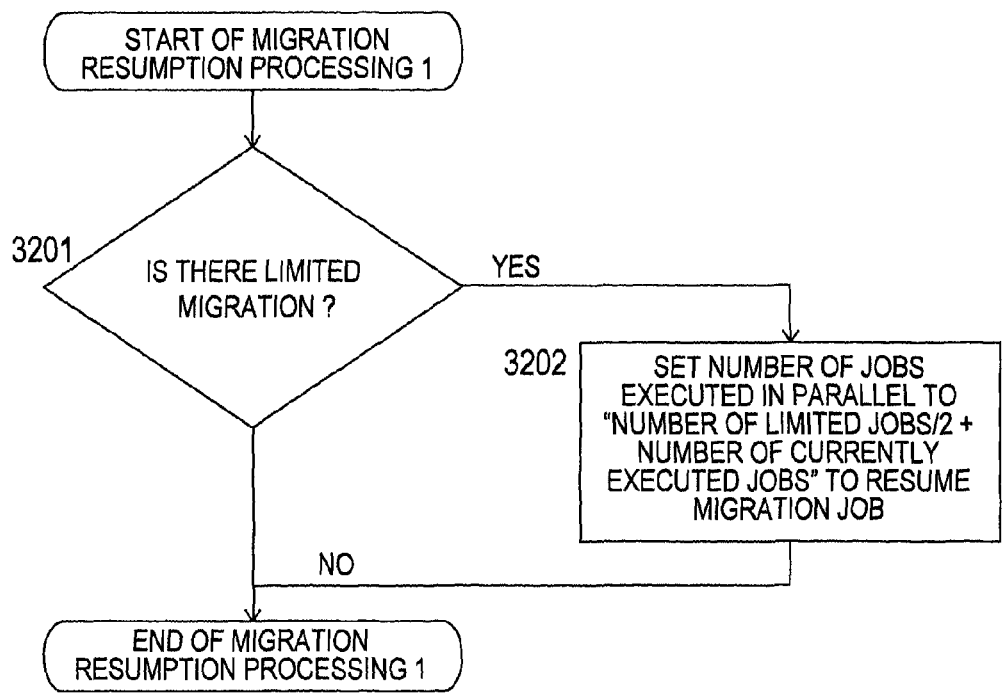
FIG. 32 is a flowchart showing first migration resumption processing executed by the migration execution control program of the first embodiment of this invention.

FIG. 32 is a flowchart showing migration resumption processing 1 executed by the migration execution control program 126 of the first embodiment of this invention.

The migration resumption processing 1 shown in FIG. 32 is executed by the migration control module 315 of the migration execution control program 126 in the step 2616 of FIG. 26. The migration resumption processing 1 is executed to lift the limit of the migration job associated with the application programs A403 or the like upon recovery of performance of the application programs A403 or the like.

First, the migration control module 315 judges whether the selected migration job has been limited (3201). Specifically, the migration control module 315 refers to the job-migration path relation information table 700, and judges that the selected migration job has been limited if "Limited" is registered in the state 705 corresponding to the selected migration job.

If it is judged in the step 3201 that the selected migration job has been limited, the migration control module 315 gradually lifts the limit of the selected migration job (3202). As a result, a value larger than the currently set number of parallel copy jobs and smaller than the number of parallel copy jobs before the start of limiting the migration job is set as the new number of parallel copy jobs.

FIG. 32 shows an example where the number of limited copy jobs (e.g., "12") is half of the number of unlimited copy jobs (e.g., "24"). In this case, the migration is resumed by setting a value obtained by adding half of the number of parallel copy jobs to the currently set number of parallel copy jobs as the new number of parallel copy jobs.

As an example, a case where a limited migration job 10 and an unlimited migration job 11 are executed as shown in FIG. 7 will be described. The migration jobs 10 and 11 are migration jobs identified by values "10" and "11" of the ID 701.

If the limit of the migration job 10 is gradually lifted in the step 3202, for example, a value "18" obtained by adding half of the value to a value "12" of the current number of parallel copy jobs 706 of the migration job 10 is set as the new number of parallel copy jobs 706 of the migration job 10. "18" is a value larger than the number of limited parallel copy jobs "12" and smaller than the number of copy jobs "24" before the limitation. The migration job will be executed according to the new setting thereafter.

After and end of the step 3202, the migration control module 315 finishes the migration resumption processing 1.

On the other hand, if it is judged in the step 3201 that the selected migration job has not been limited, the migration control module 315 finishes the migration resumption processing 1 without lifting the limit of the migration job.

Figure 33:
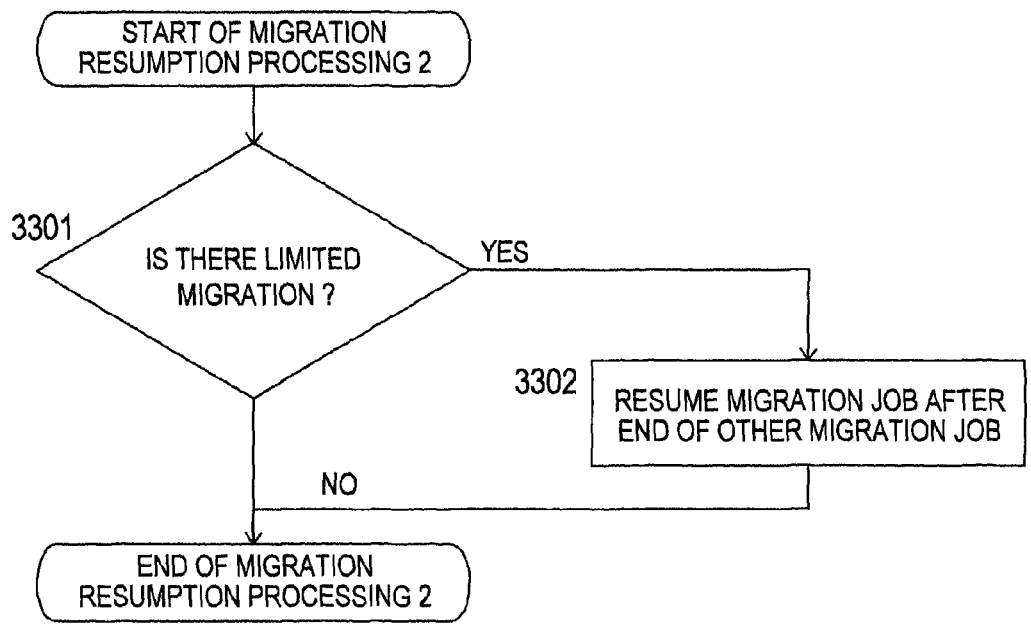
FIG. 33 is a flowchart showing second migration resumption processing executed by the migration execution control program of the first embodiment of this invention.

FIG. 33 is a flowchart showing migration resumption processing 2 executed by the migration execution control program 126 of the first embodiment of this invention.

The migration resumption processing 2 shown in FIG. 33 is executed by the migration control module 315 of the migration execution control program 126 in the step 2617 of FIG. 26. The migration resumption processing 2 is executed to lift the limit of the migration job associated with the application programs A403 or the like upon recovery of performance of the application programs A403 or the like.

First, the migration control module 315 judges whether the selected migration job has been limited (3301). This judgment is executed as in the case of the step 3201 of FIG. 32.

If it is judged in the step 3301 that the selected migration job has been limited, the migration control module 315 lifts the limit of the selected migration job after an end of other executed migration jobs (3302).

As an example, a case where a limited migration job 10 and an unlimited migration job 11 are executed as shown in FIG. 7 will be described. If the limit of the migration job 10 is lifted in the step 3302, the migration control module 315 waits for an end of execution of the unlimited migration job 11. Until the end of the execution of the migration job 11, the migration job 10 is executed while the number of parallel copy jobs 706 is limited to "12". Then, after the end of the execution of the migration job 11, the migration control module 315 changes the number of parallel copy jobs 706 of the migration job 10 to a value "24" of the number of parallel copy jobs 706 before the start of the limit. Thereafter, the migration job 10 is executed according to the changed number of parallel copy jobs 706.

According to the first embodiment of this invention, when the performance of the application program A403 or the like drops, a migration which may have caused the performance drop is specified. Additionally, judgment is made as to whether to limit the specified migration. This judgment is executed based on the priorities set in the application programs A403 to D406 and the tier priorities set in the storage subsystems A449 to C451. If it is judged to limit the migration, the limitation is executed. As a result, the performance is recovered preferentially from the application program A403 or the like where high priority has been set. Thus, according to the first embodiment of this invention, migration execution is controlled to limit an influence on the performance of the application programs A403 to D406 to a minimum. Hence, the user is relieved of work to manually set migration execution.

Next, a second embodiment of this invention will be described.

According to the first embodiment of this invention, migrations are executed among the storage subsystems 170 to 173. However, according to the second embodiment, this invention can be applied to a case where a migration is executed in one of the storage subsystems 170 to 173.

Figure 34:
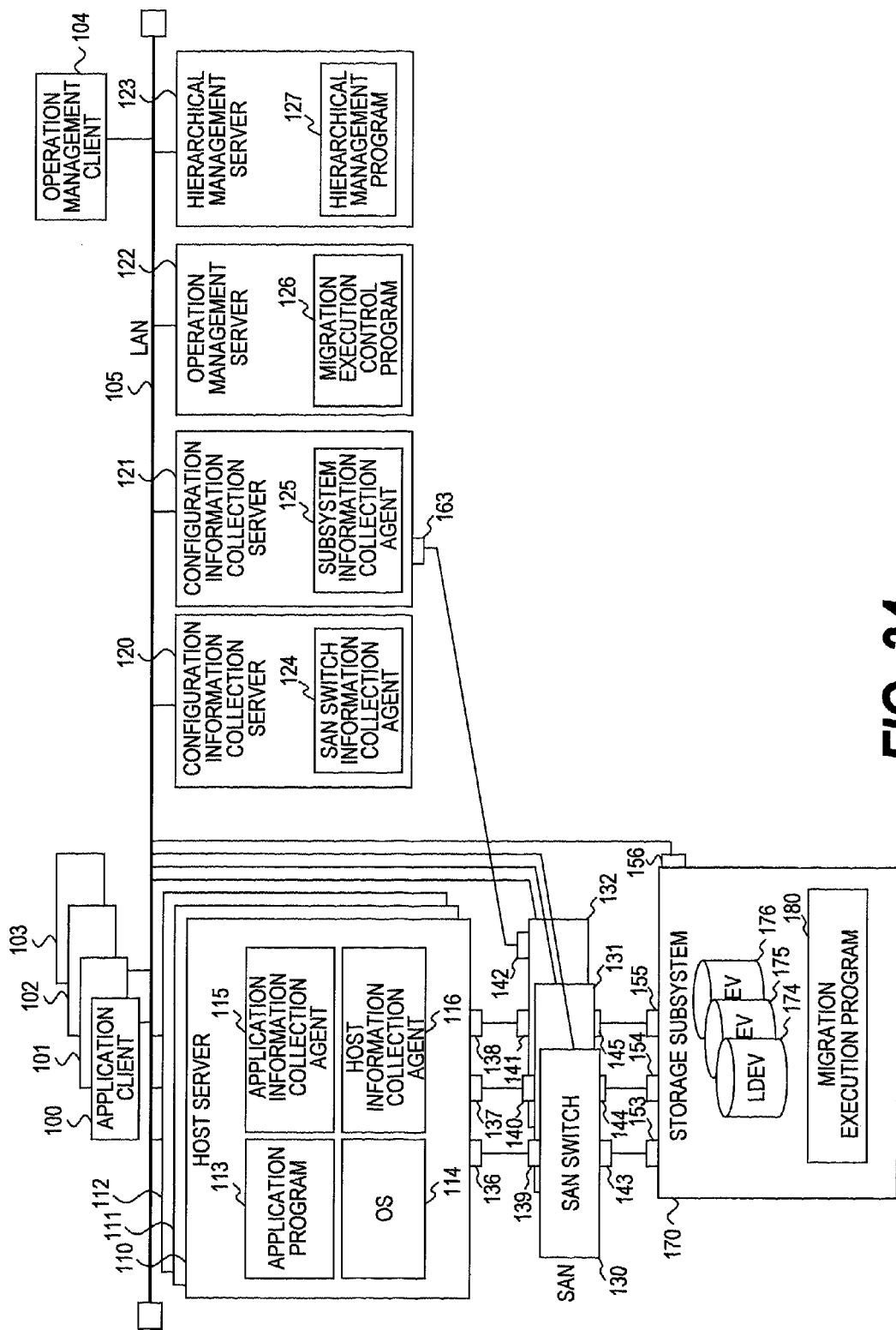
FIG. 34 is a block diagram showing a configuration of a computer system according to a second embodiment of this invention.

FIG. 34 is a block diagram showing a configuration of a computer system according to the second embodiment of this invention.

Description of portions of the computer system of the second embodiment similar to those of the computer system of the first embodiment will be omitted.

Application clients 100 to 103, an operation management client 104, host servers 110 to 112, configuration information collection servers 120 and 121, an operation management server 122, a storage subsystem 170, and SAN switches 130 to 132 are similar to those shown in FIG. 1. However, a migration execution control program 126 of the second embodiment holds a tier priority information table 3500 as tier priority information 308 as described below (refer to FIG. 35).

A hardware configuration of the storage subsystem 170 of the second embodiment is as shown in FIG. 2F. However, according to the second embodiment, physical data storage areas of physical disks 254 to 256 of the storage subsystem 170 are allocated to LDEV's 174 to 176 held by the storage subsystem 170. A migration execution program 180 executes a migration from one of the LDEV's 174 to 176 held by the storage subsystem 170 to another.

FIG. 34 shows only one substorage system 170 as an example. However, the computer system of the second embodiment may include a plurality of storage subsystems connected to the host servers 110 to 112 via the SAN switches 130 to 132.

The resource relation shown in FIG. 4 is applied to the second embodiment. An example where the storage subsystem 170 of the second embodiment corresponds to the storage subsystem A449 will be described. In this case, the LDEV's 174 to 176 of FIG. 34 correspond to the LDEV A468 to J477 of FIG. 4. The numbers of shown LDEV's do not match each other because portions unnecessary for explanation are omitted in the drawings.

According to the second embodiment, the LDEV A468 to J477 are classified based on tiers. For example, tiers of the LDEV A468 to J477 may be decided based on performance of the physical disks 254 to 256 allocated to the LDEV A468 to J477. Specifically, for example, the LDEV A468 to J477 to which high-performance physical disks 254 to 256 are allocated may be classified as high tiers, while the LDEV A468 to J477 to which not so high performance but inexpensive physical disks 254 to 256 are allocated may be classified as low tiers. In this case, for example, data of a high access frequency and data which must be accessed at a high speed may be stored in the LDEV A468 to J477 of high tiers, while other data (e.g., backup data) may be stored in the LDEV A468 to J477 of low tiers.

FIG. 35 is an explanatory diagram of tier priority information 308 stored in a database 303 of the second embodiment of this invention.

According to the second embodiment, a tier priority information table 3500 shown in FIG. 35 is stored as the tier priority information 308 in the database 303. The tier priority information table 3500 holds information indicating tiers of the LDEV A468 to J477, i.e., information indicating priorities set in the LDEV A468 to J477.

The tier priority information table 3500 includes two columns of a LDEV 3501 and a tier 3502.

In the LDEV 3501, identifiers of the LDEV A468 to J477 are registered.

In the tier 3502, tiers set in the LDEV A468 to J477 are registered. The tiers are set by a hierarchical management program 127 of a hierarchical management server 123. For example, highest tiers may be set in one of the LDEV A468 to J477 to which a physical disk of highest performance is allocated. Alternatively, a highest tier may be set in one of the LDEV A468 to J477 intended to be prevented from being reduced in performance by a user.

For example, in FIG. 35, "1" is registered as tiers 3502 of the LDEV A468 to E472, while "2" is registered as tiers 3502 of the LDEV F473 to J477. This indicates that tiers higher (i.e., priorities higher) than those of the LDEV F473 to J477 are set in the LDEV A468 to E472.

The migration execution control program 126 of the second embodiment executes the processings shown in FIGS. 20 to 33 as in the case of the first embodiment. As a result, according to the second embodiment, as in the case of the first embodiment, migration execution is controlled to limit an influence on the performance of the application programs A403 to D406 to a minimum.

Next, a third embodiment of this invention will be described.

According to the first and second embodiments of this invention, migrations are executed among the storage subsystems 170 to 173. However, according to the third embodiment, this invention can be applied to a case where so-called remote coping is executed among the storage subsystems 170 to 173.

Figure 36:
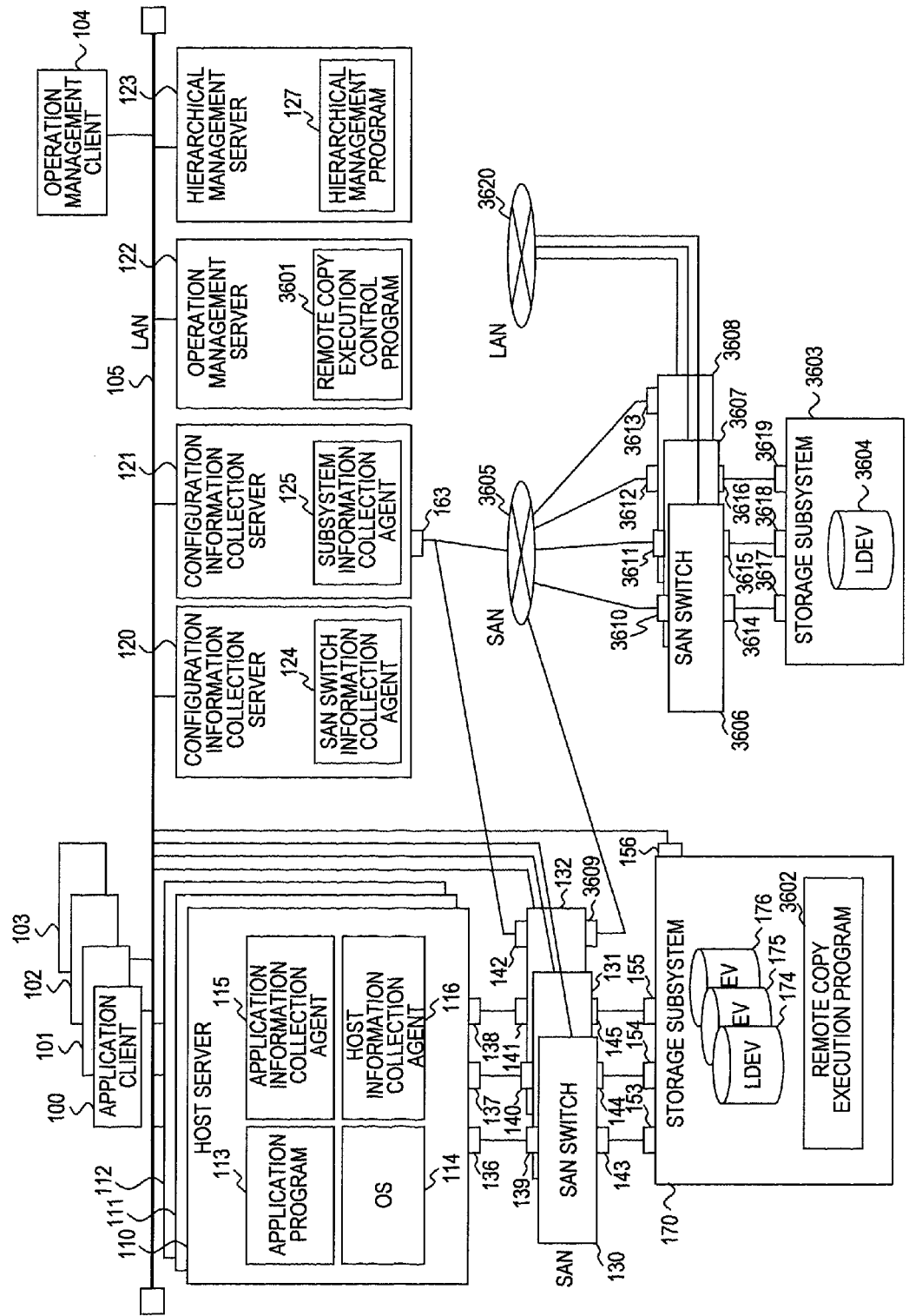
FIG. 36 is a block diagram showing a configuration of a computer system according to a third embodiment of this invention.

FIG. 36 is a block diagram showing a configuration of a computer system according to the third embodiment of this invention.

Description of portions of the computer system of the third embodiment similar to those of the computer system of the first embodiment will be omitted.

Application clients 100 to 103, an operation management client 104, host servers 110 to 112, configuration information collection servers 120 and 121, an operation management server 122, a storage subsystem 170, and SAN switches 130 to 132 are similar to those shown in FIG. 1. However, the operation management sever 122 of the third embodiment holds a remote-copy execution control program 3601. The remote-copy execution control program 3601 is stored in a disk drive 234, and copied in a memory 233 when necessary to be executed by a processor 232.

The storage subsystem 170 of the third embodiment holds the remote-copy execution program 3602. The remote-copy execution program 3602 is stored in the disk drive 253, and copied in a memory 252 when necessary to be executed by a processor 251. The remote-copy execution program 3602 is a type of a management program of the storage subsystems 170 or the like. Specifically, the remote-copy execution program 3602 is controlled by the remote-copy execution control program 3601 to execute remote-copying.

The resource relation shown in FIG. 4 is applied to the third embodiment. For example, the storage subsystem 170 of the second embodiment may correspond to the storage subsystem A449, and the storage subsystem 3603 may correspond to one of the storage subsystems B450 and C451.

The remote-copying is carried out to protect data stored in the storage subsystem from system faults or disasters thereby continuing an operation. By the remote-copying, for example, data stored in one of the LDEV's 174 to 176 of the storage subsystem 170 is copied to a LDEV 3604 of the storage subsystem 3603. Accordingly, as in the case of the migrations of the first and second embodiments, the remote-copying generates copy jobs. Data I/O by the generated copy jobs use resources of the computer system.

The remote-copying is different from the migration in that copy source data is left without being deleted after data is copied by a copy job. According to the migration, data is copied by the copy job as in the case of remote-copying. However, the copy source data is subsequently deleted. In other words, the copy job executed for remote-copying is similar to the copy job executed for a migration. Thus, the processings of the first and second embodiments can be applied to the third embodiment.

Specifically, a hardware configuration of units of the computer system of the third embodiment is as shown in FIGS. 2A to 2F. A functional block diagram of the computer system of the third embodiment is as shown in FIGS. 3A and 3B. The computer system of the third embodiment holds the same tables as those shown in FIGS. 5 to 19. However, in those tables, "Migration" is replaced by "Remote-copying". The remote-copy execution control program 3601 held by the operation management server 122 of the third embodiment executes the same processing as those shown in FIGS. 20 to 33. However, in FIGS. 2A to 33, "Migration" is replaced by "Remote-copying". As a result, according to the third embodiment, remote-copying execution is controlled to limit an influence on the performance of the application programs A403 to D406.

The first to third embodiments have been described by way of example where the migration or the remote-copying is carried out in the storage subsystems 170 to 173. However, this invention is not limited to the example. This invention can be applied to a case where one or more resources are used for data I/O of the host servers 110 to 112 and data I/O generated by the processings executed by the storage subsystems 170 to 173. The processings executed by the storage subsystems 170 to 173 may be processing other than migration or remote-copying. For example, the invention can be applied to a case where copying of data from one of the LDEV's 174 to 176 of the storage subsystem 170 to another, so-called local copying, is executed.

According to the embodiments of this invention, when a bottleneck is generated by use of one or more resources for data I/O of the host servers 110 to 112 and data I/O generated by the processings executed by the storage subsystems 170 to 173, and performance of the application program 113 of the host servers 110 to 112 is deteriorated as a result, a resource where the bottleneck has occurred is specified, and information indicting the specified resource is notified to the user. Thus, the user can execute processing to improve the performance of the application program 113.

Further, according to the embodiments of this invention, the operation management server 122 can automatically control the processing of using the resource where the bottleneck has occurred to remove the generated bottleneck. As a result, the performance of the application program 113 is recovered. In this case, the operation management server 122 can preferentially recover the performance of the application program 113 required of high performance by controlling the processing based on a priority set in the application program 113 and priorities set in the storage areas of the storage subsystems 170 to 173.

While the present invention has been described in detail and pictorially in the accompanying drawings, the present invention is not limited to such detail but covers various obvious modifications and equivalent arrangements, which fall within the purview of the appended claims.

What is claimed is:

1. A method of controlling a computer system, which includes a host computer and one or more storage systems coupled to the host computer via a network,
   wherein the host computer includes a first interface coupled to the network, a first processor coupled to the first interface, and a first memory coupled to the first processor,
   wherein each of the storage systems includes a port coupled to the network, a second processor coupled to the port, and a second memory coupled to the second processor,
   wherein at least one of the one or more storage systems includes a physical storage device for storing data written by the host computer,
   wherein a physical storage area of the physical storage device is allocated to a logical storage area,
   wherein the first processor executes an application program stored in the first memory to execute an application job which executes data I/O in the logical storage area via the first interface,
   wherein the second processor executes a management program stored in the second memory to execute a management job which executes the data I/O in the logical storage area for managing the storage systems, the managing job relating to execution of a migration, and
   wherein the method comprises:
      determining whether at least one of resources of the computer system used for the data I/O of the application job is also used for the data I/O of the executed management job when performance of the application job drops below a predetermined first threshold value; and
      displaying information indicating the executed management job when it is determined that at least one of the resources used for the data I/O of the application job is also used for the data I/O of the executed management job,
      determining whether to limit the execution of the management job when it is determined that at least one of the resources used for the data I/O of the application job is also used for the data I/O of the management job;
      limiting the execution of the management job according to a result of the determination,
   wherein the second processor executes data copying processing from a first logical storage area of the logical storage areas of the at least one storage system to a second logical storage area of the logical storage areas as the management job,
   wherein the data I/O of the management job is data I/O for the data copying processing,
   wherein the management job is divided into a plurality of copy jobs, which are executed in parallel for execution of the data copying processing, each of the plurality of copy jobs copying a part of the data from the first logical storage area to the second logical storage area, and
   wherein the step of limiting execution of the management job is performed by reducing the number of copy jobs executed in parallel.

2. The method according to claim 1,
   wherein the computer system stores information indicating the resources used for the data I/O of the application job and information indicating the resources used for the data I/O of the management job, and
   wherein the stored information is used in the step of determining whether at least one of the resources used for the data I/O of the application job is also used for the data I/O of the executed management job.

3. The method according to claim 1,
   wherein the computer system stores information indicating a priority of the application job, and
   wherein the step of determining whether to limit the execution of the management job further comprises determining that the execution of the management job is to be limited when the priority of the application job is higher than a predetermined second threshold value.

4. The method according to claim 1,
   wherein the computer system stores information indicating a priority of each logical storage areas, and
   wherein the step of determining whether to limit the execution of the management job further comprises determining that the execution of the management job is to be limited when a priority of the logical storage area which is a copying source of the data copying processing and a priority of the logical storage area which is a copying destination of the data copying processing are both lower than a predetermined third threshold value.

5. The method according to claim 4, wherein the step of determining whether to limit the execution of the management job further comprises:
   determining that the execution of the management job is to be limited when the priority of the logical storage area which is the copying source is higher than the predetermined third threshold value and concurrently the priority of the logical storage area which is the copying destination is lower than the predetermined third threshold value;
   determining, when the priority of the logical storage area which is the copying source is lower than the predetermined third threshold value, or when the priority of the logical storage area which is the copying destination is higher than the predetermined third threshold value, whether the priority of the logical storage area which is the copying source is lower than the predetermined third threshold value and concurrently the priority of the logical storage area which is the copying destination is higher than the predetermined third threshold value; and determining that the execution of the management job is to be limited when the priority of the logical storage area which is the copying source is lower than the predetermined third threshold value and concurrently the priority of the logical storage area which is the copying destination is higher than the predetermined third threshold value.

6. The method according to claim 1, further comprising:

reducing the number of data I/O's of the application job when at least one of the priority of the logical storage area which is the copying source of the data copying processing and the priority of the logical storage area which is the copying destination of the data copying processing is higher than the predetermined third threshold value, and a priority of the application job is higher than the predetermined second threshold value.

7. The method according to claim 1, further comprising:

releasing the limitation of the execution of the management job after performance of the application job becomes higher than a predetermined fourth threshold value.

8. The method according to claim 7, wherein the predetermined fourth threshold value indicates a value of performance higher than the predetermined first threshold value.

9. The method according to claim 7, wherein the releasing limitation of the execution of the management job is performed by executing the number of copy jobs in parallel which is larger than the number of copy jobs executed in parallel while the execution of the management job is limited and smaller than the number of copy jobs executed in parallel before the execution of the management job is limited when the performance of the application job becomes higher than the predetermined fourth threshold value.

10. The method according to claim 7, wherein the releasing limitation of the execution of the management job is performed by executing the number of copy jobs in parallel which is equal to the number of copy jobs executed in parallel before the execution of the management job is limited after the performance of the application job becomes higher than the predetermined fourth threshold value and after data copying processing in which the number of copy jobs input in parallel is not reduced is finished.

11. A computer system, comprising:

a host computer;

one or more storage systems coupled to the host computer via a network;

a management computer coupled to the host computer and the storage systems; and a display device, wherein the host computer includes a first interface coupled to the network, a first processor coupled to the first interface, and a first memory coupled to the first processor, wherein the management computer includes a second interface coupled to the host computer and the storage systems, a second processor coupled to the second interface, and a second memory coupled to the second processor, wherein each of the storage systems includes a port coupled to the network, a third processor coupled to the port, and a third memory coupled to the third processor, wherein at least one of the one or more storage systems includes a physical storage device for storing data written by the host computer, wherein a physical storage area of the physical storage device is allocated to a logical storage area, wherein the first processor executes an application job by executing an application program stored in the first memory, wherein the application job executes data I/O in the logical storage area via the first interface, wherein the third processor executes a management job for managing the storage systems by executing a management program stored in the third memory, the management job relating to execution of a migration, wherein the management job executes the data I/O in the logical storage area, wherein the second memory stores information indicating resources used for the data I/O of the application job and information indicating resources used for the data I/O of the management job, and stores information indicating a priority of the application job, wherein the second processor for executing a control program stored in the second memory is configured to:

determine whether at least one of the resources of the computer system used for the data I/O of the application job is also used for data I/O of the executed management job based on information stored in the second memory when performance of the application job drops below a predetermined first threshold value; and cause the display device to display information indicating the executed management job when it is determined that at least one of the resources used for the data I/O of the application job is also used for the data I/O of the executed management job, determine whether the priority of the application job is higher than a predetermined second threshold value when it is determined that at least one of the resources used for the data I/O of the application job is also used for the data I/O of the management job; and limit the execution of the management job by reducing the number of copy jobs executed in parallel to execute the data copying processing when it is determined that the priority of the application job is higher than the predetermined second threshold value, wherein the third processor executes data copying processing from a first logical storage area of the logical storage areas of the at least one storage system to a second logical storage area of the logical storage areas as the management job, wherein the data I/O of the management job is data I/O for the data copying processing, wherein the management job is divided into a plurality of copy jobs, which are executed in parallel for execution of the data copying processing, each of the plurality of copy jobs copying a part of the data from the first logical storage area to the second logical storage area, and wherein the step of limiting execution of the management job is performed by reducing the number of copy jobs executed in parallel.

12. The computer system according to claim 11, wherein the second memory further stores information indicating a priority of each of the logical storage areas, wherein the second processor for executing the control program is configured to:

limit the execution of the management job when a priority of the logical storage area which is a copying source of the data copying processing and a priority of the logical storage area which is a copying destination of the data copying processing are both lower than a predetermined third threshold value;

limit the execution of the management job when the priority of the logical storage area which is the copying source is higher than the predetermined third threshold value, and concurrently the priority of the logical storage area which is the copying destination is lower than the predetermined third threshold value;

determine, when the priority of the logical storage area which is the copying source is lower than the predetermined third threshold value, or when the priority of the logical storage area which is the copying destination is higher than the predetermined third threshold value, whether the priority of the logical storage area which is the copying source is lower than the predetermined third threshold value and concurrently the priority of the logical storage area which is the copying destination is higher than the predetermined third threshold value; and limit the execution of the management job when the priority of the logical storage area which is the copying source is lower than the predetermined third threshold value, and concurrently the priority of the logical storage area which is the copying destination is higher than the predetermined third threshold value, wherein the management job is divided into a plurality of copy jobs, which are executed in parallel for execution of the data copying processing, each of the plurality of copy jobs copying a part of the data from the first logical storage area to the second logical storage area, and wherein the limitation of the execution of the management job is executed by reducing the number of copy jobs executed in.

13. A management computer, which is coupled to a host computer, one or more storage systems coupled to the host computer via a network, and a display device, comprising:

a second interface coupled to the host computer and the storage systems;

a second processor coupled to the second interface; and a second memory coupled to the second processor, wherein the host computer includes a first interface coupled to the network, a first processor coupled to the first interface, and a first memory coupled to the first processor, wherein each of the storage systems includes a port coupled to the network, a third processor coupled to the port, and a third memory coupled to the third processor, wherein at least one of the one or more storage systems includes a physical storage device for storing data written by the host computer, wherein a physical storage area of the physical storage device is allocated to a logical storage area, wherein the first processor executes an application job by executing an application program stored in the first memory, wherein the application job executes data I/O in the logical storage area via the first interface, wherein the third processor executes a management job for managing the storage systems by executing a management program stored in the third memory, the management job relating to execution of a migration, wherein the management job executes the data I/O in the logical storage area, wherein the second memory stores information indicating resources used for the data I/O of the application job and information indicating resources used for the data I/O of the management job, and stores information indicating a priority of the application job, wherein the second processor for executing a control program stored in the second memory is configured to:

determine whether at least one of the resources of the computer system used for the data I/O of the application job is also used for data I/O of the executed management job based on the information stored in the second memory when performance of the application job drops below a predetermined first threshold value; and cause the display device to display information indicating the executed management job when it is determined that at least one of the resources used for the data I/O of the application job is also used for the data I/O of the executed management job, determine whether the priority of the application job is higher than a predetermined second threshold value when it is determined that at least one of the resources used for the data I/O of the application job is also used for the data I/O of the management job; and limit the execution of the management job by reducing the number of copy jobs executed in a parallel to execute the data copying processing when it is determined that the priority of the application job is higher than the predetermined second threshold value, wherein the third processor executes data copying processing from a first logical storage area of the logical storage areas of the at least one storage system to a second logical storage area of the logical storage areas as the management job, wherein the data I/O of the management job is data I/O for the data copying processing, wherein the management job is divided into a plurality of copy jobs, which are executed in parallel for execution of the data copying processing, each of the plurality of copy jobs copying a part of the data from the first logical storage area to the second logical storage area, and wherein the step of limiting execution of the management job is performed by reducing the number of copy jobs executed in parallel.

14. The management computer according to claim 13, wherein the second memory further stores information indicating a priority of each of the logical storage areas, wherein the second processor for executing the control program is configured to:

limit the execution of the management job when a priority of the logical storage area which is a copying source of the data copying processing and a priority of the logical storage area which is a copying destination of the data copying processing are both lower than a predetermined third threshold value;

limit the execution of the management job when the priority of the logical storage area which is the copying source is higher than the predetermined third threshold value, and concurrently the priority of the logical storage area which is the copying destination is lower than the predetermined third threshold value;

determine, when the priority of the logical storage area which is the copying source is lower than the predetermined third threshold value or when the priority of the logical storage area which is the copying destination is higher than the predetermined third threshold value, whether the priority of the logical storage area which is the copying source is lower than the predetermined third threshold value and concurrently the priority of the logical storage area which is the copying destination is higher than the predetermined third threshold value; and limit the execution of the management job when the priority of the logical storage area which is the copying source is lower than the predetermined third threshold value, and concurrently the priority of the logical storage area which is the copying destination is higher than the predetermined third threshold value, wherein the management job is divided into a plurality of copy jobs, which are executed parallel for execution of the data copying processing, each of the plurality of copy jobs copying a part of the data from the first logical storage area to the second logical storage area, and wherein the limitation of the execution of the management job is executed by reducing the number of copy jobs executed in parallel.

* * * * *